United States Patent
Dong et al.

(10) Patent No.: US 12,436,568 B2
(45) Date of Patent: Oct. 7, 2025

(54) CIRCUIT BOARD AND ELECTRONIC DEVICE

(71) Applicant: Honor Device Co., Ltd., Shenzhen (CN)

(72) Inventors: Xiaoyong Dong, Shenzhen (CN); Xiaoyong Wang, Shenzhen (CN); Chaoliang Yang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/015,486

(22) PCT Filed: Sep. 7, 2022

(86) PCT No.: PCT/CN2022/117561
§ 371 (c)(1),
(2) Date: Jan. 10, 2023

(87) PCT Pub. No.: WO2023/051206
PCT Pub. Date: Apr. 6, 2023

(65) Prior Publication Data
US 2024/0264632 A1    Aug. 8, 2024

(30) Foreign Application Priority Data

Sep. 30, 2021   (CN) .......................... 202111165965.2
Jan. 27, 2022   (CN) .......................... 202210101437.9

(51) Int. Cl.
G06F 1/16   (2006.01)
H05K 1/14   (2006.01)
H05K 1/18   (2006.01)

(52) U.S. Cl.
CPC .......... G06F 1/1637 (2013.01); G06F 1/1658 (2013.01); H05K 1/147 (2013.01); H05K 1/189 (2013.01)

(58) Field of Classification Search
CPC ......... H05K 1/14; H05K 1/189; G06F 1/1658
See application file for complete search history.

(56) References Cited

U.S. PATENT DOCUMENTS

| | | | |
|---|---|---|---|
| 2013/0100180 A1 | 4/2013 | Dai et al. | |
| 2018/0224957 A1* | 8/2018 | Lim | H05K 1/148 |
| 2020/0225295 A1 | 7/2020 | Hyun et al. | |
| 2020/0266667 A1* | 8/2020 | Lee | H02J 50/90 |

(Continued)

FOREIGN PATENT DOCUMENTS

| | | | |
|---|---|---|---|
| CN | 204795862 U | | 11/2015 |
| CN | 205946321 U | * | 2/2017 |

(Continued)

OTHER PUBLICATIONS

CN 205946321 U translation (Year: 2017).*

*Primary Examiner* — Jerry Wu
(74) *Attorney, Agent, or Firm* — Leydig, Voit & Mayer, Ltd.

(57) ABSTRACT

A screen flexible circuit board (FPC) is combined with a main and sub-board FPC, so that two board to board (BTB) connectors on a main board are combined into one, thereby reducing the area on the main board occupied by the BTB connectors, saving the area on the main board, and improving the area utilization of the main board. In addition, quantities of FPCs and main board BTB connectors are reduced, so that hardware costs are reduced.

6 Claims, 36 Drawing Sheets

(56) References Cited

U.S. PATENT DOCUMENTS

| | | |
|---|---|---|
| 2020/0278750 A1 | 9/2020 | Yeon et al. |
| 2020/0280807 A1* | 9/2020 | Kim ....................... H04R 1/028 |
| 2021/0066828 A1 | 3/2021 | Woo et al. |
| 2021/0251079 A1* | 8/2021 | Park .................... H04M 1/0277 |

FOREIGN PATENT DOCUMENTS

| | | |
|---|---|---|
| CN | 106785527 A | 5/2017 |
| CN | 207410590 U | 5/2018 |
| CN | 208264022 U | 12/2018 |
| CN | 209590837 U | 11/2019 |
| CN | 209805879 U | 12/2019 |
| CN | 112583231 A | 3/2021 |
| CN | 113271368 A | 8/2021 |
| CN | 217240720 U | 8/2022 |
| CN | 115003006 A | 9/2022 |
| CN | 115003020 A | 9/2022 |
| DE | 102018010197 A1 | 6/2020 |
| JP | 2001296841 A | 10/2001 |
| JP | 2010192749 A | 9/2010 |
| JP | 201320270 A | 1/2013 |
| JP | 201441361 A | 3/2014 |
| JP | 2015108833 A | 6/2015 |
| WO | 2012006797 A1 | 1/2012 |
| WO | 2020133905 A1 | 7/2020 |
| WO | 2020248699 A1 | 12/2020 |
| WO | 2022065953 A1 | 3/2022 |
| WO | 2022191535 A1 | 9/2022 |

\* cited by examiner

CIRCUIT BOARD AND ELECTRONIC DEVICE

CROSS-REFERENCE TO RELATED APPLICATIONS

This application is a national stage of International Application No. PCT/CN2022/117561, filed on Sep. 7, 2022, which claims priority to Chinese Patent Application No. 202111165965.2, filed on Sep. 30, 2021, and Chinese Patent Application No. 202210101437.9, filed on Jan. 27, 2022. The disclosures of each of the aforementioned applications are hereby incorporated by reference in their entireties.

TECHNICAL FIELD

This application relates to the field of electronic technologies, and in particular, to a circuit board and an electronic device.

BACKGROUND

A circuit board is used for carrying electronic components of an electronic device. For example, a circuit board of a mobile phone usually includes a main circuit board (that is, a main board) and a sub-circuit board (that is, a sub-board). The main board and the sub-board respectively carry electronic components implementing different functions. In addition, the main board and the sub-board are connected to each other by a flexible printed circuit (FPC) (which may be referred to as a main and sub-board FPC). In addition, the main board and a screen of the electronic device are connected to each other by another FPC (which may be referred to as a screen FPC). In this solution, two connection positions need to be arranged on the main board. One is used for connecting to the main and sub-board FPC, and the other is used for connecting to the screen FPC. The two connection positions occupy a large area of the main board, and hardware costs of the two connection positions and two FPCs are high.

SUMMARY

In view of this, this application provides a circuit board and an electronic device, to resolve at least some of the foregoing problems, and discloses the following technical solutions.

According to a first aspect, this application provides a circuit board, applied to an electronic device, where the electronic device includes a screen, and the screen includes a screen chip, the circuit board including: a main board, a sub-board, and a flexible circuit board, where a first connection position is arranged on the main board, and the flexible circuit board is connected to the main board by the first connection position; a second connection position is arranged on the sub-board, the flexible circuit board is connected to the sub-board by the second connection position, and the flexible circuit board is further connected to the screen chip; a target circuit module is arranged on the sub-board, a signal input terminal of a target signal type on the target circuit module is connected to a signal input terminal also of the target signal type on the sub-board, and the target signal type includes at least one of a power signal, a control signal, or a data signal.

In view of the above, in this solution, a screen FPC and a main and sub-board FPC are combined, so that two connectors on the main board can be combined into one, that is, the first connection position, which reduces the area of the main board occupied by the connectors and improves the utilization of the area of the main board. In addition, quantities of FPCs and connectors are reduced, so that hardware costs are reduced. Moreover, in this solution, circuit module layouts of the main board and the sub-board are optimized to move some circuit modules (for example, the screen power chip) on the main board to the sub-board, so as to further perform combination and optimization for signal input terminals of the circuit modules and reduce a quantity of signals of the circuit modules passing through the first connection position, so that the first connection position transmits signals of an increasing quantity of more complex circuit modules, thereby improving the pin utilization of the first connection position. In addition, moving some of the circuit modules on the main board to the sub-board saves the occupied area on the main board, so that the main board carries an increasing quantity of more complex circuit modules.

According to another possible implementation of the first aspect, the target circuit module includes at least one of the following: a screen power chip, a motor drive power chip, a speaker power amplifier, a charging protocol chip, a PD charging protocol chip, a headset switch switching chip, or a sensor. In view of the above, in this solution, the foregoing at least one circuit module can be moved from the main board to the sub-board, to save the occupied area on the main board, thereby improving the flexibility of the optimization solution of a circuit board in an electronic device.

According to still another possible implementation of the first aspect, the speaker power amplifier includes a first speaker power amplifier or a second speaker power amplifier; the first speaker power amplifier is configured to process an analog sound signal; and the second speaker power amplifier is configured to process a digital sound signal. In view of the above, this solution is not only applicable to a scenario in which an analog speaker power amplifier is used, but also applicable to a scenario in which a digital speaker power amplifier is used, which broadens an applicable range of this solution.

According to another possible implementation of the first aspect, the screen power chip includes a backlight power chip or an OLED drive chip. In view of the above, this solution is not only applicable to an electronic device using an LCD, but also applicable to an electronic device using an OLED, which broadens an applicable range of this solution.

According to still another possible implementation of the first aspect, the target circuit module is the screen power chip and the speaker power amplifier, and the screen power chip is the backlight power chip; and a control signal input terminal of the backlight power chip is connected to a control signal input terminal of the speaker power amplifier, a backlight enable signal input terminal of the backlight power chip is connected to a power supply signal input terminal of the backlight power chip, and a power supply signal input terminal of the speaker power amplifier is connected to the power supply signal input terminal of the backlight power chip. In this solution, the backlight power chip is connected to the control signal input terminal of the speaker power amplifier, and in addition, the backlight enable signal input terminal of the backlight power chip is connected to the power supply input terminal. Compared with the solution in which two circuit modules are placed on the main board, this solution can save 2 pins of the first connection position, and the saved pins may be configured to transmit signals of other circuit modules. In addition, the two circuit modules are moved from the main board to the sub-board, to further reduce the occupied area on the main board. Moreover, the speaker is usually arranged at a position near the sub-board, so that moving the speaker power amplifier to the sub-board can simplify the trace layout of the circuit board, thereby reducing the design complexity of the circuit board. Therefore, the first connection position can carry signals of more circuits, which improves the pin utilization of the first connection position.

According to yet another possible implementation of the first aspect, the target circuit module is the screen power chip and the motor drive power chip, and the screen power chip is the backlight power chip; and a control signal input terminal of the backlight power chip is connected to a control signal input terminal of the motor drive power chip, a backlight enable signal input terminal of the backlight power chip is connected to a power supply signal input terminal of the backlight power chip, and a power supply signal input terminal of the motor drive power chip is connected to the power supply signal input terminal of the backlight power chip. In this solution, the screen power chip and the motor drive power chip are moved from the main board to the sub-board. Further, control signal input terminals of the two chips are connected, and in addition, power supply signal input terminals thereof are connected. Compared with the solution in which two circuit modules are placed on the main board, this solution can save 1 pin of the first connection position, and the saved pin may be configured to transmit signals of other circuit modules. In addition, the two circuit modules are moved from the main board to the sub-board, to further reduce the occupied area on the main board.

According to another possible implementation of the first aspect, the target circuit module is the screen power chip, the motor drive power chip, and the speaker power amplifier, and the screen power chip is the backlight power chip; and control signal input terminals of the backlight power chip, the motor drive power chip, and the speaker power amplifier are connected, a backlight enable signal input terminal of the backlight power chip is connected to a power supply signal input terminal of the backlight power chip, and a power supply signal input terminal of the motor drive power chip is connected to the power supply signal input terminal of the backlight power chip. In this solution, the three circuit modules, that is, the screen power chip, the motor drive power chip, and the speaker power amplifier, are moved from the main board to the sub-board, and control signal input terminals and power supply signal input terminals of the three circuit modules are combined respectively, which saves 2 pins of the first connection position, and improves the pin utilization of the first connection position. In addition, moving the three circuit modules to the sub-board further saves the occupied area on the main board. Moreover, the speaker is usually arranged at a position near the sub-board, so that moving the speaker power amplifier to the sub-board can simplify the trace layout of the circuit board, thereby reducing the design complexity of the circuit board.

According to still another possible implementation of the first aspect, the target circuit module is the screen power chip and the PD charging protocol chip, and the screen power chip is the backlight power chip; and a control signal input terminal of the backlight power chip is connected to a control signal input terminal of the charging protocol chip, a backlight enable signal input terminal of the backlight power chip is connected to a power supply signal input terminal of the backlight power chip, a power supply signal input terminal of the charging protocol chip is connected to a power supply signal input terminal of the backlight power chip, a charging power positive signal input terminal of the charging protocol chip is connected to a charging power positive signal input terminal of the sub-board, and a direct-current power signal input terminal of the charging protocol chip is connected to a direct-current power signal input terminal of the sub-board.

In this solution, the screen power chip and the charging protocol chip are moved to the sub-board, which saves the occupied area on the main board. Moreover, an output terminal of the charging protocol chip is connected to the USB interface circuit, and the USB interface circuit is usually arranged at a position near the sub-board. Therefore, moving the charging protocol chip to the sub-board can simplify the trace layout of the circuit board, thereby reducing the design complexity of the circuit board.

According to yet another possible implementation of the first aspect, the target circuit module is the screen power chip, the charging protocol chip, and the speaker power amplifier, and the screen power chip is the backlight power chip; and control signal input terminals of the backlight power chip, the charging protocol chip, and the speaker power amplifier are connected, a backlight enable signal input terminal of the backlight power chip is connected to a power supply signal input terminal of the backlight power chip, a power supply signal input terminal of the speaker power amplifier is connected to a power supply signal input terminal of the backlight power chip, a power supply signal input terminal of the charging protocol chip is connected to a power supply signal input terminal of the backlight power chip, a charging power positive signal input terminal of the charging protocol chip is connected to a charging power positive signal input terminal of the sub-board, and a direct-current power signal input terminal of the charging protocol chip is connected to a direct-current power signal input terminal of the sub-board.

In this solution, the screen power chip, the charging protocol chip, and the speaker power amplifier are moved from the main board to the sub-board, which saves the occupied area on the main board. In addition, signal input terminals of the three circuits are combined and optimized, to reduce a quantity of signals of three circuits passing through the first connection position. Moreover, an output terminal of the charging protocol chip is connected to the USB interface circuit, and the USB interface circuit is usually arranged at a position near the sub-board. Therefore, moving the charging protocol chip to the sub-board can simplify the trace layout of the circuit board, thereby reducing the design complexity of the circuit board.

According to another possible implementation of the first aspect, the target circuit module is the screen power chip, the headset switch switching chip, and the speaker power amplifier, and the screen power chip is the backlight power chip; and control signal input terminals of the backlight power chip, the headset switch switching chip, and the speaker power amplifier are connected, a backlight enable signal input terminal of the backlight power chip is connected to a power supply signal input terminal of the backlight power chip, a power supply signal input terminal of the speaker power amplifier is connected to a power supply signal input terminal of the backlight power chip, an audio positive signal input terminal of the speaker power amplifier is connected to a left channel signal input terminal of the headset switch switching chip, an audio negative signal input terminal is connected to a right channel signal input terminal, and a power supply signal input terminal of the headset switch switching chip is connected to a power supply signal input terminal of the backlight power chip.

In this solution, the screen power chip, the headset switch switching chip, and the speaker power amplifier are moved from the main board to the sub-board, which saves the occupied area on the main board. An output terminal of the headset switch switching chip is connected to the USB interface circuit, and an output terminal of the speaker power amplifier is connected to the speaker. The USB interface circuit and the speaker are usually arranged at positions near the sub-board. Therefore, moving the two circuit modules to the sub-board can simplify the trace layout of the circuit board, thereby reducing the design complexity of the circuit board.

According to still another possible implementation of the first aspect, the screen power chip is an OLED drive chip, and a signal of the OLED drive chip passing through the first connection position is an input signal of the OLED drive chip. In this solution, after the OLED drive chip is moved from the main board to the sub-board, a quantity of signals of the circuit module passing through the first connection position is changed from 7 output signals to 4 input signals. In this way, 3 pins can be directly saved. In addition, the OLED drive chip is moved from the main board to the sub-board, which saves the occupied area on the main board.

According to another possible implementation of the first aspect, the target circuit module is the screen power chip and the speaker power amplifier, and the screen power chip is the OLED drive chip; and a power supply signal input terminal of the speaker power amplifier is connected to a power supply signal input terminal of the OLED drive chip.

In this solution, the screen power chip and the speaker power amplifier are moved from the main board to the sub-board, which further saves the occupied area on the main board. Moreover, the speaker is usually arranged at a position near the sub-board, so that moving the speaker power amplifier to the sub-board can simplify the trace layout of the circuit board, thereby reducing the design complexity of the circuit board.

According to still another possible implementation of the first aspect, the target circuit module includes the motor drive power chip and the screen power chip, and the screen power chip is the OLED drive chip; and a power supply signal input terminal of the motor drive power chip is connected to a power supply signal input terminal of the OLED drive chip. In this solution, the screen power chip and motor drive power chip are moved from the main board to the sub-board, which further saves the occupied area on the main board. In addition, signal input terminals of the two circuits are combined, to reduce a quantity of signals of the two circuits passing through the first connection position.

According to another possible implementation of the first aspect, the target circuit module includes the screen power chip, the motor drive power chip, and the speaker power amplifier, and the screen power chip is the OLED drive chip; and a power supply signal input terminal of the motor drive power chip is connected to a power supply signal input terminal of the OLED drive chip, a power supply signal input terminal of the speaker power amplifier is connected to a power supply signal input terminal of the OLED drive chip, and a control signal input terminal of the speaker power amplifier is connected to a control signal input terminal of the motor drive power chip. In this solution, the three circuit modules are moved from the main board to the sub-board, which further saves the occupied area on the main board. Moreover, the speaker is usually arranged at a position near the sub-board, so that moving the speaker power amplifier to the sub-board can simplify the trace layout of the circuit board, thereby reducing the design complexity of the circuit board.

According to still another possible implementation of the first aspect, the target circuit module includes the screen power chip, the headset switch switching chip, and the speaker power amplifier, and the screen power chip is the OLED drive chip; and a control signal input terminal of the headset switch switching chip is connected to a control signal input terminal of the speaker power amplifier, a power supply signal input terminal of the headset switch switching chip is connected to a power supply signal input terminal of the OLED drive chip, a power supply signal input terminal of the speaker power amplifier is connected to a power supply signal input terminal of the backlight power chip, an audio positive signal input terminal of the speaker power amplifier is connected to a left channel signal input terminal of the headset switch switching chip, and an audio negative signal input terminal is connected to a right channel signal input terminal. In this solution, the screen power chip, the headset switch switching chip, and the speaker power amplifier are moved from the main board to the sub-board, which saves the occupied area on the main board. An output terminal of the headset switch switching chip is connected to the USB interface circuit, and an output terminal of the speaker power amplifier is connected to the speaker. The USB interface circuit and the speaker are usually arranged at positions near the sub-board. Therefore, moving the two circuit modules to the sub-board can simplify the trace layout of the circuit board, thereby reducing the design complexity of the circuit board.

According to another possible implementation of the first aspect, the target circuit module includes the screen power chip and the charging protocol chip, and the screen power chip is the OLED drive chip; and a power supply signal input terminal of the charging protocol chip is connected to a power supply signal input terminal of the OLED drive chip, a charging power positive signal input terminal of the charging protocol chip is connected to a charging power positive signal input terminal of the sub-board, and a direct-current power signal input terminal of the charging protocol chip is connected to a direct-current power signal input terminal of the sub-board.

In this solution, the screen power chip and the charging protocol chip are moved to the sub-board, which saves the occupied area on the main board. Moreover, an output terminal of the charging protocol chip is connected to the USB interface circuit, and the USB interface circuit is usually arranged at a position near the sub-board. Therefore, moving the charging protocol chip to the sub-board can simplify the trace layout of the circuit board, thereby reducing the design complexity of the circuit board.

According to still another possible implementation of the first aspect, the target circuit module includes the screen power chip, the charging protocol chip, and the speaker power amplifier, and the screen power chip is the OLED drive chip; and a power supply signal input terminal of the speaker power amplifier is connected to a power supply signal input terminal of the OLED drive chip, a control signal input terminal of the speaker power amplifier is connected to a control signal input terminal of the charging protocol chip, a power supply signal input terminal of the charging protocol chip is connected to a power supply signal input terminal of the OLED drive chip, a charging power positive signal input terminal of the charging protocol chip is connected to a charging power positive signal input terminal of the sub-board, and a direct-current power signal input terminal of the charging protocol chip is connected to a direct-current power signal input terminal of the sub-board.

In this solution, the screen power chip, the charging protocol chip, and the speaker power amplifier are moved from the main board to the sub-board, which saves the occupied area on the main board. In addition, signal input terminals of the three circuits are combined and optimized, to reduce a quantity of signals of three circuits passing through the first connection position. Moreover, an output terminal of the charging protocol chip is connected to the USB interface circuit, and the USB interface circuit is usually arranged at a position near the sub-board. Therefore, moving the charging protocol chip to the sub-board can simplify the trace layout of the circuit board, thereby reducing the design complexity of the circuit board.

According to another possible implementation of the first aspect, the flexible circuit board is one flexible circuit board, and the flexible circuit board is connected to the screen chip by a connection point.

According to still another possible implementation of the first aspect, the target circuit module includes the motor drive power chip and the speaker power amplifier; a power supply signal input terminal of the motor drive power chip is connected to a power supply signal input terminal of the speaker power amplifier; and a control signal input terminal of the motor drive power chip is connected to a control signal input terminal of the speaker power amplifier. In this solution, the motor drive power chip and the speaker power amplifier are moved from the main board to the sub-board, and signals of the two circuit chips are combined and optimized, which simplifies the trace layout of the circuit board and reduces the design complexity of the circuit board.

According to yet another possible implementation of the first aspect, the target circuit module includes the screen power chip, the headset switch switching chip, and the motor drive power chip, and the screen power chip is the backlight power chip; control signal input terminals of the backlight power chip and the headset switch switching chip are connected to a control signal input terminal of the motor drive power chip; a backlight enable signal input terminal of the backlight power chip is connected to the power supply signal input terminal; a power supply input terminal of the headset switch switching chip is connected to a power supply signal input terminal of the screen power chip; and a power supply input terminal of the motor drive power chip is connected to a power supply signal input terminal of the screen power chip.

According to another possible implementation of the first aspect, the target circuit module includes the screen power chip, the headset switch switching chip, and the motor drive power chip, and the screen power chip is the OLED drive chip; a control signal input terminal of the headset switch switching chip is connected to a control signal input terminal of the motor drive power chip, and a power supply input terminal of the headset switch switching chip is connected to a power supply input terminal of the OLED drive chip; and a power supply input terminal of the motor drive power chip is connected to a power supply input terminal of the OLED drive chip.

According to still another possible implementation of the first aspect, the electronic device includes a USB interface; the target circuit module includes a screen power chip and a PD charging protocol chip, and the screen power chip is the backlight power chip; a control signal input terminal of the backlight power chip is connected to a control signal input terminal of the PD charging protocol chip, and a backlight enable signal input terminal of the backlight power chip is connected to a power supply signal input terminal of the backlight power chip; and a charging power positive signal input terminal of the PD charging protocol is connected to a power supply positive signal input terminal of the USB interface, and a power supply signal input terminal of the PD charging protocol is connected to a power supply input terminal of the backlight power chip.

According to yet another possible implementation of the first aspect, the electronic device includes a USB interface; the target circuit module includes a screen power chip and a PD charging protocol chip, and the screen power chip is an OLED drive chip; and a charging power positive signal input terminal of the PD charging protocol chip is connected to a power supply positive signal input terminal of the USB interface, and a power supply signal input terminal of the PD charging protocol is connected to a power supply input terminal of the OLED drive chip.

According to another possible implementation of the first aspect, the target circuit module includes the motor drive power chip; and a power supply signal input terminal of the motor drive power chip is connected to a power supply signal input terminal of the screen power chip, and a control signal input terminal of the motor drive power chip is connected to a control signal input terminal of the PD charging protocol chip.

According to still another possible implementation of the first aspect, the electronic device includes a USB interface; the target circuit module includes the speaker power amplifier and the PD charging protocol chip; and a charging power positive signal input terminal of the PD charging protocol chip is connected to a positive power signal input terminal of the USB interface, a power supply signal input terminal of the PD charging protocol chip is connected to a power supply signal input terminal of the speaker power amplifier, and a control signal input terminal of the PD charging protocol chip is connected to a control signal input terminal of the speaker power amplifier.

According to another possible implementation of the first aspect, the electronic device includes a USB interface; the target circuit module includes the motor drive power chip and the PD charging protocol chip; and a control signal input terminal of the motor drive power chip is connected to a control signal input terminal of the PD charging protocol chip, and a charging power positive signal of the PD charging protocol chip is connected to a power supply positive signal input terminal of the USB interface.

According to still another possible implementation of the first aspect, the flexible circuit board is one flexible circuit board, and the flexible circuit board is connected to the screen chip by a connection point.

According to yet another possible implementation of the first aspect, the flexible circuit board includes a first flexible circuit board and a second flexible circuit board. According to another possible implementation of the first aspect, the first flexible circuit board is connected to the main board by the first connection position, the first flexible circuit board is connected to the sub-board by the second connection position, and the first flexible circuit board is configured to transmit signals between the main board and the sub-board and signals between the main board and the screen chip; and the second flexible circuit board is connected to the screen chip by a third connection position, and is connected to the sub-board by a fourth connection position.

According to still another possible implementation of the first aspect, the first connection position is an electric connector.

According to another possible implementation of the first aspect, the electric connector is a 62-pin connector, or a 72-pin connector, or an 82-pin connector.

According to a second aspect, this application further provides an electronic device, including a screen and the circuit board according to any possible implementation of the first aspect.

It should be understood that descriptions of technical features, technical solutions, beneficial effects or similar languages in this application do not imply that all features and advantages can be achieved in any single embodiment. On the contrary, it may be understood that descriptions of features or beneficial effects mean that a particular technical feature, technical solution, or beneficial effect is included in at least one embodiment. Therefore, descriptions of the technical features, technical solutions, or beneficial effects in this specification do not necessarily refer to a same embodiment. Further, the technical features, technical solutions, and beneficial effects described in the embodiments may be combined in any suitable manner. A person skilled in the art understands that the embodiments can be implemented without one or more particular technical features, technical solutions, or beneficial effects of a particular embodiment. In other embodiments, additional technical features and beneficial effects may be further identified in a particular embodiment that does not embody all embodiments.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

In the specification, claims, and accompanying drawings of this application, the terms "first", "second", "third", and so on are intended to distinguish different objects but do not indicate a particular order.

In the embodiments of this application, the term "exemplary" or "for example" is used to represent giving an example, an illustration, or a description. Any embodiment or design scheme described as an "exemplary" or "for example" in the embodiments of this application should not be explained as being more preferred or having more advantages than another embodiment or design scheme. Exactly, use of the term, such as "exemplary" or "for example", is intended to present a related concept in a specific manner.

Figure 1:
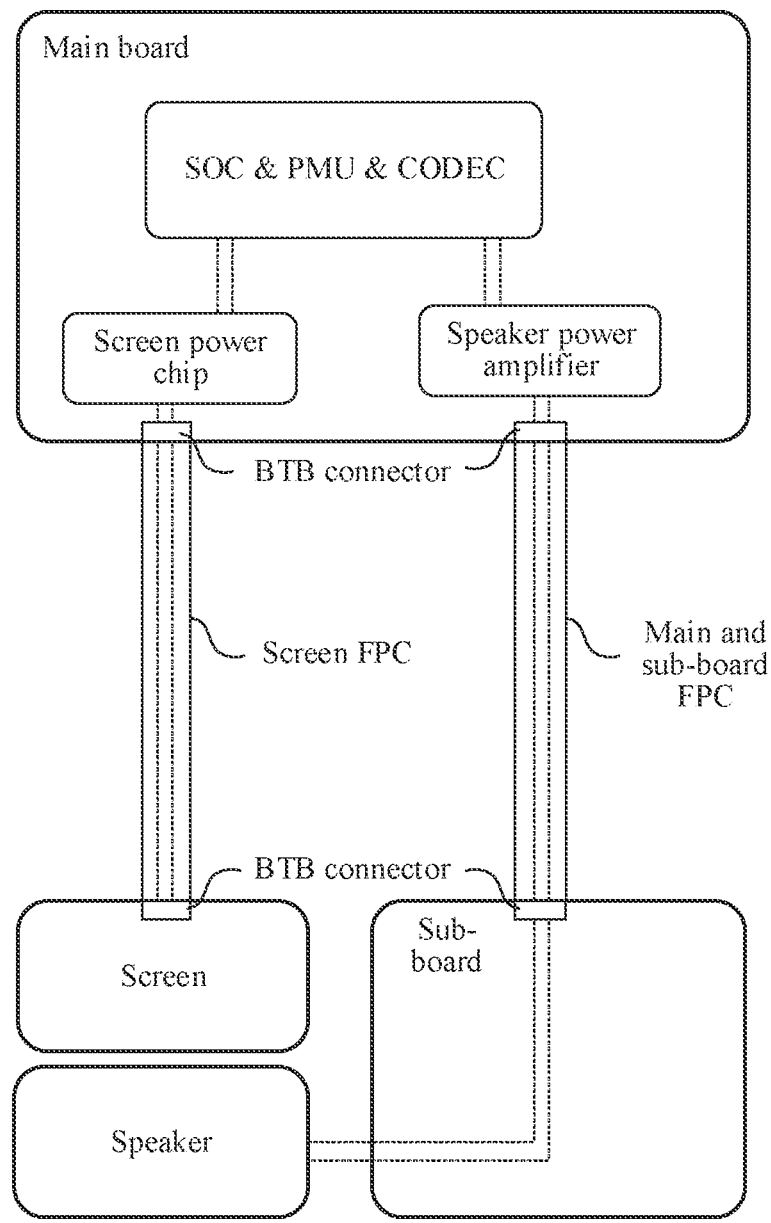
FIG. 1 is a schematic structural diagram of an existing circuit board.

Using a mobile phone as an example, an existing circuit board is shown in FIG. 1, in which a main board is connected to a screen by a screen FPC, and the screen FPC only transmits screen-related signals. In addition, the main board is also connected to a sub-board by a main and sub-board FPC, and the main and sub-board FPC only transmits signals that need to be transmitted between the main board and the sub-board. For example, if a connection position is a board to board (BTB) connector, then a BTB connector connecting to the screen FPC and a BTB connector connecting to the main and sub-board FPC need to be arranged on the main board, that is, two BTB connectors need to be arranged on the main board, occupying a large area of the main board, and hardware costs of the two BTB connectors and the two FPCs are high.

To resolve the foregoing technical problems, the following two solutions of directly combining a screen FPC and a main and sub-board FPC are provided in the related art.

Figure 2A:
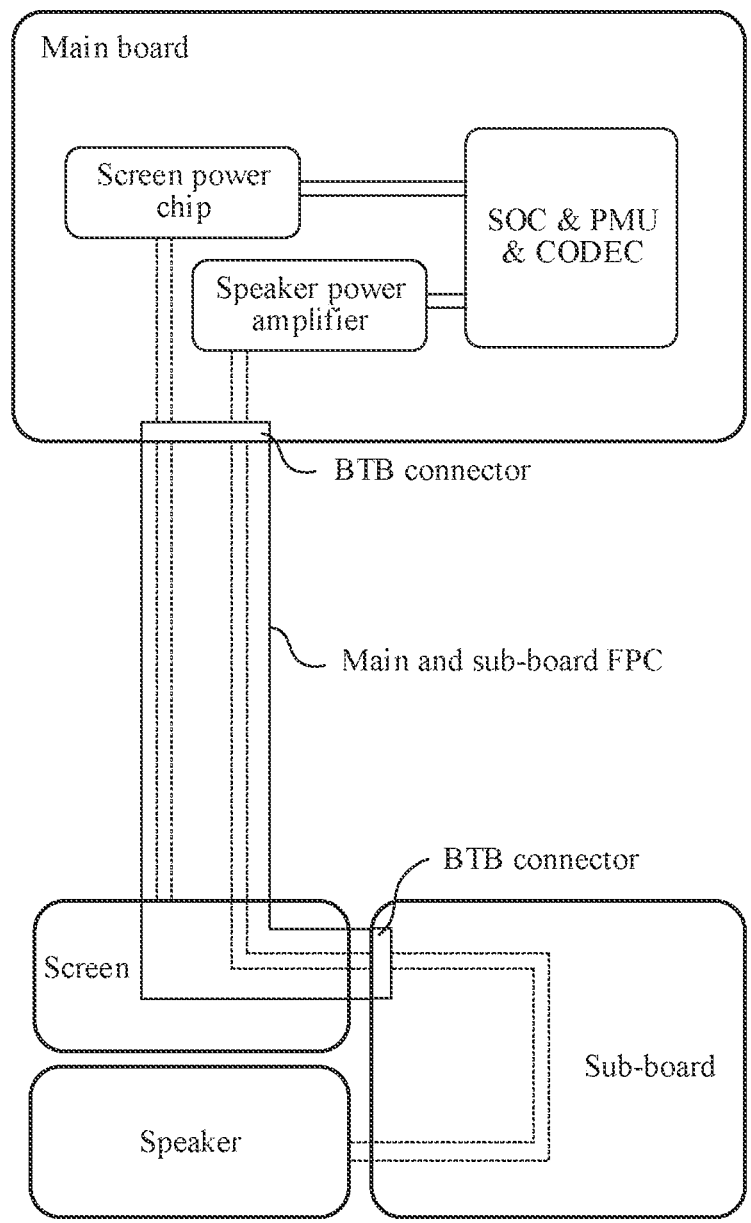
FIG. 2A is a schematic structural diagram of a circuit board combining a screen FPC and a main and sub-board FPC.

FIG. 2A shows a solution of directly combining a main and sub-board FPC into a screen FPC. The combined FPC not only can transmit signals between a main board and a screen chip, but also can transmit signals between the main board and a sub-board. Connectors connecting to the two FPCs on the main board can also be combined into one connector.

Figure 2B:
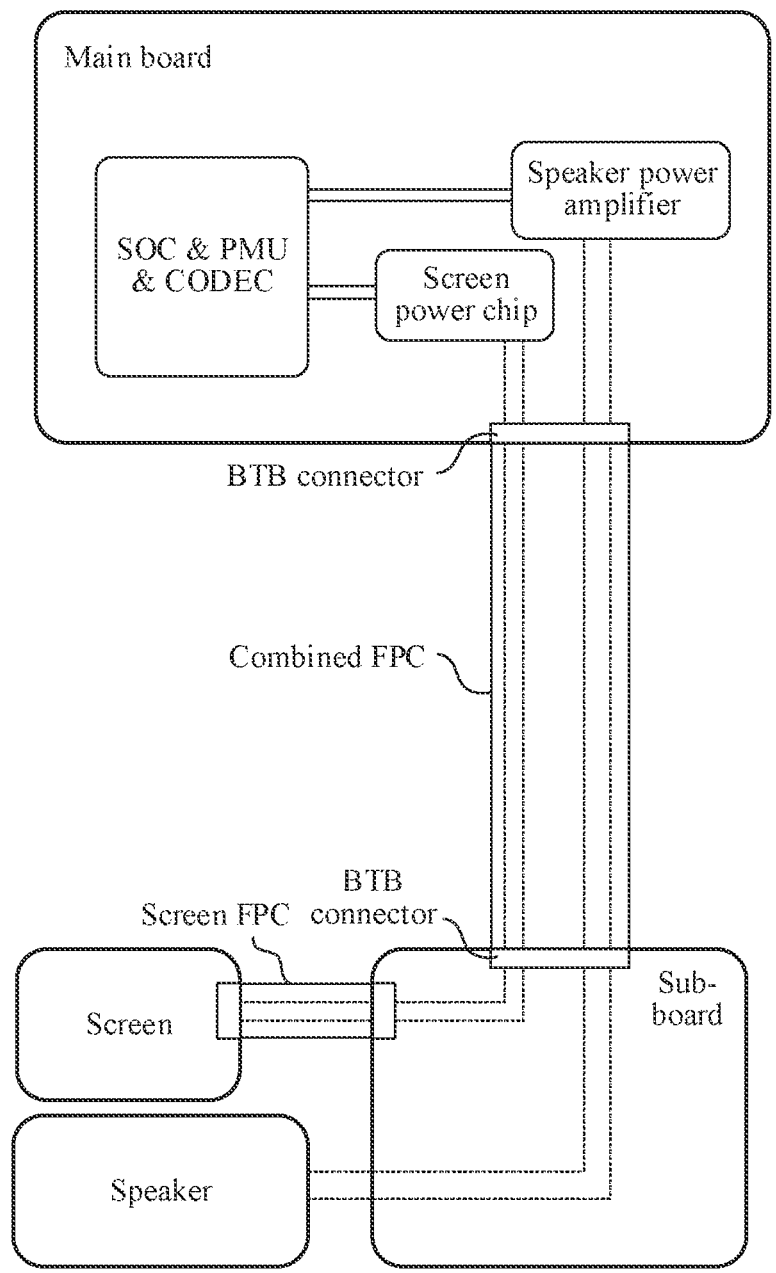
FIG. 2B is a schematic structural diagram of another circuit board combining a screen FPC and a main and sub-board FPC.

FIG. 2B shows a solution of directly combining a screen FPC into a main and sub-board FPC. In this solution, the combined FPC is connected to a main board and a sub-board, and not only can transmit screen-related signals, but also can transmit signals between the main board and the sub-board. A screen chip is connected to the sub-board by the screen FPC, and is configured to transmit the screen-related signals.

It should be noted that circuit modules with different functions are respectively arranged on the main board and the sub-board. In FIG. 2A and FIG. 2B, only a speaker power amplifier and a screen power chip are used as an example for illustration.

However, through researches, it is found by the inventor of this application that there are the following problems in the solutions shown in FIG. 2A and FIG. 2B: Due to a limited quantity of pins of the combined BTB connector, the BTB connector needs to carry signals of an increasing quantity of more complex functional modules.

For example, because a quantity of pins of an organic light-emitting display (OLED) screen module is greater than that of a liquid crystal display (LCD) screen module, and a quantity of pins of a main board BTB connector cannot satisfy the requirement of the OLED screen module, only an LCD screen-based solution can be implemented, and an OLED screen-based solution cannot be implemented.

Moreover, the LCD screen-based solution can only support any one of video transmission interface specification protocols MIPI CPHY and MIPI DPHY, and cannot be compatible with both the protocols because for the compatibility with both the protocols, a relatively large quantity of pins of the BTB connector are occupied.

In addition, an under-screen fingerprint module is usually used together with an OLED screen module. In a case that the OLED screen cannot be implemented, the under-screen fingerprint solution cannot be implemented.

To resolve the foregoing technical problem, this application provides a circuit board. The circuit board is applied to an electronic device including a screen. The circuit board includes a main board, a sub-board, and an FPC. A first connection position is arranged on the main board, and the FPC is connected to the main board by the first connection position. A second connection position is arranged on the sub-board, the FPC is connected to the sub-board by the second connection position, and the FPC is further connected to a screen chip. Moreover, a target circuit module is arranged on the sub-board. The target circuit module may be a circuit module moved from the main board to the sub-board, and signal input terminals of a same type on the target circuit module and other circuit modules on the sub-board are combined and optimized, to reduce a quantity of signals of the target circuit module passing through the first connection position.

The target circuit module may include at least one of the following: a screen power chip, a motor drive power chip, a speaker power amplifier, a charging protocol chip, a headset switch switching chip, a PD charging protocol chip, or a sensor. The sensor includes, but is not limited to, an ambient light sensor, an optical proximity sensor, a magnetic sensor, a barometric pressure sensor, a SAR sensor, an acceleration sensor, a gyroscope, and a gravity sensor.

In view of the above, in this solution, the screen FPC and the main and sub-board FPC are combined into one FPC, so that two connection positions on the main board can be combined into one connection position, which saves the area of the main board occupied by the connection position and improves the utilization of the area of the main board. In addition, quantities of FPCs and connection positions are reduced, so that hardware costs are reduced. Moreover, in this solution, circuit module layouts of the main board and the sub-board are optimized to move some circuit modules on the main board to the sub-board, so as to further perform combination and optimization for input signals of the circuit modules and reduce a quantity of signals of the circuit modules passing through the connection positions, so that the entire circuit board can carry functional modules that are more complex.

An electronic device to which the circuit board provided in this application is applied may be a portable electronic device, for example, a device such as a mobile phone, a tablet computer, a desktop computer, a laptop computer, a notebook computer, an ultra-mobile personal computer (UMPC), a handheld computer, a netbook, a personal digital assistant (PDA), a wearable electronic device, or a smartwatch. A specific form of the electronic device to which the circuit board is applied is not limited in this application.

Figure 3:
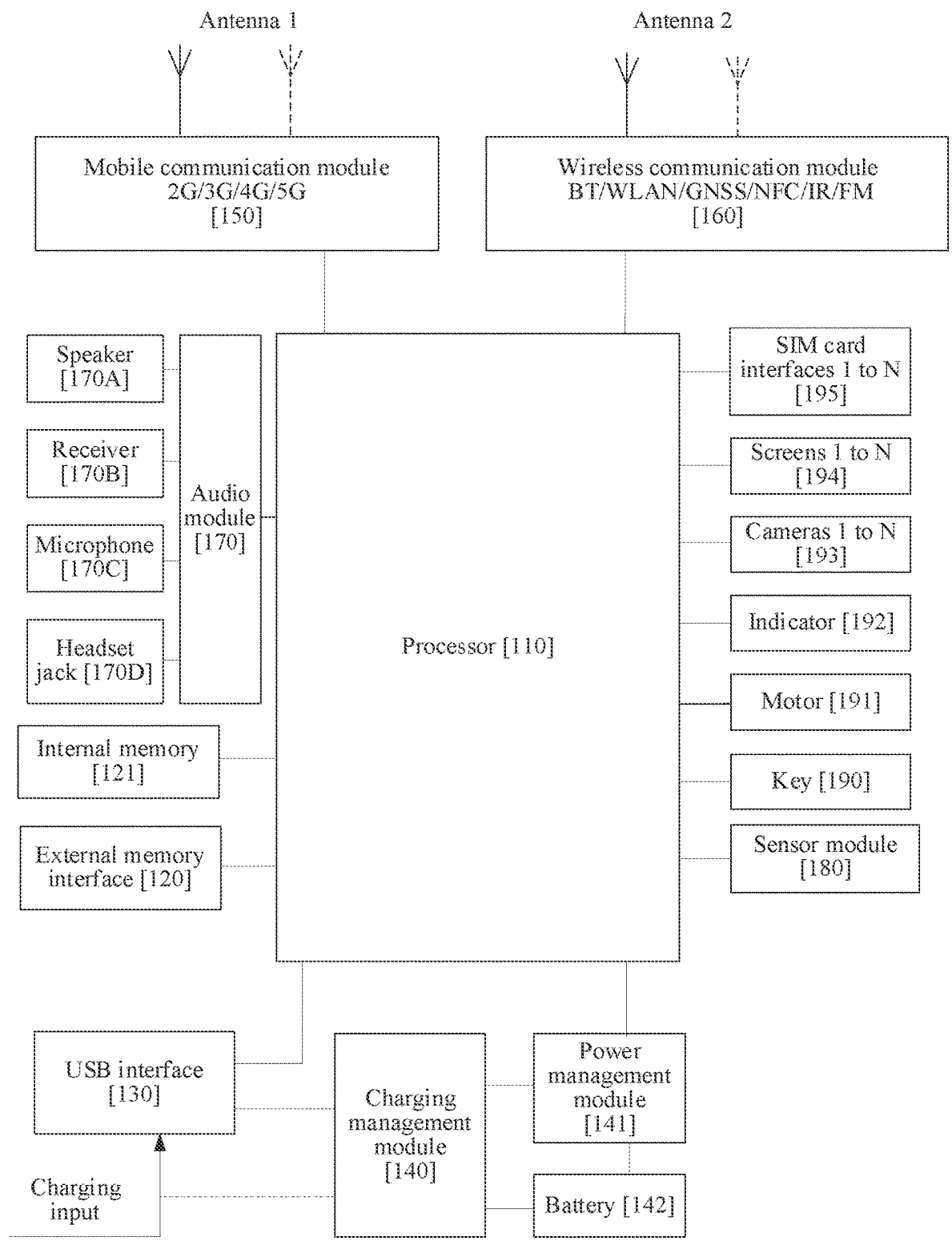
FIG. 3 is a schematic structural diagram of an electronic device according to an embodiment of this application.

FIG. 3 is a schematic structural diagram of an electronic device according to an embodiment of this application.

As shown in FIG. 3, the electronic device may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, and an audio module 170, a speaker 170A, a telephone receiver 170B, a microphone 170C, a headset jack 170D, a sensor module 180, a button 190, a motor 191, an indicator 192, a camera 193, a screen 194, a subscriber identity module (SIM) card interface 195, and the like.

The sensor module 180 may include a sensor such as a pressure sensor, a gyroscope sensor, a barometric pressure sensor, a magnetic sensor, an acceleration sensor, a distance sensor, an optical proximity sensor, a temperature sensor, an ambient light sensor, a bone conduction sensor, and a fingerprint sensor.

It may be understood that the schematic structure in this embodiment constitutes no specific limitation on the electronic device. In some other embodiments, the electronic device may include more or fewer components than those shown in the figure, or some components may be combined, or some components may be split, or components are arranged in different manners. The components in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, and/or a universal serial bus (USB) interface.

The I2C interface is a bidirectional synchronous serial bus and includes a serial data line (SDA) and a serial clock line (SCL). In some embodiments, the processor 110 may include a plurality of groups of I2C buses. The processor 110 may be coupled to the sensor, a charger, a flash light, the camera 193, and the like respectively by using different I2C bus interfaces.

The I2S interface may be configured to perform audio communication. In some embodiments, the processor 110 may include a plurality of groups of I2S buses. The processor 110 may be coupled to the audio module 170 through the I2S bus to implement communication between the processor 110 and the audio module 170. In some embodiments, the audio module 170 may transfer an audio signal to the wireless communication module 160 by using the I2S interface, to implement a function of answering a call by using a Bluetooth headset.

The MIPI is the most mainstream video transmission interface specification in the mobile field. Two protocol clusters MIPI DPHY and MIPI CPHY are applied relatively widely.

The MIPI interface may be configured to connect the processor 110 to peripherals such as the screen 194 and the camera 193. The MIPI includes a camera serial interface (CSI), a display serial interface (DSI), and the like. In some embodiments, the processor 110 communicates with the camera 193 by using the CSI interface, to implement a photographing function of the electronic device. The processor 110 communicates with the screen 194 by using a DSI interface, to implement a display function of the electronic device.

The GPIO interface may be configured by using software. The GPIO interface may either be configured as a control signal or a data signal. In some embodiments, the GPIO interface may be configured to connect the processor 110 to the camera 193, the screen 194, the wireless communication module 160, the audio module 170, the sensor module 180, and the like. The GPIO interface may also be configured as an I2C interface, an I2S interface, a UART interface, an MIPI interface, or the like.

The USB interface 130 is an interface conforming to a USB standard specification, and may be specifically a Mini USB interface, a Micro USB interface, a USB Type-C interface, or the like. The USB interface 130 may be configured to be connected to the charger to charge the electronic device, or may be used for data transmission between the electronic device and the peripheral device, or may be connected to a headset to play audio through the headset. The interface may also be configured to connect to another electronic device such as an AR device.

It may be understood that a schematic interface connection relationship between the modules in this embodiment is merely an example for description, and constitutes no limitation on the structure of the electronic device. In some other embodiments of this application, the electronic device may alternatively use an interface connection manner different from that in the foregoing embodiment, or use a combination of a plurality of interface connection manners.

The power management module 141 is configured to connect to the battery 142, the charging management module 140, and the processor 110. The power management module 141 receives an input of the battery 142 and/or the charging management module 140, to supply power to other components on the circuit board. The power management module 141 may be further configured to monitor parameters such as a battery capacity, a battery cycle count, and a battery state of health (electric leakage and impedance). In some other embodiments, the power management module 141 may be alternatively configured in the processor 110. In some other embodiments, the power management module 141 and the charging management module 140 may further be configured in the same device.

A wireless communication function of the electronic device may be implemented by using the antenna 1, the antenna 2, the mobile communication module 150, the wireless communication module 160, the modem processor, the baseband processor, and the like.

The antenna 1 and the antenna 2 are configured to transmit or receive an electromagnetic wave signal. Each antenna of the electronic device may be configured to cover one or more communication frequency bands. Different antennas may also be multiplexed to improve utilization of the antennas.

The mobile communication module 150 may provide a solution to wireless communication such as 2G/3G/4G/5G applied to the electronic device. In some embodiments, at least some functional modules of the mobile communication module 150 may be arranged in the processor 110. In some embodiments, at least some functional modules of the mobile communication module 150 and at least some modules of the processor 110 may be arranged in a same component.

The wireless communication module 160 may provide a solution for wireless communication including a wireless local area network (WLAN) (such as a wireless fidelity (Wi-Fi) network), Bluetooth (BT), and a global navigation satellite system (GNSS), frequency modulation (FM), a near field communication (NFC) technology, an infrared (IR) technology, and the like to be applied to the electronic device. The wireless communication module 160 may be one or more components into which at least one communication processing module is integrated.

In some embodiments, the antenna 1 and the mobile communication module 150 of the electronic device are coupled, and the antenna 2 and the wireless communication module 160 of the electronic device are coupled, so that the electronic device can communicate with a network and another device by using a wireless communication technology. The wireless communication technology may specifically include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device implements a display function by using the GPU, the screen 194, the application processor, and the like. The GPU is a microprocessor for image processing, and is connected to the screen 194 and the application processor. The GPU is configured to perform mathematical and geometric calculation, and is configured to render an image. The processor 110 may include one or more GPUs, and execute program instructions to generate or change display information.

The screen 194 is configured to display an image, a video, and the like. The screen 194 includes a display panel. The display panel may be an LCD, an OLED, an active-matrix organic light-emitting diode (AMOLED), a flexible light-emitting diode (FLED), a mini LED, a micro LED, a micro-OLED, a quantum dot light emitting diode (QLED), or the like. In some embodiments, the electronic device may include one or N screens 194, where N is a positive integer greater than 1.

The electronic device may implement a photographing function by using the ISP, the camera 193, the video codec, the GPU, the screen 194, the application processor, and the like. The ISP is configured to process data fed back by the camera 193. The ISP may further optimize parameters such as exposure and a color temperature of a photographing scene. In some embodiments, the ISP may be arranged in the camera 193. The camera 193 is configured to capture a static image or a video. In some embodiments, the electronic device may include 1 or N cameras 193, where N is a positive integer greater than 1.

The external memory interface 120 may be configured to be connected to an external storage card such as a micro SD card, to expand a storage capability of the electronic device. The external storage card communicates with the processor 110 by using the external memory interface 120, to implement a data storage function. For example, a file, such as music or a video, is stored in the external storage card.

The internal memory 121 may be configured to store computer executable program code, and the executable program code includes instructions. The processor 110 runs the instruction stored in the internal memory 121, to perform various function applications and data processing of the electronic device.

The electronic device may use the audio module 170, the speaker 170A, the telephone receiver 170B, the microphone 170C, the headset jack 170D, the application processor, and the like, to implement an audio function, for example, music play back or recording.

The audio module 170 is configured to convert digital audio information into an analog audio signal output, and is further configured to convert an analog audio input into a digital audio signal. The audio module 170 may be further configured to encode and decode an audio signal. In some embodiments, the audio module 170 may be arranged in the processor 110, or some functional modules of the audio module 170 are arranged in the processor 110.

The speaker 170A, also referred to as a "loudspeaker", is configured to convert an audio electrical signal into a sound signal. The electronic device may be used to listen to music or answer a call in a hands-free mode by using the speaker 170A.

The receiver 170B, also referred to as a "handset", is configured to convert an audio electrical signal into a sound signal. When the electronic device is configured to answer a call or receive voice information, the telephone receiver 170B may be put close to a human ear to receive a voice.

The microphone 170C, also referred to as a "mic" and a "mike", is configured to convert a sound signal into an electrical signal. When making a call or sending voice information, a user may make a sound near the microphone 170C through the mouth of the user, to input a sound signal into the microphone 170C. At least one microphone 170C may be arranged in the electronic device. In some other embodiments, two microphones 170C may be arranged in the electronic device, to acquire a sound signal and implement a noise reduction function. In some other embodiments, three, four, or more microphones 170C may be arranged in the electronic device, to acquire a sound signal, implement noise reduction, recognize a sound source, implement a directional sound recording function, and the like.

The headset jack 170D is configured to be connected to a wired headset. The headset jack 170D may be a USB interface 130, or may be a 3.5 mm open mobile electronic device platform (open mobile terminal platform, OMTP) standard interface, or a cellular telecommunications industry association of the USA (CTIA) standard interface.

The key 190 includes a power key, a volume key, and the like. The key 190 may be a mechanical key, or a touch-type key. The electronic device may receive a key input, and generate a key signal input related to user setting and function control of the electronic device.

The motor 191 may generate a vibration prompt. The motor 191 may be configured to provide a vibration prompt for an incoming call, and may be further configured to provide a touch vibration feedback. For example, touch operations performed on different applications (for example, photo taking and audio playing) may correspond to different vibration feedback effects. For touch operations performed on different areas of the screen 194, the motor 191 may also correspond to different vibration feedback effects. Different application scenarios (for example, a time prompt, information receiving, an alarm clock, and a game) may also correspond to different vibration feedback effects. A touch vibration feedback effect may be further customized.

The indicator 192 may be an indicator light, and may be configured to indicate a charging state or a battery change, or may be further configured to indicate a message, a missed call, a notification, or the like.

The SIM card interface 195 is configured to connect to a SIM card. The electronic device may support one or N SIM card interfaces, N being a positive integer greater than 1. The SIM card interface 195 may support a nano-SIM card, a micro-SIM card, a SIM card, and the like. A plurality of cards may all be inserted into the same SIM card interface 195. The plurality of cards may be of the same type or different types. The SIM card interface 195 may be compatible with different types of SIM cards. The SIM card interface 195 may also be compatible with an external memory card.

Specific embodiments of the circuit board of this application are described in detail with reference to accompanying drawings.

Embodiment 1: Move a Screen Power Chip and a Speaker Power Amplifier from a Main Board to a Sub-Board As shown in FIG. 4, the speaker power amplifier and the screen power chip are moved from the main board to the sub-board, and the main and sub-board FPC is combined into the screen FPC.

A first BTB connector is arranged on the main board, and the FPC is connected to the main board by the first BTB connector. In some embodiments, the first BTB connector is a snap-fit connector, including a fastener and a seat body that match each other. The fastener is fixed at one end of the FPC connecting to the main board, the seat body is welded to the main board, and the fastener is fastened to the seat body to connect the FPC to the main board. A second BTB connector is arranged on the sub-board, and the FPC is connected to the sub-board by the second BTB connector. The structure and connection principle of the second BTB connector are the same as those of the first BTB connector. For example, a fastener is fixed at an end of the FPC connecting to the sub-board, and a seat body is fixed on the sub-board.

This application is described by using as an example in which the connection position is a BTB connector. In other embodiments, the BTB connector may also be replaced by other types of connectors such as zero insertion force (ZIF)-type connectors. Alternatively, a connection form of the connector is not limited. The connection may also be implemented by using a crimping method (for example, FOF or FOB). A specific type of the connection position is not limited in this application.

Figure 4:
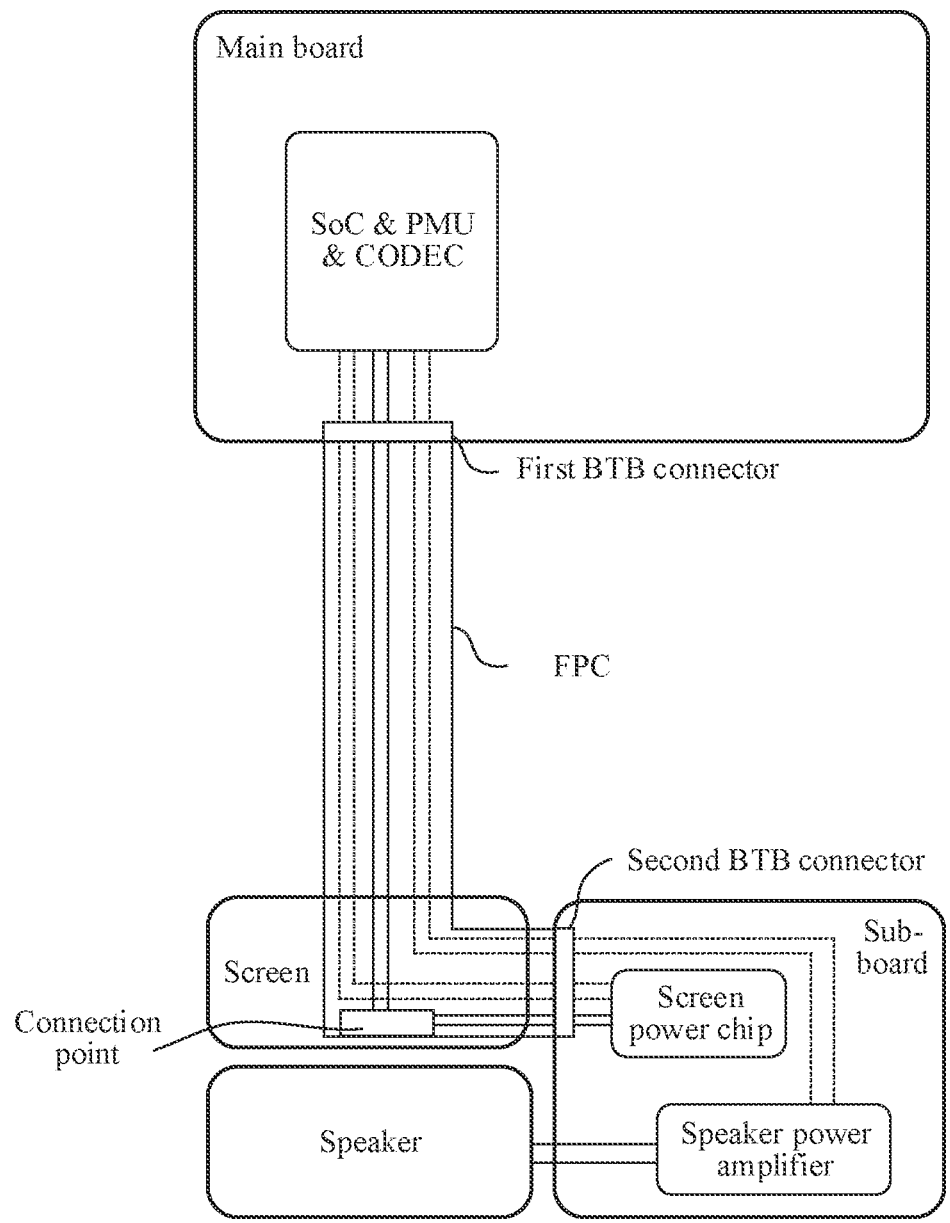
FIG. 4 to FIG. 35 are respectively schematic structural diagrams of circuit boards corresponding to different embodiments according to an embodiment of this application.

As shown in FIG. 4, the FPC is one FPC. One end of the FPC is connected to the main board, and an other end is connected to the sub-board. In addition, the FPC is also connected to the screen chip. A connection point is arranged in a part of the FPC transmitting signals between the main board and the screen chip, and the FPC is connected to the screen chip by the connection point. The connection point includes a conductive medium. For example, the connection point can be soldered with a corresponding pin of the screen chip.

When the screen chip receives a signal sent by the main board, the signal is transmitted to the pin of the screen chip through the first BTB connector, the FPC, and the foregoing connection point. Conversely, when the screen chip sends a signal to the main board, the signal is transmitted to a corresponding chip, for example, a system-level chip SOC, a power supply management unit (power management unit, PMU), or a codec, on the main board sequentially through the connection point, the FPC, and the first BTB connector.

It should be noted that for the convenience of drawing, only some signal lines rather than all signal lines are shown in the accompanying drawings. Therefore, a quantity of signal lines in the accompanying drawings should not limit the circuit board of this application.

The screen power chip is a drive power supply of the screen chip. In an application scenario, if the screen is an LCD, the screen power chip is a backlight power chip, which provides a drive power supply for a backlight source of the LCD, and controls a liquid crystal flipping direction, to make the LCD implement display. In another application scenario, if the screen is an OLED, the screen power chip is an OLED drive chip, which provides a drive power supply for the OLED.

The speaker power amplifier is a power amplification circuit module of a speaker. A sound signal is subjected to power amplification performed by the speaker power amplifier and then transmitted to the speaker.

The sound signal in this application may be a digital signal or an analog signal. An analog SPK PA (speaker power amplifier) is an analog power amplifier configured to process an analog sound signal, and a SMART PA is a digital power amplifier configured to process a digital sound signal.

The screen power chip and the power amplifier are moved from the main board to the sub-board, a signal of the two circuit modules passing through the first BTB connector are changed from an original output signal to an input signal. As shown in FIG. 2A and FIG. 2B, when the two circuit modules are arranged on the main board, output signals of the two circuit modules are transmitted to the sub-board through the first BTB connector and then FPC, and then, are transmitted to the screen chip and the speaker. After the two circuit modules are moved to the sub-board, as shown in FIG. 4, a signal outputted by a chip on the main board is transmitted to the speaker power amplifier and the screen power chip through the first BTB connector and the FPC. A signal passing through the first BTB connector is an input signal of the two circuit modules.

① Move a Backlight Power Chip and an Analog SPK PA from a Main Board to a Sub-Board In an application scenario, if the screen is an LCD, the screen power chip is a backlight power chip, and the speaker power amplifier is an analog SPK PA.

Table 1 shows descriptions of combination and optimization of signals passing through the main board BTB connector (that is, the first BTB connector) after the backlight power chip and the analog SPK PA are moved from the main board to the sub-board:

TABLE 1

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| Backlight power chip | LEDA | 7 | 7 (4 after combination) | VPH-PWR | System total power supply signal | |
| | LED1- | | | VPH-PWR | System total power supply signal | |
| | LED2- | | | SDA1 | Control signal, I2C signal | Used together with SDA2 and SCL2 in analog SPK PA, to save 2 pins |
| | LED3- | | | SCL1 | | |
| | LED4- | | | LCD_EN | Backlight enable signal | Connected to VPH-PWR or default pull-up power supply, to save 1 pin |
| | VSP | | | VSP_EN | Positive bias enable signal | |
| | VSN | | | VSN_EN | Negative bias enable signal | |
| Analog SPK PA | SPKP | 4 | 6 (5 after combination) | LINOUTP | Platform output audio positive signal | |
| | SPKP | | | LINOUTN | Platform output audio negative signal | |
| | SPKN | | | VPH-PWR | System total power supply signal | Combined with VPH-PWR of backlight power chip, to save 1 pin |
| | SPKN | | | VPH-PWR | System total power supply signal | |
| | | | | SDA2 SCL2 | Control signal, I2C signal | |
| TOTAL | | 11 | 13 (9 after combination) | | | 11 − 9 = 2, saving 2 pins in total |

It can be learned from Table 1 that when the backlight power chip is placed on the main board, output signals passing through the main board BTB connector are 7 signals shown in Table 1, and after the backlight power chip is moved to the sub-board, input signals passing through the main board BTB connector are changed to 13 signals.

Further, an address (for example, 0010001) of a control signal of the backlight power chip does not conflict with an address (for example, 1011000) of a control signal in the analog SPK PA. Therefore, control signals SDA1 and SCL1 of the backlight power chip can be used together with SDA2 and SCL2 in the analog SPK PA, to save 2 BTB connector pins. Moreover, an LCD_EN signal of the backlight power chip can be connected to VPH-PWR or a pull-up power supply, to save 1 pin. In addition, a VPH-PWR signal in the analog SPK PA can be combined with a VPH-PWR signal of the backlight power chip, to save 1 pin. In view of the above, after input signals of the two circuit modules are combined and optimized, the remaining 9 input signals finally pass through the main board BTB connector. Compared with that the two circuit modules are arranged on the main board, a total of 2 pins of the main board BTB connector are saved.

② Move a Backlight Power Chip and a SMART PA from a Main Board to a Sub-Board

In another scenario, the speaker power amplifier may also be a SMART PA. Table 2 shows descriptions of combination and optimization of signals passing through the first BTB connector after the backlight power chip and the SMART PA are moved from the main board to the sub-board:

power chip, to save 1 pin. In addition, a VIO_1.8 V signal of the SMART PA is combined with an antenna switch power supply on the sub-board, to save 1 pin. That is, 11 signals are combined into 9 signals.

In addition, another signal adjustment in this application may be combining and optimizing signals of a same network related to different chips, thereby reducing a quantity of pins occupied by such signals. For example, another signal may

TABLE 2

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| Backlight power chip | LEDA | 7 | 7 (4 after combination) | VPH-PWR | System total power supply signal | |
| | LED1- | | | VPH-PWR | power supply System total signal | |
| | LED2- | | | SDA1 | Control signal, | Used together with SDA2 and SCL2 in SMART PA, to save 2 pins |
| | LED3- | | | SCL1 | I2C signal | |
| | LED4- | | | LCD_EN | Backlight enable signal | Connected to VPH-PWR or default pull-up power supply, to save 1 pin |
| | VSP | | | VSP_EN | Positive bias enable signal | |
| | VSN | | | VSN_EN | Negative bias enable signal | |
| SMART PA | SPKP | 4 | 11 (9 after combination) | VPH-PWR | System total power supply signal | |
| | SPKP | | | VPH-PWR | | Combined with VPH-PWR of backlight power chip, to save 1 pin |
| | SPKN | | | I2S_DI | Digital signal exchanged between SMART PA and SOC chip on main board | |
| | SPKN | | | I2S_DO | | |
| | | | | I2S_CLK | Clock signal | |
| | | | | I2S_SYNC | Synchronization signal | |
| | | | | SDA2 | Control signal, | |
| | | | | SCL2 | I2C signal | |
| | | | | INT | Interrupt signal | |
| | | | | RST | Reset signal | |
| | | | | VIO_1.8 V | Direct-current power signal | Combined with antenna switch power supply on sub-board, to save 1 pin |
| Other adjustment | Other signal adjustment | 2 | | | | |
| TOTAL | | 13 | 18 (13 after combination) | | | Save no pin, but can optimize layout |

Signal changes of signals of the backlight power chip before and after being moved from the main board to the sub-board in Table 2 are the same as those in Table 1, and details are not described herein again.

As shown in Table 2, signals passing through the first BTB connector when the SMART PA is arranged on the main board includes 4 signals shown in Table 2, after the SMART PA is moved from the main board to the sub-board, signals passing through the first BTB connector include 11 signals shown in Table 2, and a VPH-PWR signal of the SMART PA is combined with VPH-PWR of the backlight include a GND signal, a pin of a not connect (NC) network (that is, the BTB connector is not connected to a pin of a network), or the like.

① Move an OLED Drive Chip and an Analog SPK PA from a Main Board to a Sub-Board

In another application scenario, the screen is an OLED. Table 3 shows descriptions of combination and optimization of signals passing through the main board BTB connector after the OLED drive chip and the analog SPK PA are moved from the main board to the sub-board:

TABLE 3

| Target circuit module | Target circuit module on main board | | Optimization solution for target circuit module on sub-board | | | |
|---|---|---|---|---|---|---|
| | Output signal | Quantity of occupied BTB pins | Quantity of occupied BTB pins | Input signal | | Descriptions of combination and optimization |
| OLED drive chip | ELVDD | 7 | 4 | VPH-PWR | System total power supply signal | |
| | ELVDD | | | VPH-PWR | System total power supply signal | |
| | ELVSS | | | VPH-PWR | System total power supply signal | |
| | ELVSS | | | OLED_ERR | OLED error signal | |
| | VIN | | | | | |
| | ELVDD_EN | | | | | |
| | AVDD_EN | | | | | |
| Analog SPK PA | SPKP | 4 | 6 (5 after combination) | LINOUTP | Platform output audio positive signal | |
| | SPKP | | | LINOUTN | Platform output audio negative signal | |
| | SPKN | | | VPH-PWR | System total power supply signal | Combined with VPH-PWR of OLED drive chip, to save 1 pin |
| | SPKN | | | VPH-PWR | System total power supply signal | |
| | | | | SDA2 | Control signal, | |
| | | | | SCL2 | I2C signal | |
| TOTAL | | 11 | 10 (combined into 9) | | | Save 2 pins in total |

It can be learned from Table 3 that when the OLED drive chip is placed on the main board, signals passing through the main board BTB connector are 7 output signals of the OLED drive chip, after the OLED drive chip is moved to the sub-board, signals passing through the main board BTB connector are changed to 4 input signals of the OLED drive chip, and 3 pins can be saved even if the input signals are not combined. After the analog SPK PA is moved from the main board to the sub-board, a quantity of signals is changed from 4 to 6, in which VPH-PWR can be combined with VPH-PWR of the OLED drive chip, to save 1 pin, and finally, after being moved to the sub-board, the analog SPK PA needs to occupy 5 pins of the main board BTB connector. After the two circuit modules, that is, the OLED drive chip and the analog SPK PA, are moved from the main board to the sub-board, 2 pins of the main board BTB connector are saved.

① Move an OLED Drive Chip and a SMART PA from a Main Board to a Sub-Board

In still another scenario, the LCD in the solution corresponding to Table 2 can be replaced by an OLED. Correspondingly, the backlight power chip can be replaced by an OLED drive chip. In this scenario, the OLED power drive chip and the SMART PA are moved from the main board to the sub-board. Comparison of signals passing through the main board BTB connector is shown in Table 4.

As shown in Table 4, after the OLED drive chip is moved from the main board to the sub-board, signals passing through the main board BTB connector are changed from 7 signals to 4 signals, to save 3 pins. The SMART PA is moved from the main board to the sub-board, and signals passing through the main board BTB connector are changed from 4 to 11. The signals of the SMART PA are further combined and optimized. For example, a VPH-PWR signal of the SMART PA and a VPH-PWR signal of the OLED drive chip are combined, to 1 pin, and a direct-current power signal VIO_1.8 V of the SMART PA is combined with the antenna switch power supply on the sub-board, to save 1 pin. The 11 signals of the SMART PA are combined into 9 signals. The OLED drive chip and the SMART PA chip have a total of 13 pins. A quantity of pins passing through the BTB connector is not reduced on the whole, but the OLED drive chip is moved from the main board to the sub-board, which save the space of the main board and optimizes the layout of the main board.

Certainly, in other embodiments of this application, it is also acceptable to move only the screen power chip from the main board to the sub-board. For an application scenario in which the screen is an LCD, after the backlight power chip is moved from the main board to the sub-board, a backlight enable signal LCD_EN can be connected to VPH-PWR or a pull-up power supply, which spares 1 pin of the BTB connector, that is, saves 1 pin.

In an application scenario in which the screen is an OLED, the OLED drive chip is moved from the main board to the sub-board, and signals passing through the BTB connector are changed from 7 output signals to 4 input signals. That is, 3 pins of the BTB connector are spared, that is, 3 pins are saved.

TABLE 4

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| OLED drive chip | ELVDD | 7 | 4 | VPH-PWR | System total power supply signal | |
| | ELVDD | | | VPH-PWR | System total power supply signal | |
| | ELVSS | | | VPH-PWR | System total power supply signal | |
| | ELVSS | | | OLED_ERR | OLED error signal | |
| | VIN | | | | | |
| | ELVDD_EN | | | | | |
| | AVDD_EN | | | | | |
| SMART PA | SPKP | 4 | 11 (9 after combination) | VPH-PWR | System total power supply signal | |
| | SPKP | | | VPH-PWR | System total power supply signal | Combined with VPH-PWR of OLED drive chip, to save 1 pin |
| | SPKN | | | I2S_DI | Digital signal exchanged between SMART PA and SOC | |
| | SPKN | | | I2S_DO | | |
| | | | | I2S_CLK | Clock signal | |
| | | | | I2S_SYNC | Synchronization signal | |
| | | | | SDA2 | Control signal, I2C signal | |
| | | | | SCL2 | | |
| | | | | INT | Interrupt signal | |
| | | | | RST | Reset signal | |
| | | | | VIO_1.8 V | Direct-current power supply | Combined with antenna switch power supply on sub-board, to save 1 pin |
| Other adjustment | Other signal adjustment | 2 | | | | |
| TOTAL | | 13 | 18 (13 after combination) | | | Save no pin, but can optimize layout |

On the circuit board provided in this embodiment, the screen FPC and the main and sub-board FPC are combined, so that two BTB connectors on the main board can be combined into one, that is, the first BTB connector, which reduces the area of the main board occupied by the BTB connectors and improves the utilization of the area of the main board. In addition, quantities of FPCs and BTB connectors are reduced, so that hardware costs are reduced. Moreover, in this solution, the circuit modules on the main board are moved to the sub-board, to save the space on the main board. In addition, signals of the circuit modules moved to the sub-board are combined and optimized, to reduce a quantity of signals of the circuit modules passing through the main board BTB connector, so that the main board BTB connector can carry signals of an increasing quantity of more complex circuit modules, thereby enabling the entire circuit board to carry functional modules with more complex functions.

Figure 5:
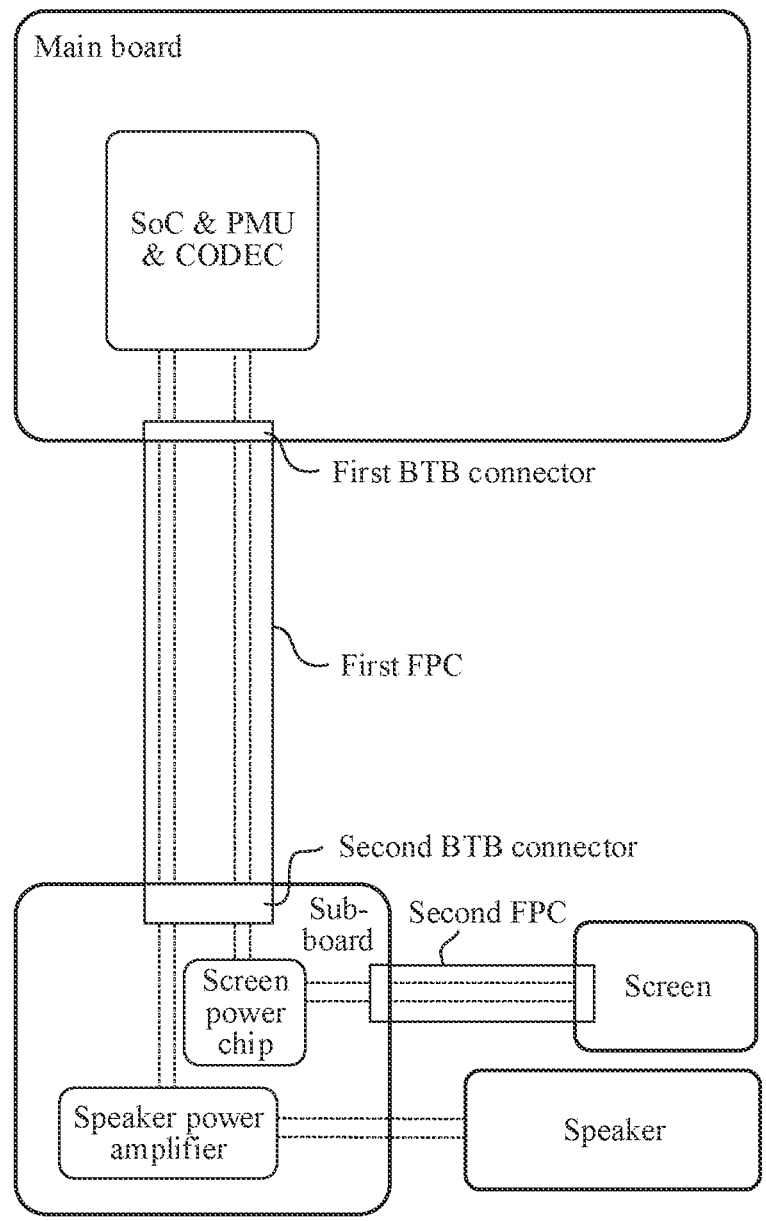

FIG. 4 shows combining the main and sub-board FPC into the screen FPC, to obtain an FPC. In other embodiments, the screen FPC can also be combined into the main and sub-board FPC to obtain an FPC. As shown in FIG. 5, the FPC includes a first FPC and a second FPC.

An end of the first FPC is connected to the main board by a first BTB connector, and an other end of the first FPC is connected to the sub-board by a second BTB connector. That is, the first FPC transmits signals between the main board and the sub-board and signals between the main board and the screen.

The sub-board is connected to the screen chip by the second FPC, and the second FPC transmits screen-related signals to the screen chip. Other circuit modules are the same as those in the embodiment shown in FIG. 4, and details are not described herein again.

On the circuit board provided in this embodiment, the main board is connected to the sub-board by the first FPC, and the sub-board is connected to the screen chip by the second FPC. Only one BTB connector needs to be arranged on the main board, so that the area occupied by the main board is saved. In addition, quantities of FPCs and BTB connectors are reduced, so that hardware costs are reduced. Moreover, the screen power chip and the analog SPK PA are moved from the main board to the sub-board. In addition, input signals of the two circuit modules are combined and optimized, to reduce a quantity of signals of the two circuit modules passing through the first BTB connector, so that the main board BTB connector can carry signals of an increasing quantity of more complex circuit modules, thereby enabling the main board to carry functional modules with more complex functions.

Figure 6:
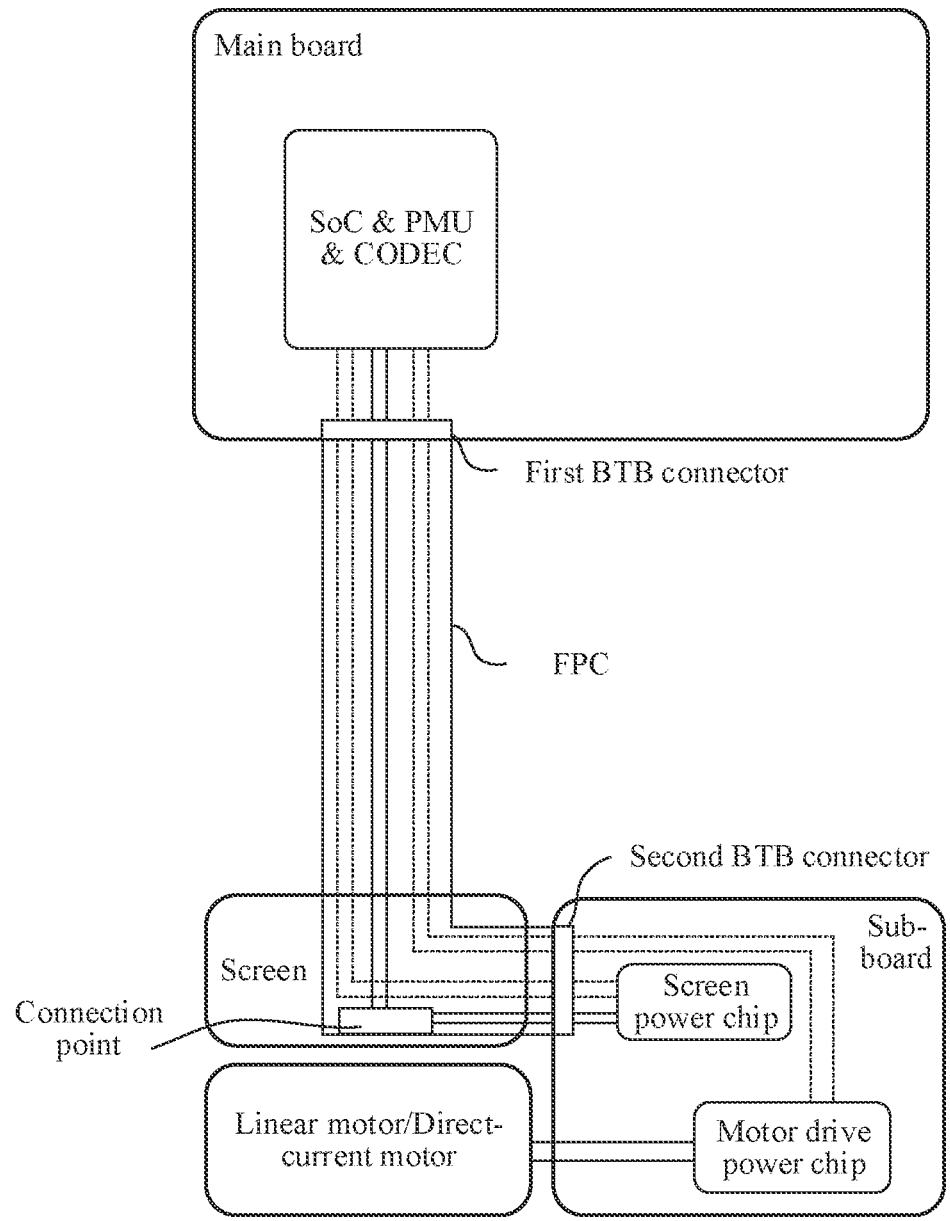

Embodiment 2: Move a Screen Power Chip and a Motor Drive Power Chip from a Main Board to a Sub-Board As shown in FIG. 6, in this embodiment, the analog SPK PA in the embodiment shown in FIG. 4 is replaced by a motor drive power chip, other circuit modules remain unchanged, and details are not described herein again.

① Move a Backlight Power Chip and a Motor Drive Power Supply from a Main Board to a Sub-Board In a scenario in which the screen is an LCD, descriptions of combination and optimization of signals passing through the main board BTB connector after the backlight power chip and the motor drive power supply are moved from the main board to the sub-board are shown in Table 5.

SCL2 of the motor drive power supply, to save 2 pins. LCD_EN of the backlight power chip is connected to VPH-PWR or a default pull-up power supply, to save 1 pin. VPH-PWR of the motor drive power chip is combined with VPH-PWR of the backlight power chip, to save 1 pin. In view of the above, after the backlight power chip and the analog SPK PA are moved to the sub-board, and input signals thereof are combined and optimized, signals of the backlight power chip and the motor drive power chip that finally need to pass through the main board BTB connector are reduced to 8 signals. Compared with the solution in which the two circuit modules placed on the main board, 1 pin is saved.

TABLE 5

| Target circuit module | Output signal | Target circuit module on main board — Quantity of occupied BTB pins | Optimization solution for target circuit module on sub-board — Quantity of occupied BTB pins | Input signal | Descriptions of combination and optimization |
|---|---|---|---|---|---|
| Backlight power chip | LEDA | 7 | 7 (4 after combination) | VPH-PWR | System total power supply signal |
|  | LED1- |  |  | VPH-PWR | System total power supply signal |
|  | LED2- |  |  | SDA1 | Control signal, |
|  | LED3- |  |  | SCL1 | I2C signal — Used together with SDA2 and SCL2 of motor drive power chip, to save 2 pins |
|  | LED4- |  |  | LCD_EN | Backlight enable signal — Connected to VPH-PWR or default pull-up power supply, to save 1 pin |
|  | VSP |  |  | VSP_EN | Positive bias enable signal |
|  | VSN |  |  | VSN_EN | Negative bias enable signal |
| Motor drive power chip | VIBR_P | 2 | 5 (4 after combination) | VPH-PWR | System total power supply signal — Combined with VPH-PWR of backlight power chip, to save 1 pin |
|  | VIBR_N |  |  | SDA2 | Control signal, |
|  |  |  |  | SCL2 | I2C signal |
|  |  |  |  | MOTOR_EN | Enable signal |
|  |  |  |  | MOTOR_INT | Interrupt signal |
| TOTAL |  | 9 | 12 (8 after combination) |  | 9 − 8 = 1, saving 1 pin in total |

As shown in Table 5, when the motor drive power supply is placed on the main board, signals passing through the main board BTB connector are two signals VIBR_P and VIBR_N. After the motor drive power supply is moved to the sub-board, signals passing through the main board BTB connector are changed into the following 5 signals: VPH-PWR, SDA2, SCL2, MOTOR_EN, and MOTOR_INT.

In this embodiment, control signals SDA1 and SCL1 of the backlight power chip are combined with SDA2 and ② Move an OLED Drive Chip and a Motor Drive Power Chip from a Main Board to a Sub-Board In another application scenario, if the screen is an OLED, the screen power chip is an OLED drive chip. In such a scenario, descriptions of combination and optimization of signals passing through the main board BTB connector after the OLED drive chip and the motor drive power chip are moved from the main board to the sub-board are shown in Table 6:

TABLE 6

| Target circuit module on main board | | | Optimization solution for target circuit module on sub-board | | |
|---|---|---|---|---|---|
| Target circuit module | Output signal | Quantity of occupied BTB pins | Quantity of occupied BTB pins | Input signal | Descriptions of combination and optimization |
| OLED drive chip | ELVDD | 7 | 4 | VPH-PWR | System total power supply signal |
| | ELVDD | | | VPH-PWR | System total power supply signal |
| | ELVSS | | | VPH-PWR | System total power supply signal |
| | ELVSS | | | OLED_ERR | OLED error signal |
| | VIN | | | | |
| | ELVDD_EN | | | | |
| | AVDD_EN | | | | |
| Motor drive power chip | VIBR_P | 2 | 5 (4 after combination) | VPH-PWR | System total power supply signal | Combined with VPH-PWR of OLED drive chip, to save 1 pin |
| | VIBR_N | | | SDA2 SCL2 MOTOR_EN MOTOR_INT | Control signal, I2C signal Enable signal Interrupt signal |
| TOTAL | | 9 | 9 (8 after combination) | | 9 − 8 = 1, saving 1 pin in total |

It can be learned from Table 6 that after the OLED drive chip is moved from the main board to the sub-board, a quantity of signals passing through the main board BTB connector is changed from 7 to 4. After the motor drive power chip is moved from the main board to the sub-board, a quantity of signals passing through the main board BTB connector is changed from 2 to 5, in which VPH-PWR can be combined with VPH-PWR of the OLED drive chip, to save 1 pin, and therefore, this solution can save 1 pin finally.

Figure 7:
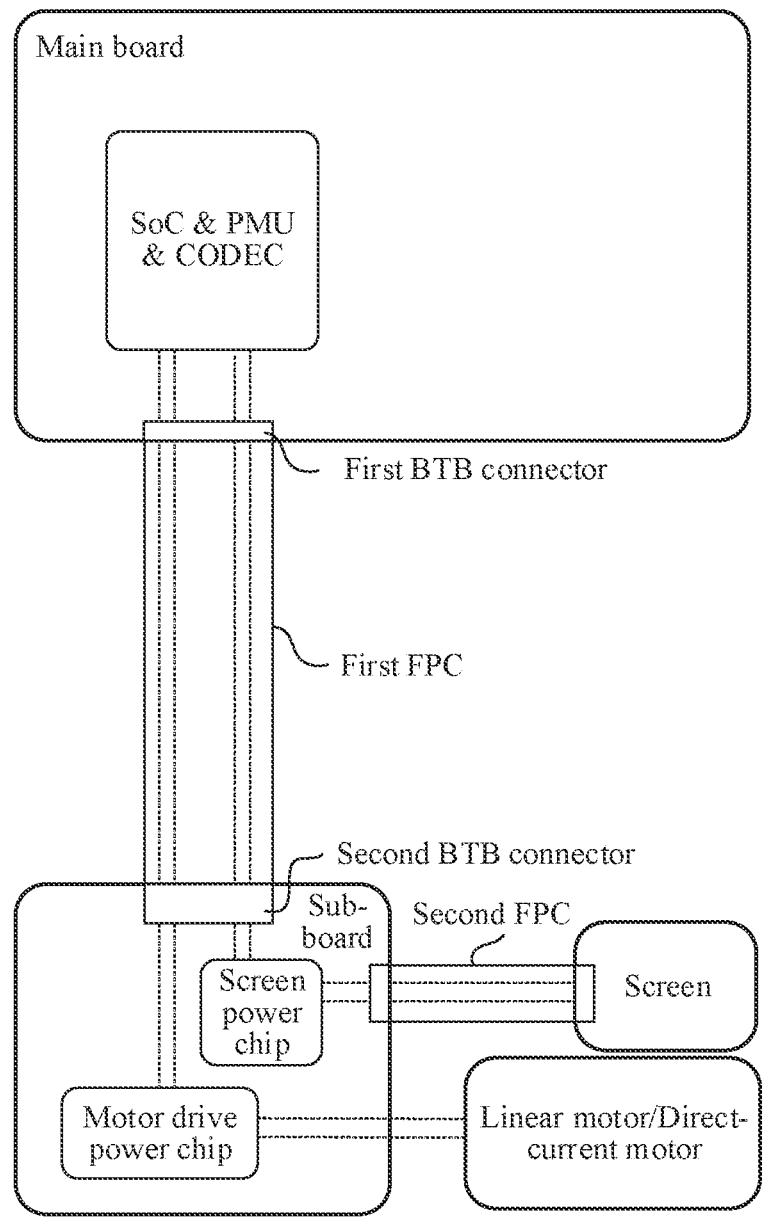

In other embodiments, the screen FPC and the main and sub-board FPC can also be combined into the main and sub-board FPC to obtain an FPC. As shown in FIG. 7, different from the embodiment shown in FIG. 6, the FPC includes a first FPC configured to connect the main board and the sub-board and a second FPC configured to connect the sub-board and the screen chip. In this embodiment, signals between the main board and the screen are first transmitted to the sub-board and then, to the other. The other structures are the same, and details are not described herein again.

On the circuit board provided in this embodiment, the screen power chip and the motor drive power chip are moved from the main board to the sub-board, and input signals of the two circuit modules are combined and optimized, to reduce a quantity of signals of the screen power chip and the motor drive power chip passing through the main board BTB connector, so that the main board BTB connector can carry an increasing quantity of more complex circuit modules, thereby enabling the main board to carry functional modules with more complex functions.

Figure 8:
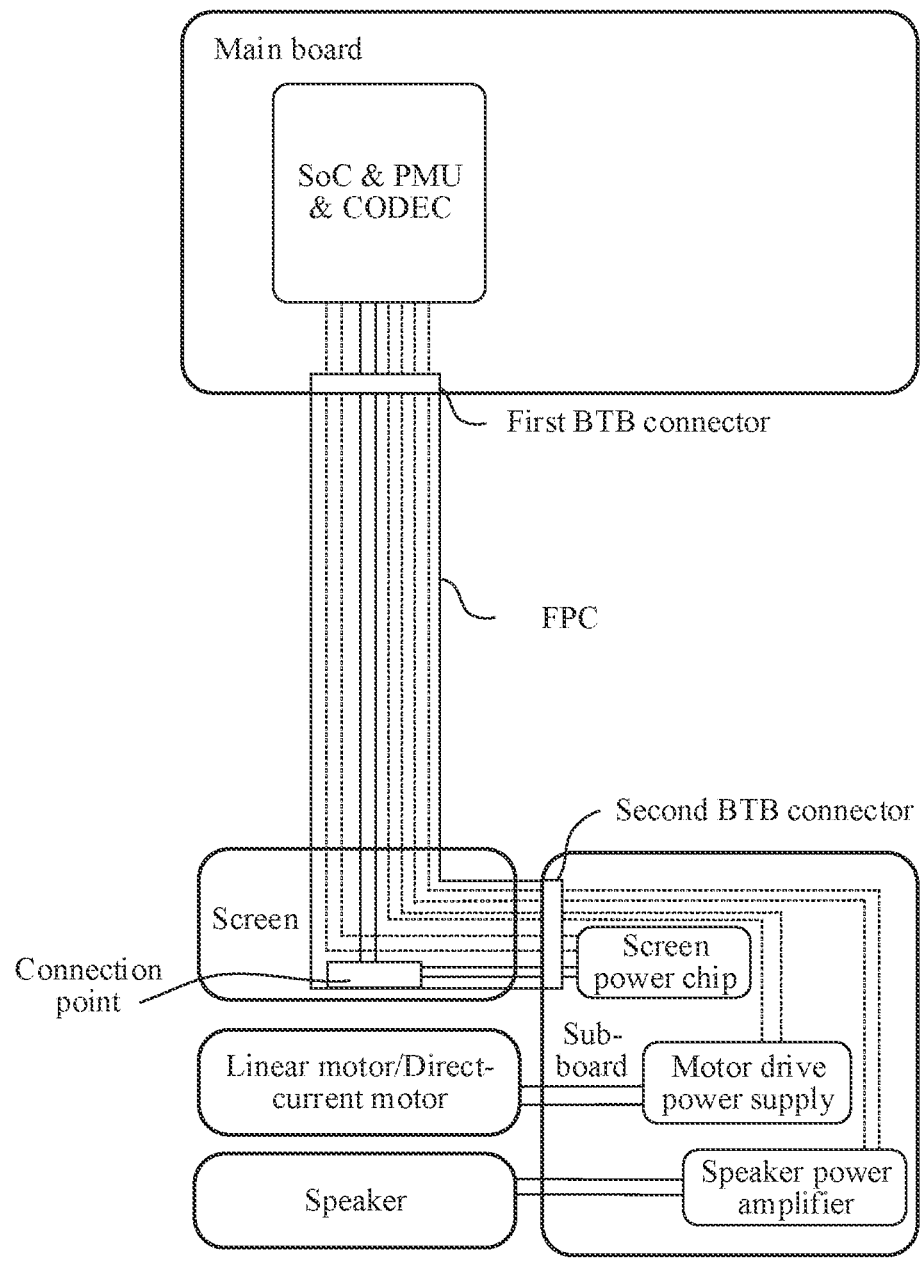

Embodiment 3: Move a Screen Power Chip, a Motor Drive Power Supply, and a Speaker Power Amplifier from a Main Board to a Sub-Board As shown in FIG. 8, based on the embodiment shown in FIG. 6, the speaker power amplifier can be further moved from the main board to the sub-board. That is, the screen power chip, the motor drive power chip, and the speaker power amplifier are moved from the main board to the sub-board.

The FPC transmits signals between the main board and the screen and signals between the main board and the sub-board. Because the screen power chip, the motor drive power chip, and the speaker power amplifier are all arranged on the sub-board, an output signal of the screen power chip is transmitted to the screen chip, an output signal of the motor drive power chip is transmitted to the motor, and an output signal of the speaker power amplifier is transmitted to the speaker.

① Move a Backlight Power Chip, a Motor Drive Power Chip, and an Analog SPK PA from a Main Board to a Sub-Board In a scenario, if the screen is an LCD, the screen power chip is a backlight power chip, and the speaker power amplifier is an analog SPK PA. In such a scenario, descriptions of combination and optimization of signals passing through the main board BTB connector after the backlight power chip, the motor drive power chip, and the analog SPK PA are moved from the main board to the sub-board are shown in Table 7.

TABLE 7

| Target circuit module | Target circuit module on main board | | Optimization solution for target circuit module on sub-board | | | |
|---|---|---|---|---|---|---|
| | Output signal | Quantity of occupied BTB pins | Quantity of occupied BTB pins | Input signal | | Descriptions of combination and optimization |
| Backlight power chip | LEDA | 7 | 7 (4 after combination) | VPH-PWR | System total power supply signal | |
| | LED1- | | | VPH-PWR | System total power supply signal | |
| | LED2- | | | SDA1 | Control signal, | Used together with |
| | LED3- | | | SCL1 | I2C signal | SDA2 and SCL2, to save 2 pins |
| | LED4- | | | LCD_EN | LCD backlight enable signal | Connected to VPH-PWR or default pull-up power supply, to save 1 pin |
| | VSP | | | VSP_EN | Positive bias enable signal | |
| | VSN | | | VSN_EN | Negative bias enable signal | |
| Motor drive power chip | VIBR_P | 2 | 5 (4 after combination) | VPH-PWR | System total power supply signal | Combined with VPH-PWR of backlight power chip, to save 1 pin |
| | VIBR_N | | | SDA2 | Control signal, | |
| | | | | SCL2 | I2C signal | |
| | | | | MOTOR_EN | Enable signal | |
| | | | | MOTOR_INT | Interrupt signal | |
| Analog SPK PA | SPKP | 4 | 6 (3 after combination) | LINOUTP | Platform output audio positive signal | |
| | SPKP | | | LINOUTN | Platform output audio negative signal | |
| | SPKN | | | VPH-PWR | System total power supply signal | Combined with VPH-PWR of backlight power chip, to save 1 pin |
| | SPKN | | | VPH-PWR | System total power supply signal | |
| | | | | SDA3 | Control signal, | Used together with |
| | | | | SCL3 | I2C signal | SDA2 and SCL2, to save 2 pins |
| TOTAL | | 13 | 18 (11 after combination) | | | 13 − 11 = 2, saving 2 pins in total |

It can be learned from Table 7 that the backlight power chip, the motor drive power chip, and the analog SPK PA can share a group of control signals, to save 4 pins, and LCD_EN of the backlight power chip is connected to VPH-PWR or a default pull-up power supply, to save 1 pin. VPH-PWR of the motor drive power chip is combined with VPH-PWR of the backlight power chip, to save 1 pin. One VPH-PWR of the analog SPK PA is combined with VPH-PWR of the backlight power chip, to save 1 pin. Through the foregoing combination and optimization, 2 pins can be finally saved.

② Move a Backlight Power Chip, a Motor Drive Power Chip, and a SMART PA from a Main Board to a Sub-Board In another scenario, the analog SPK PA in Table 7 can be replaced by a SMART PA, that is, descriptions of combination and optimization of signals passing through the main board BTB connector after the backlight power chip, the motor drive power chip, and the SMART PA are moved from the main board to the sub-board are shown in Table 8.

TABLE 8

| Target circuit module | Target circuit module on main board | | Optimization solution for target circuit module on sub-board | | | |
|---|---|---|---|---|---|---|
| | Output signal | Quantity of occupied BTB pins | Quantity of occupied BTB pins | Input signal | | Descriptions of combination and optimization |
| Backlight power chip | LEDA | 7 | 7 (4 after combination) | VPH-PWR | System total power supply signal | |

TABLE 8-continued

| Target circuit module | Target circuit module on main board | | Optimization solution for target circuit module on sub-board | | | |
|---|---|---|---|---|---|---|
| | Output signal | Quantity of occupied BTB pins | Quantity of occupied BTB pins | | Input signal | Descriptions of combination and optimization |
| | LED1− | | | VPH-PWR | System total power supply signal | |
| | LED2− | | | SDA1 | Control signal, | Used together with |
| | LED3− | | | SCL1 | I2C signal | SDA3 and SCL3, to save 2 pins |
| | LED4− | | | LCD_EN | LCD backlight enable signal | Connected to VPH-PWR or default pull-up power supply, to save 1 pin |
| | VSP | | | VSP_EN | Positive bias enable signal | |
| | VSN | | | VSN_EN | Negative bias enable signal | |
| Motor drive power chip | VIBR_P | 2 | 5 (2 after combination) | VPH-PWR | System total power supply signal | Combined with VPH-PWR of backlight power chip, to save 1 pin |
| | VIBR_N | | | SDA2 | Control signal, | Used together with |
| | | | | SCL2 | I2C signal | SDA3 and SCL3, to save 2 pins |
| | | | | MOTOR_EN | Enable signal | |
| | | | | MOTOR_INT | Interrupt signal | |
| Speaker power amplifier (SMART PA) | SPKP | 4 | 11 (9 after combination) | VPH-PWR | System total power supply signal | |
| | SPKP | | | VPH-PWR | System total power supply signal | Combined with VPH-PWR of backlight power module, to save 1 pin |
| | SPKN | | | I2S_DI | Digital signal exchanged between SMART PA and SOC chip on main board | |
| | SPKN | | | I2S_DO | | |
| | | | | I2S_CLK | Clock signal | |
| | | | | I2S_SYNC | Synchronization signal | |
| | | | | SDA3 | Control signal, | |
| | | | | SCL3 | I2C signal | |
| | | | | INT | Interrupt signal | |
| | | | | RST | Reset signal | |
| | | | | VIO_1.8 V | Direct-current power signal | Combined with antenna switch power supply on sub-board, to save 1 pin |
| Other adjustment | Other signal adjustment | 2 | | | | |
| TOTAL | | 15 | 23 (15 after combination) | | | Save no pin, but can optimize layout |

As shown in Table 8, after the backlight power chip, the motor drive power chip, and the SMART PA are moved from the main board to the sub-board, a quantity of signals passing through the main board BTB connector is changed from 15 to 23, and is changed to 15 after signals of the circuit modules are combined and optimized, which does not reduce the quantity of pins as a whole, but after the three circuit modules are moved from the main board to the sub-board, the space on the main board is saved, which optimizes the layout of the main board.

③ Move an OLED Drive Chip, a Motor Drive Power Chip, and a SMART PA from a Main Board to a Sub-Board In another application scenario, if the screen is an OLED, the screen power chip is an OLED drive chip. In such a scenario, descriptions of combination and optimization of signals passing through the main board BTB connector after the OLED drive chip, the motor drive power chip, and the SMART PA are moved from the main board to the sub-board are shown in Table 9:

TABLE 9

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| OLED drive chip | ELVDD | 7 | 4 | VPH-PWR | System total input power signal | |
| | ELVDD | | | VPH-PWR | System total input power signal | |
| | ELVSS | | | VPH-PWR | System total input power signal | |
| | ELVSS | | | OLED_ERR | OLED error signal | |
| | VIN ELVDD_EN AVDD_EN | | | | | |
| Motor drive power chip | VIBR_P | 2 | 5 (4 after combination) | VPH-PWR | System total power supply signal | Combined with VPH-PWR of OLED drive chip, to save 1 pin |
| | VIBR_N | | | SDA2 SCL2 MOTOR_EN MOTOR_INT | Control signal, I2C signal Enable signal Interrupt signal | |
| Analog SPK PA | SPKP | 4 | 6 (3 after combination) | LINOUTP | Platform output audio positive signal | |
| | SPKP | | | LINOUTN | Platform output audio negative signal | |
| | SPKN | | | VPH-PWR | System total power supply signal | Combined with VPH-PWR of OLED drive chip, to save 1 pin |
| | SPKN | | | VPH-PWR | System total power supply signal | |
| | | | | SDA3 | Control signal, I2C signal | Used together with SDA2 and SCL2, to save 2 pins |
| | | | | SCL3 | Control signal, I2C signal | |
| TOTAL | | 13 | 15 (11 after combination) | | | 13 − 11 = 2, saving 2 pins in total |

It can be learned from Table 9 that after the OLED drive chip is moved from the main board to the sub-board, signals passing through the main board BTB connector are changed from 7 output signals to 4 input signals, to save 3 pins. A power supply signal VPH-PWR of the motor drive power chip is combined with VPH-PWR of the OLED drive chip, to save 1 pin. VPH-PWR of the analog SPK PA is combined with VPH-PWR of the OLED drive chip, to save 1 pin. In addition, the control signals SDA3 and SCL3 of the analog SPK PA are used together with SDA2 and SCL2 of the motor drive power chip, to save 2 pins. After the foregoing combination of input signals, 2 pins can be saved finally.

④ Move an OLED Drive Chip, a Motor Drive Power Chip, and a SMART PA from a Main Board to a Sub-Board In still another scenario, the analog SPK PA in Table 9 can be replaced by a SMART PA. In this scenario, descriptions of combination and optimization of signals passing through the main board BTB connector after the OLED drive chip, the motor drive power chip, and the SMART PA are moved from the main board to the sub-board are shown in Table 10.

TABLE 10

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| OLED drive chip | ELVDD | 7 | 4 | VPH-PWR | System total input power signal | |
| | ELVDD | | | VPH-PWR | System total input power signal | |

TABLE 10-continued

| Target circuit module | Target circuit module on main board | | Optimization solution for target circuit module on sub-board | | | |
|---|---|---|---|---|---|---|
| | Output signal | Quantity of occupied BTB pins | Quantity of occupied BTB pins | Input signal | | Descriptions of combination and optimization |
| | ELVSS | | | VPH-PWR | System total input power signal | |
| | ELVSS | | | OLED_ERR | OLED error signal | |
| | VIN | | | | | |
| | ELVDD_EN | | | | | |
| | AVDD_EN | | | | | |
| Motor drive power chip | VIBR_P | 2 | 5 (2 after combination) | VPH-PWR | System total power supply signal | Combined with VPH-PWR of OLED drive chip, to save 1 pin |
| | VIBR_N | | | SDA2 SCL2 | Control signal, I2C signal | Used together with SDA3 and SCL3, to save 2 pins |
| | | | | MOTOR_EN | Enable signal | |
| | | | | MOTOR_INT | Interrupt signal | |
| Speaker power amplifier (SMART PA) | SPKP | 4 | 11 (9 after combination) | VPH-PWR | System total power supply signal | |
| | SPKP | | | VPH-PWR | System total power supply signal | Combined with VPH-PWR of backlight power supply, to save 1 pin |
| | SPKN | | | I2S_DI | Digital signal exchanged between SMART PA and SOC chip on main board | |
| | SPKN | | | I2S_DO | | |
| | | | | I2S_CLK | Clock signal | |
| | | | | I2S_SYNC | Synchronization signal | |
| | | | | SDA3 SCL3 | Control signal, I2C signal | |
| | | | | INT | Interrupt signal | |
| | | | | RST | Reset signal | |
| | | | | VIO_1.8V | Direct-current power supply | Combined with antenna switch power supply on sub-board, to save 1 pin |
| Other adjustment | Other signal adjustment | 2 | | | | |
| TOTAL | | 15 | 23 (15 after combination) | | | Save no pin, but can optimize layout |

As shown in Table 10, after the SMART PA is moved from the main board to the sub-board, signals passing through the main board BTB connector is changed from 4 to 11, and signals of the SMART PA are further combined and optimized, to obtain 9 signals. After the three circuit modules are moved from the main board to the sub-board, a quantity of signals passing through the main board BTB connector remains unchanged, but after the three circuit modules are moved from the main board to the sub-board, the space on the main board is saved, which can optimize the circuit module layout of the main board.

Figure 9:
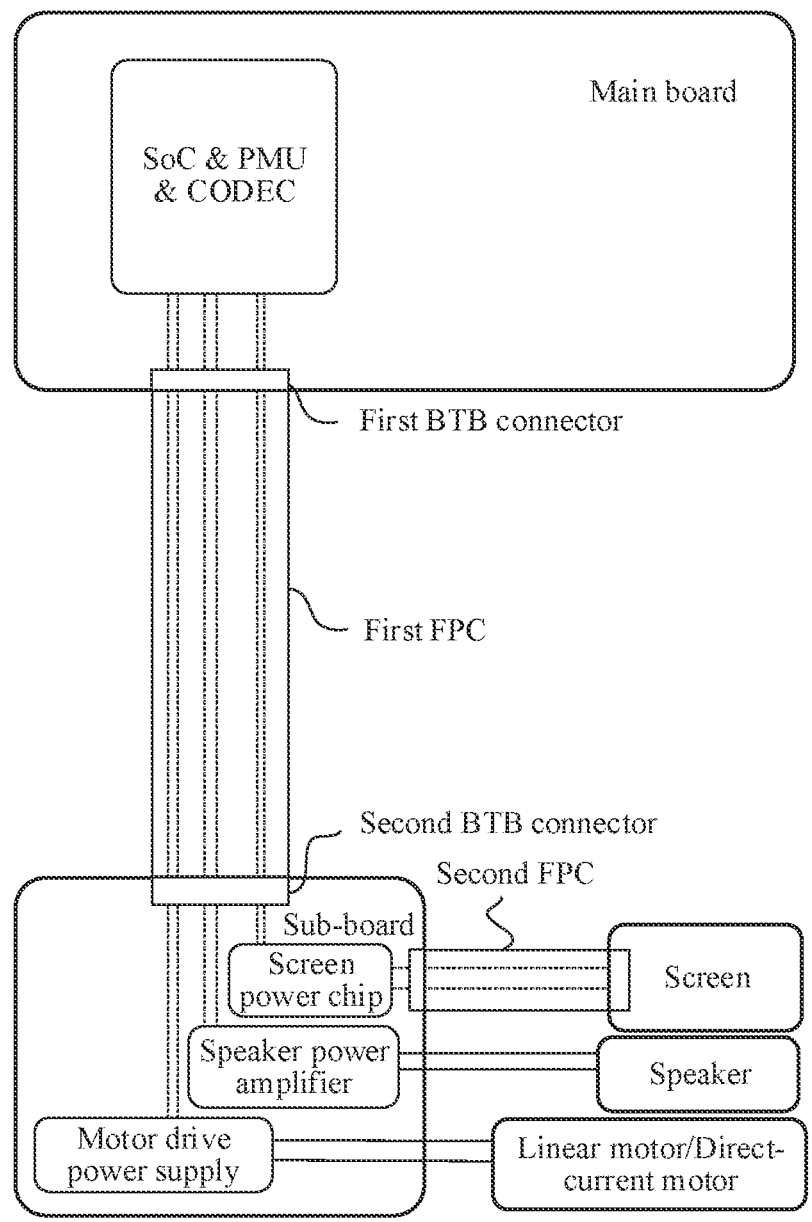

In other embodiments, the screen FPC and the main and sub-board FPC can also be combined into the main and sub-board FPC to obtain an FPC. As shown in FIG. 9, the FPC includes a first FPC and a second FPC, where the first FPC is configured to connect the main board and the sub-board, and the second FPC is configured to connect the sub-board and the screen chip. The first FPC transmits signals between the main board and the screen and signals between the main board and the sub-board. The second FPC transmits only screen-related signals. The other structures are the same as those in FIG. 8, and details are not described herein again.

On the circuit board provided in this embodiment, the screen power chip, the motor drive power chip, and the speaker power amplifier are moved from the main board to the sub-board, and input signals of the three circuit modules are combined and optimized, to reduce a quantity of signals passing through the main board BTB connector, so that the main board BTB connector can carry signals of an increasing quantity of more complex circuit modules, thereby enabling the entire circuit board to carry functional modules that are more complex.

Figure 10:
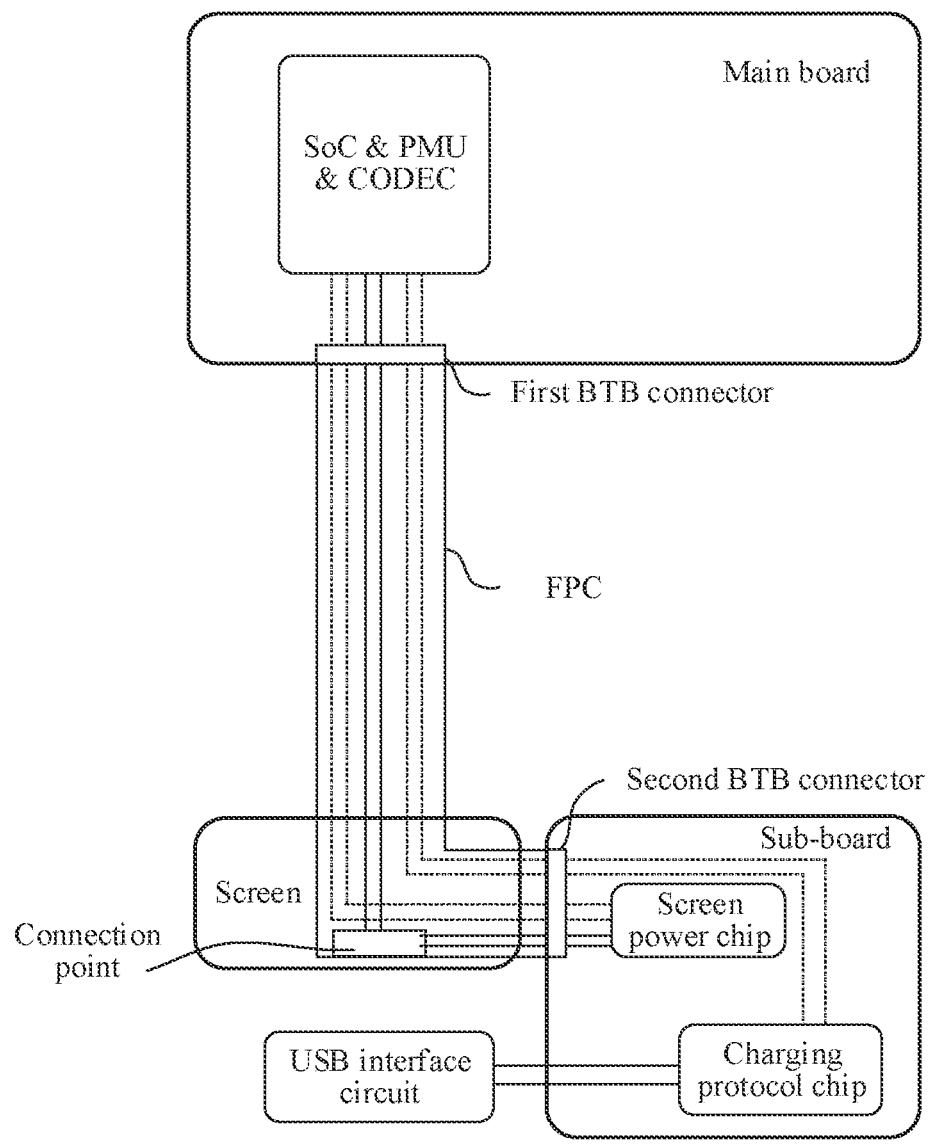

Embodiment 4: Move a Screen Power Chip and a Charging Protocol Chip from a Main Board to a Sub-Board As shown in FIG. 10, the speaker power amplifier in the embodiment shown in FIG. 4 can be replaced by a charging protocol chip. The charging protocol chip is configured to control a charging mode of a charging module. The FPC transmits signals between the main board and the screen and signals between the main board and the sub-board. Input signals of the screen power chip are transmitted to a screen chip, and output signals of the charging protocol chip are transmitted to a USB interface circuit.

① Move a Backlight Power Chip and a Charging Protocol Chip from a Main Board to a Sub-Board In an application scenario in which the screen is an LCD and the screen power chip is a backlight power chip, comparison of signals passing through the main board BTB connector is shown in Table 11.

TABLE 11

| Target circuit module | Target circuit module on main board | | Optimization solution for target circuit module on sub-board | | |
|---|---|---|---|---|---|
| | Output signal | Quantity of occupied BTB pins | Quantity of occupied BTB pins | Input signal | Descriptions of combination and optimization |
| Backlight power chip | LEDA | 7 | 7 (4 after combination) | VPH-PWR | System total power supply signal | |
| | LED1- | | | VPH-PWR | System total power supply signal | |
| | LED2- | | | SDA1 | Control signal, I2C signal | Used together with SDA2 and SCL2 of charging protocol chip, to save 2 pins |
| | LED3- | | | SCL1 | | |
| | LED4- | | | LCD_EN | LCD backlight enable signal | Connected to VPH-PWR or default pull-up power supply, to save 1 pin |
| | VSP | | | VSP_EN | Positive bias enable signal | |
| | VSN | | | VSN_EN | Negative bias enable signal | |
| Charging protocol chip | USB_DP | 2 | 8 (5 after combination) | VPH-PWR | System total power supply signal | Combined with VPH-PWR of backlight power chip, to save 1 pin |
| | USB_DN | | | SDA2 SCL2 | Control signal, I2C signal | |
| | | | | VBUS | Charging power signal | Combined with VBUS signal on USB interface, to save 1 pin |
| | | | | VIO_1.8V | Direct-current power supply | Combined with antenna switch power supply on sub-board, to save 1 pin |
| | | | | EINT | Interrupt signal | |
| | | | | USB_DP | USB data positive signal | |
| | | | | USB_DN | USB data negative signal | |
| TOTAL | | 9 | 15 (9 after combination) | | | Save no pin, but can adjust layout of circuit board |

It can be learned from Table 7 that addresses of the control signals SDA1 and SCL1 of the backlight power chip do not conflict with addresses of the control signals SDA2 and SCL2 of the charging protocol chip. Therefore, SDA1 and SCL1 can be used together with SDA2 and SCL2, which can save 2 pins. In addition, LCD_EN of the backlight power chip is connected to VPH-PWR or a default pull-up power supply, to save 1 pin. VPH-PWR of the charging protocol chip is combined with VPH-PWR of the backlight power chip, to save 1 pin. Since there is a VBUS signal on the sub-board, VBUS of the charging protocol chip is directly combined with VBUS of the USB interface, to save 1 pin. VIO_1.8 V of the charging protocol chip is combined with the antenna switch power supply of the sub-board, to save 1 pin.

By combining and optimizing input signals of the backlight power chip and the charging protocol chip, a quantity of signals of the two chips finally passing through the main board BTB connector is 9, which is the same as a quantity of signals when the backlight power chip and the charging protocol chip are arranged on the main board. However, in this solution, the backlight power chip and the charging protocol chip are moved to the sub-board, which saves the occupied area on the main board.

② Move an OLED Drive Chip and a Charging Protocol Chip from a Main Board to a Sub-Board In another application scenario, the screen is an OLED, and the screen power chip is an OLED drive chip. After the OLED drive chip and the charging protocol chip are moved from the main board to the sub-board, comparison of quantities of signals of the two chips passing through the main board BTB connector is shown in Table 12.

TABLE 12

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| OLED drive chip | ELVDD | 7 | 4 | VPH-PWR | System total power supply signal | |
| | ELVDD | | | VPH-PWR | System total power supply signal | |
| | ELVSS | | | VPH-PWR | System total power supply signal | |
| | ELVSS | | | OLED_ERR | OLED error signal | |
| | VIN ELVDD_EN AVDD_EN | | | | | |
| Charging protocol chip | USB_DP | 2 | 8 (5 after combination) | VPH-PWR | System total power supply signal | Combined with VPH-PWR of OLED drive chip, to save 1 pin |
| | USB_DN | | | SDA2 SCL2 | Control signal, I2C signal | |
| | | | | VBUS | Charging power signal | Combined with VBUS signal on USB interface, to save 1 pin |
| | | | | VIO_1.8V | Direct-current power supply | Combined with antenna switch power supply on sub-board, to save 1 pin |
| | | | | EINT | Interrupt signal | |
| | | | | USB_DP | USB data positive signal | |
| | | | | USB_DN | USB data negative signal | |
| TOTAL | | 9 | 15 (9 after combination) | | | Save no pin, but can adjust layout of circuit board |

It can be learned from Table 12 that after the OLED drive chip is moved from the main board to the sub-board, signals passing through the main board BTB connector are changed from output signals of the module to input signals, and a quantity thereof is changed from 7 to 4, which saves 3 pins. A manner in which input signals of the charging protocol chip are combined and optimized is the same as that in Table 11, and details are not described herein again.

Figure 11:
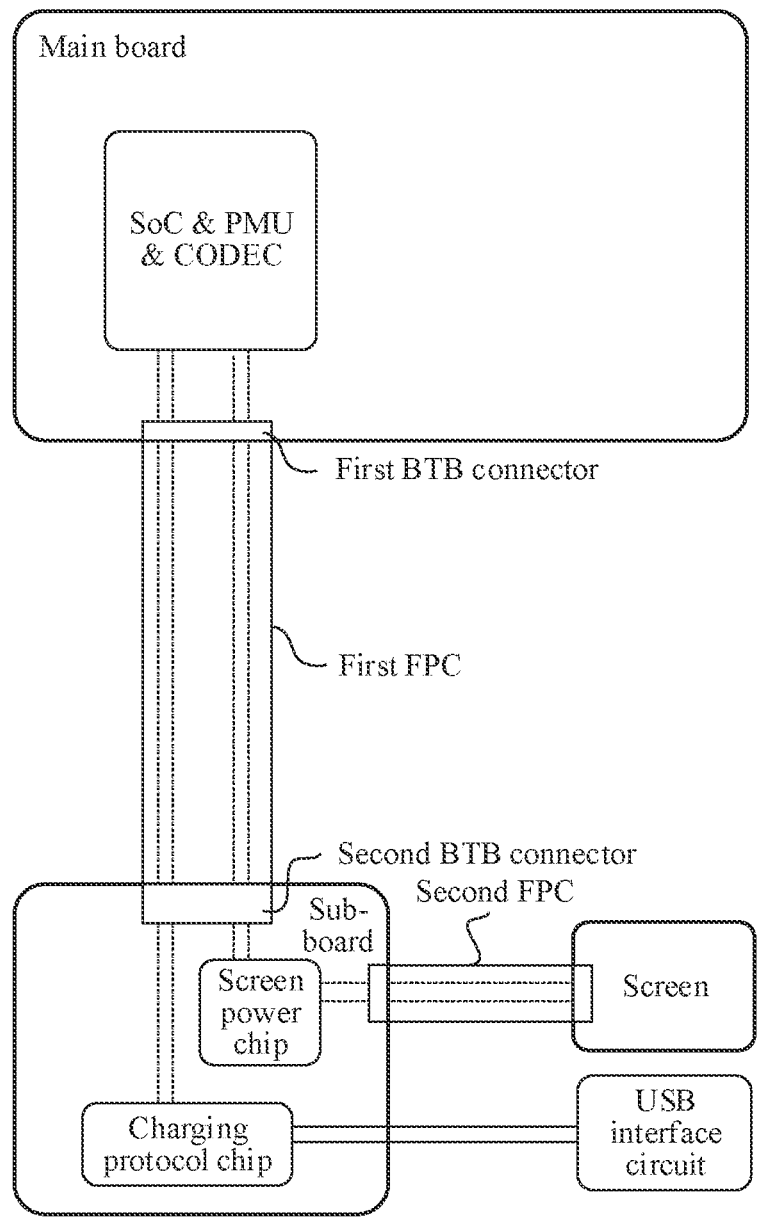

In other embodiments, the screen FPC can also be combined into the main and sub-board FPC to obtain an FPC. As shown in FIG. 11, the FPC includes a first FPC and a second FPC. The first FPC connects the main board and the sub-board, and the second FPC connects the sub-board and the screen chip. The first FPC transmits signals between the main board and the sub-board and signals between the main board and the screen chip. The second FPC transmits signals between the sub-board and the screen chip. The other structures are the same as those in FIG. 10, and details are not described herein again.

On the circuit board provided in this embodiment, the screen power chip and the charging protocol chip are moved from the main board to the sub-board, to save the occupied area on the main board without increasing a quantity of signals passing through the main board BTB connector, so that the main board can carry complex functional modules, which improves the area utilization of the entire circuit board.

Figure 12:
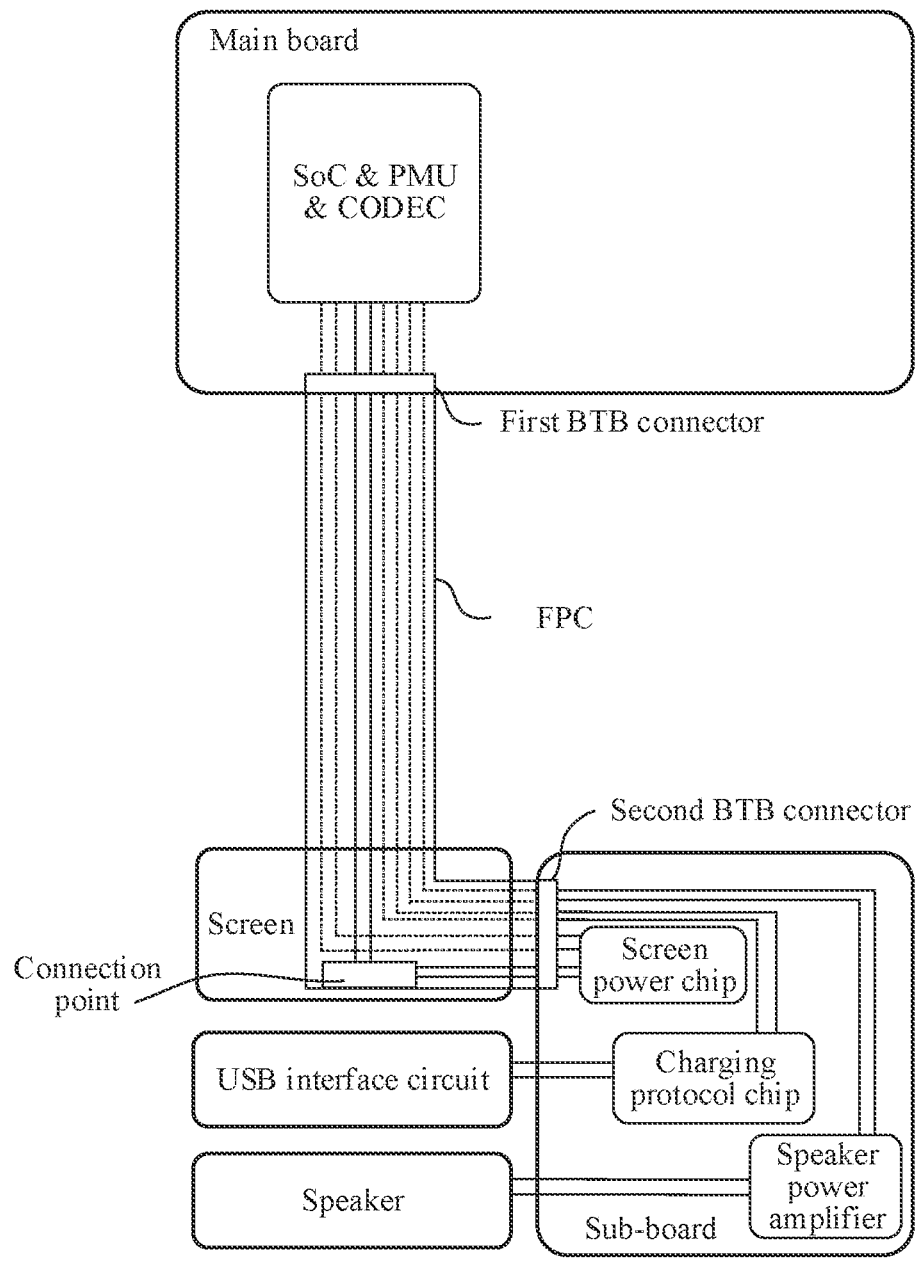

Embodiment 5: Move a Screen Power Chip, a Charging Protocol Chip, and a Speaker Power Amplifier from a Main Board to a Sub-Board In this embodiment, as shown in FIG. 12, based on the embodiment shown in FIG. 10, the speaker power amplifier can be further moved from the main board to the sub-board. A manner in which signals of the screen power chip and the charging protocol chip are combined and optimized is the same as that in the embodiment shown in FIG. 10, and details are not described herein again.

① Move a Backlight Power Chip, a Charging Protocol Chip, and an Analog SPK PA from a Main Board to a Sub-Board In a scenario, the screen power chip is a backlight power chip, and the speaker power amplifier is an analog SPK PA processing analog sound signals. In such a scenario, descriptions of combination and optimization of signals passing through the main board BTB connector after the foregoing three circuit modules are moved from the main board to the sub-board are shown in Table 13.

TABLE 13

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| Backlight power chip | LEDA | 7 | 7 (4 after combination) | VPH-PWR | System total power supply signal | |
| | LED1- | | | VPH-PWR | System total power supply signal | |
| | LED2- | | | SDA1 | Control signal, | Used together with SDA2 and SCL2, to save 2 pins |
| | LED3- | | | SCL1 | I2C signal | |
| | LED4- | | | LCD_EN | LCD backlight enable signal | Connected to VPH-PWR or default pull-up power supply, to save 1 pin |
| | VSP | | | VSP_EN | Positive bias enable signal | |
| | VSN | | | VSN_EN | Negative bias enable signal | |
| Charging protocol chip | USB_DP | 2 | 8 (5 after combination) | VPH-PWR | System total power supply signal | Combined with VPH-PWR of backlight power chip, to save 1 pin |
| | USB_DN | | | SDA2 SCL2 | Control signal, I2C signal | |
| | | | | VBUS | Charging power positive signal | Combined with VBUS signal on USB interface, to save 1 pin |
| | | | | VIO_1.8V | Direct-current power supply | Combined with antenna switch VIO power supply on sub-board, to save 1 pin |
| | | | | EINT | Interrupt signal | |
| | | | | USB_DP | Data positive signal | |
| | | | | USB_DN | Data negative signal | |
| Analog SPK PA | SPKP | 4 | 6 (3 after combination) | LINOUTP | Platform output audio positive signal | |
| | SPKP | | | LINOUTN | Platform output audio negative signal | |

TABLE 13-continued

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| | SPKN | | | VPH-PWR | System total power supply signal | Combined with VPH-PWR of backlight power chip, to save 1 pin |
| | SPKN | | | VPH-PWR | System total power supply signal | |
| | | | | SDA3 | Control signal, I2C signal | Used together with SDA2 and SCL2, to save 2 pins |
| | | | | SCL3 | Control signal, I2C signal | |
| TOTAL | | 13 | 21 (12 after combination) | | | 13 − 12 = 1, saving 1 pin in total |

It can be learned from Table 13 that after the analog SPK PA is moved from the main board to the sub-board, signals passing through the main board BTB connector are changed from 4 output signals to 6 input signals. The 6 input signals are combined and optimized. Specifically, an input power signal VPH-PWR of the analog SPK PA is combined with VPH-PWR of the backlight power chip, to save 1 pin.

Moreover, the control address of the analog SPK PA conflicts with neither of the control addresses of the backlight power chip and the charging protocol chip. Therefore, two control signals SDA3 and SCL3 of the analog SPK PA can be combined with control signals SDA2 and SCL2 in the charging protocol chip, to save 2 pins. In view of the above, this solution finally saves 1 pin.

② Move a Backlight Power Chip, a Charging Protocol Chip, and a SMART PA from a Main Board to a Sub-Board In another scenario, the speaker power amplifier may also be a SMART PA processing digital sound signals. In such a scenario, descriptions of combination and optimization of signals passing through the main board BTB connector after the backlight power chip, the charging protocol chip, and the SMART PA are moved from the main board to the sub-board are shown in Table 14.

TABLE 14

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| Backlight power chip | LEDA | 7 | 7 (4 after combination) | VPH-PWR | System total power supply signal | |
| | LED1− | | | VPH-PWR | System total power supply signal | |
| | LED2− | | | SDA1 | Control signal, I2C signal | Used together with SDA3 and SCL3, to save 2 pins |
| | LED3− | | | SCL1 | | |
| | LED4− | | | LCD_EN | LCD backlight enable signal | Connected to VPH-PWR or default pull-up power supply, to save 1 pin |
| | VSP | | | VSP_EN | Positive bias enable signal | |
| | VSN | | | VSN_EN | Negative bias enable signal | |
| Charging protocol chip | USB_DP | 2 | 8 (3 after combination) | VPH-PWR | System total power supply signal | Combined with VPH-PWR of backlight power chip, to save 1 pin |
| | USB_DN | | | SDA2 | Control signal, I2C signal | Used together with SDA3 and SCL3, to save 2 pins |
| | | | | SCL2 | | |

TABLE 14-continued

| Target circuit module on main board | | | Optimization solution for target circuit module on sub-board | | |
|---|---|---|---|---|---|
| Target circuit module | Output signal | Quantity of occupied BTB pins | Quantity of occupied BTB pins | Input signal | Descriptions of combination and optimization |
| | | | VBUS | Charging power positive signal | Combined with VBUS signal on USB interface, to save 1 pin |
| | | | VIO_1.8V | Direct-current power supply | Combined with antenna switch VIO power supply on sub-board, to save 1 pin |
| | | | EINT | Interrupt signal | |
| | | | USB_DP | Data positive signal | |
| | | | USB_DN | Data negative signal | |
| Speaker power amplifier (SMART PA) | SPKP | 4 | 11 (9 after combination) VPH-PWR | System total power supply signal | |
| | SPKP | | VPH-PWR | System total power supply signal | Combined with VPH-PWR of backlight power chip, to save 1 pin |
| | SPKN | | I2S_DI | Digital signal exchanged between SMART PA and SOC | |
| | SPKN | | I2S_DO | | |
| | | | I2S_CLK | Clock signal | |
| | | | I2S_SYNC | Synchronization signal | |
| | | | SDA3 | Control signal, I2C signal | |
| | | | SCL3 | | |
| | | | INT | Interrupt signal | |
| | | | RST | Reset signal | |
| | | | VIO_1.8V | Direct-current power signal | Combined with antenna switch power supply on sub-board, to save 1 pin |
| Other adjustment | Other signal adjustment | 3 | | | |
| TOTAL | | 16 | 26 (16 after combination) | | Save no pin, but can optimize layout |

As shown in Table 14, after the SMART PA is moved from the main board to the sub-board, signals passing through the main board BTB connector are changed from 4 output signals to 11 input signals. Further, the 11 input signals are combined and optimized. For example, SMART PA of the SMART PA is combined with VPH-PWR of the backlight power chip, to save 1 pin. A direct-current power signal VIO_1.8 V of the SMART PA is combined with the antenna switch power supply of the sub-board, to save 1 pin. A manner in which signals of the backlight power chip and the charging protocol chip are combined and optimized is the same as that shown in Table 13, and details are not described herein again. In view of the above, the quantity of signals passing through the main board BTB connector is not reduced, but the backlight power chip, the charging protocol chip, and the SMART PA are moved from the main board to the sub-board, which saves the occupied area on the main board, so that the layout of the main board can be optimized.

③ Move an OLED Drive Chip, a Charging Protocol Chip, and an Analog SPK PA from a Main Board to a Sub-Board In another application scenario, the screen is an OLED, the screen power chip is an OLED drive chip, and the speaker power amplifier is an analog SPK PA processing analog sound signals. In this scenario, in such an application scenario, descriptions of combination and optimization of signals passing through the main board BTB connector after the foregoing three circuit modules are moved from the main board to the sub-board are shown in Table 15.

Table 15 differs from Table 13 in that when the OLED drive chip is placed on the main board, signals passing through the main board BTB connector are 7 output signals, after the OLED drive chip is moved to the sub-board, signals passing through the main board BTB connector are changed to 4 input signals. In other words, and 3 pins can be saved even if the input signals of the OLED drive chip are not combined or optimized.

TABLE 15

| Target circuit module | Target circuit module on main board | | Optimization solution for target circuit module on sub-board | | | Descriptions of combination and optimization |
|---|---|---|---|---|---|---|
| | Output signal | Quantity of occupied BTB pins | Quantity of occupied BTB pins | Input signal | | |
| OLED drive chip | ELVDD | 7 | 4 | VPH-PWR | System total input power signal | |
| | ELVDD | | | VPH-PWR | System total input power signal | |
| | ELVSS | | | VPH-PWR | System total input power signal | |
| | ELVSS | | | OLED_ERR | OLED error signal | |
| | VIN | | | | | |
| | ELVDD_EN | | | | | |
| | AVDD_EN | | | | | |
| Charging protocol chip | USB_DP | 2 | 8 (5 after combination) | VPH-PWR | System total power supply signal | Combined with VPH-PWR of OLED drive chip, to save 1 pin |
| | USB_DN | | | SDA1 SCL1 | Control signal, I2C signal | |
| | | | | VBUS | Charging power positive signal | Combined with VBUS signal on USB interface, to save 1 pin |
| | | | | VIO_1.8V | Direct-current power supply | Combined with antenna switch VIO power supply on sub-board, to save 1 pin |
| | | | | EINT | Interrupt signal | |
| | | | | USB_DP | Data positive signal | |
| | | | | USB_DN | Data negative signal | |
| Analog SPK PA | SPKP | 4 | 6 (3 after combination) | LINOUTP | Platform output audio positive signal | |
| | SPKP | | | LINOUTN | Platform output audio negative signal | |
| | SPKN | | | VPH-PWR | System total power supply signal | Combined with VPH-PWR of OLED drive chip, to save 1 pin |
| | SPKN | | | VPH-PWR | System total power supply signal | |
| | | | | SDA2 | Control signal, I2C signal | Used together with SDA1 and SCL1, to save 2 pins |
| | | | | SCL2 | Control signal, I2C signal | |
| TOTAL | | 13 | 18 (12 after combination) | | | 13 − 12 = 1, saving 1 pin in total |

③ Move an OLED Drive Chip, a Charging Protocol Chip, and a SMART PA from a Main Board to a Sub-Board In still another scenario, the analog SPK PA processing analog sound signals in Table 15 can also be replaced by a SMART PA processing digital sound signals. Descriptions of comparison of signals passing through the main board BTB connector corresponding to the scenario are shown in Table 16.

TABLE 16

| Target circuit module | Target circuit module on main board | | Optimization solution for target circuit module on sub-board | | | |
|---|---|---|---|---|---|---|
| | Output signal | Quantity of occupied BTB pins | Quantity of occupied BTB pins | Input signal | | Descriptions of combination and optimization |
| OLED drive chip | ELVDD | 7 | 4 | VPH-PWR | System total input power signal | |
| | ELVDD | | | VPH-PWR | System total input power signal | |
| | ELVSS | | | VPH-PWR | System total input power signal | |
| | ELVSS | | | OLED_ERR | OLED error signal | |
| | VIN | | | | | |
| | ELVDD_EN | | | | | |
| | AVDD_EN | | | | | |
| Charging protocol chip | USB_DP | 2 | 8 (3 after combination) | VPH-PWR | System total power supply signal | Combined with VPH-PWR of backlight power chip, to save 1 pin |
| | USB_DN | | | SDA2 SCL2 | Control signal, I2C signal | Used together with SDA3 and SCL3, to save 2 pins |
| | | | | VBUS | Charging power positive signal | Combined with VBUS signal on USB interface, to save 1 pin |
| | | | | VIO_1.8V | Direct-current power supply | Combined with antenna switch VIO power supply on sub-board, to save 1 pin |
| | | | | EINT | Interrupt signal | |
| | | | | USB_DP | Data positive signal | |
| | | | | USB_DN | Data negative signal | |
| Speaker power amplifier (SMART PA) | SPKP | 4 | 11 (9 after combination) | VPH-PWR | System total power supply signal | |
| | SPKP | | | VPH-PWR | System total power supply signal | Combined with VPH-PWR of backlight power module, to save 1 pin |
| | SPKN | | | I2S_DI | Digital signal exchanged between SMART PA and SOC | |
| | SPKN | | | I2S_DO | | |
| | | | | I2S_CLK | Clock signal | |
| | | | | I2S_SYNC | Synchronization signal | |
| | | | | SDA3 SCL3 | Control signal, I2C signal | |
| | | | | INT | Interrupt signal | |
| | | | | RST | Reset signal | |
| | | | | VIO_1.8V | Direct-current power signal | Combined with antenna switch power supply on sub-board, to save 1 pin |

TABLE 16-continued

|  | Target circuit module on main board | | Optimization solution for target circuit module on sub-board | | |
|---|---|---|---|---|---|
| Target circuit module | Output signal | Quantity of occupied BTB pins | Quantity of occupied BTB pins | Input signal | Descriptions of combination and optimization |
| Other adjustment | Other signal adjustment | 3 | | | |
| TOTAL | | 16 | 23 (16 after combination) | | Save no pin, but can optimize layout |

Figure 13:
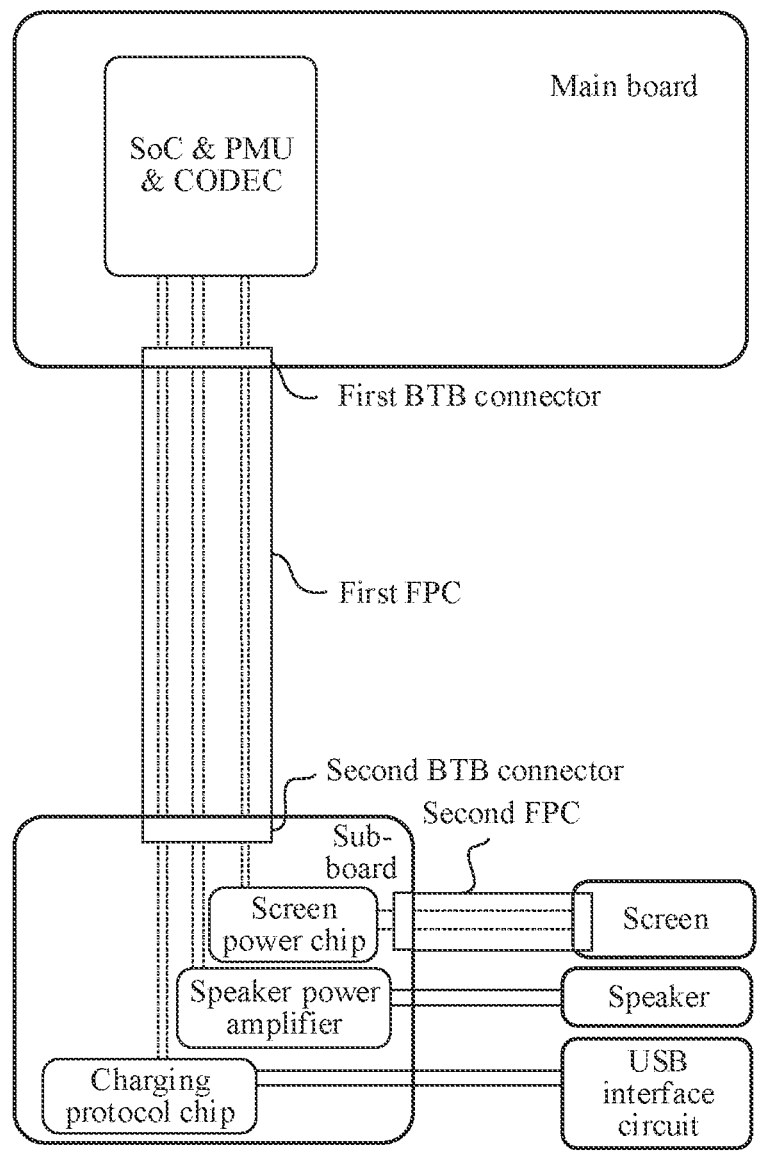

In other embodiments, the screen FPC can also be combined into the main and sub-board FPC to obtain an FPC. As shown in FIG. 13, the FPC includes a first FPC and a second FPC. The first FPC connects the main board and the sub-board, and the second FPC connects the sub-board and the screen chip. The first FPC transmits signals between the main board and the sub-board and signals between the main board and the screen chip. The second FPC transmits signals between the sub-board and the screen chip. The other structures are the same as those in FIG. 12, and details are not described herein again.

On the circuit board provided in this embodiment, the screen power chip, the charging protocol chip, and the speaker power amplifier are moved from the main board to the sub-board, to save the occupied area on the main board, so that the main board can carry complex functional modules. Moreover, input signals of the three circuit modules are combined and optimized, to reduce the quantity of signals passing through the main board BTB connector, so that the sub-board can carry an increasing quantity of more complex circuit modules.

Embodiment 6: Move a Screen Power Chip, a Headset Switch Switching Chip, and a Speaker Power Amplifier from a Main Board to a Sub-Board In a scenario in which the headset interface is an USB Type-C interface, a headset switch switching chip is configured to switch a working mode of the USB Type-C interface, for example, a headset mode or a USB interface mode.

Figure 14:
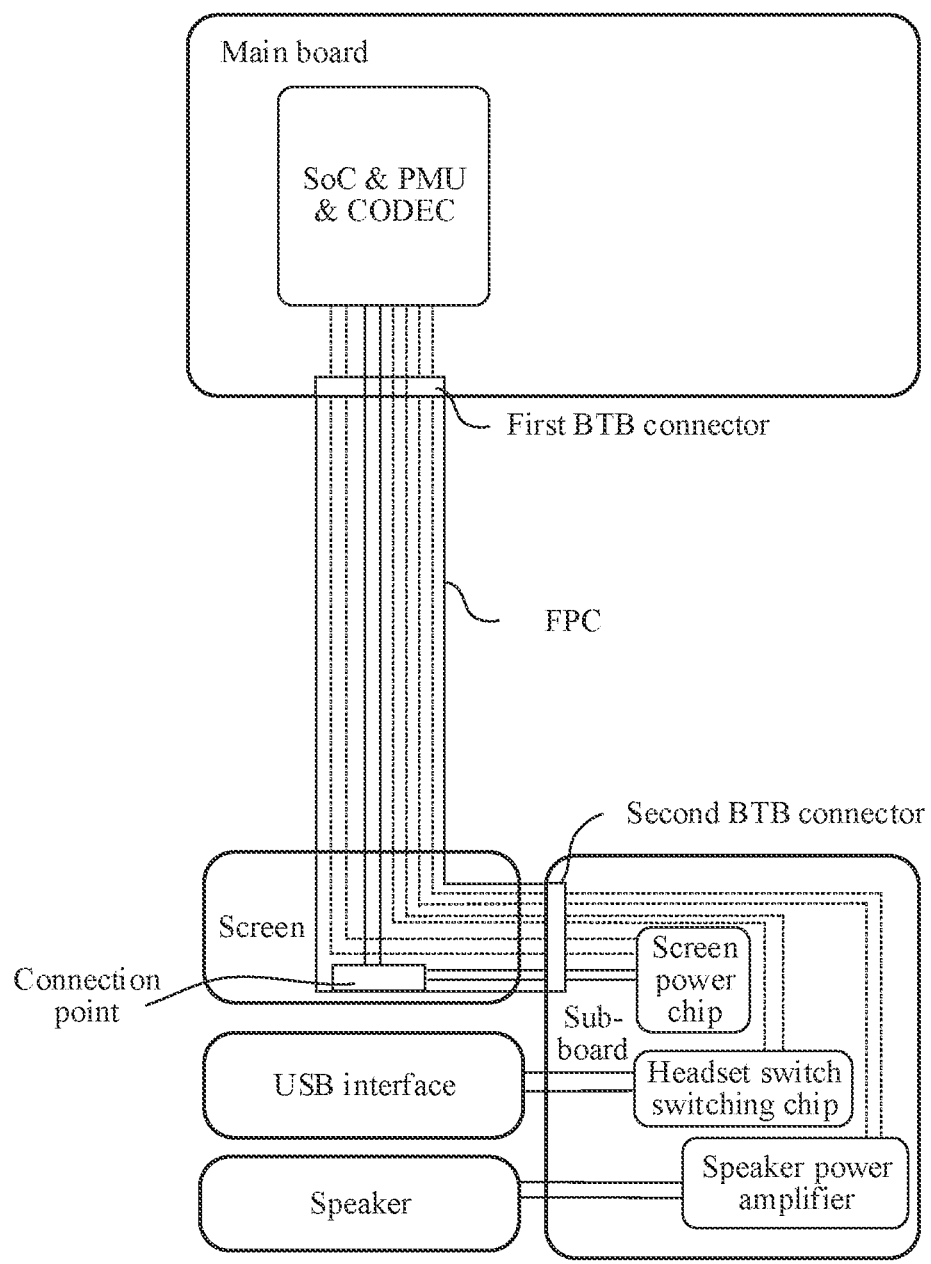

As shown in FIG. 14, the main and sub-board FPC is combined into the screen FPC to obtain an FPC. The structure of the FPC is the same as the principle of the FPC in the embodiment shown in FIG. 8, and details are not described herein again. In this embodiment, because the headset switch switching chip is moved from the main board to the sub-board, the FPC transmits signals between the main board and the headset switch switching chip. In addition, the output signals of the headset switch switching chip are transmitted to the USB interface.

① Move a Backlight Power Chip, a Headset Switch Switching Chip, and an Analog SPK PA from a Main Board to a Sub-Board In a scenario, the screen is an LCD, the screen power chip is the backlight power chip, and the speaker power amplifier is an analog SPK PA processing analog sound signals. In such a scenario, descriptions of combination and optimization of signals passing through the main board BTB connector after the backlight power chip, the headset switch switching chip, and the analog SPK PA are moved from the main board to the sub-board are shown in Table 17.

TABLE 17

|  | Target circuit module on main board | | Optimization solution for target circuit module on sub-board | | |
|---|---|---|---|---|---|
| Target circuit module | Output signal | Quantity of occupied BTB pins | Quantity of occupied BTB pins | Input signal | Descriptions of combination and optimization |
| Backlight power chip | LEDA | 7 | 7 (4 after combination) | VPH-PWR | System total power supply signal |
|  | LED1- | | | VPH-PWR | System total power supply signal |
|  | LED2- | | | SDA1 | Control signal, I2C signal | Used together with SDA3 and SCL3, to save 2 pins |
|  | LED3- | | | SCL1 | | |
|  | LED4- | | | LCD_EN | LCD backlight enable signal | Connected to VPH-PWR or default pull-up power supply, to save 1 pin |
|  | VSP | | | VSP_EN | Positive bias enable signal | |

TABLE 17-continued

| Target circuit module | Target circuit module on main board | | Optimization solution for target circuit module on sub-board | | | |
|---|---|---|---|---|---|---|
| | Output signal | Quantity of occupied BTB pins | Quantity of occupied BTB pins | Input signal | | Descriptions of combination and optimization |
| Headset switch switching chip | VSN | | | VSN_EN | Negative bias enable signal | |
| | SBU1 | 4 | 12 (9 after combination) | MIC | Headset microphone input signal | |
| | SBU2 | | | SGND | Feedback ground | |
| | DP | | | AGND | Analog ground | |
| | DN | | | SDA2 SCL2 | Control signal | Used together with SDA3 and SCL3, to save 2 pins |
| | | | | DP | Data positive signal | |
| | | | | DN | Data negative signal | |
| | | | | HSL | Left channel signal | |
| | | | | HSR | Right channel signal | |
| | | | | EN | Enable signal | |
| | | | | INT | Interrupt signal | |
| | | | | VPH-PWR | System total power supply signal | Combined with VPH-PWR of backlight power chip, to save 1 pin |
| Analog SPK PA | SPKP | 4 | 6 (3 after combination) | LINOUTP | Platform output audio positive signal | Combined with HSL of headset switch switching chip |
| | SPKP | | | LINOUTN | Platform output audio negative signal | Combined with SGND of headset switch switching chip |
| | SPKN | | | VPH-PWR | System total power supply signal | Combined with VPH-PWR of backlight power chip, to save 1 pin |
| | SPKN | | | VPH-PWR | System total power supply signal | |
| | | | | SDA3 SCL3 | Control signal, I2C signal | |
| Other adjustment | Other signal adjustment | 1 | | | | |
| TOTAL | | 16 | 25 (16 after combination) | | | Save no pin, but adjust layout |

A manner in which input signals of the screen power chip and the analog SPK PA are combined and optimized has been described in detail in the foregoing embodiments, and details are not described herein again.

After the headset switch switching chip is moved from the main board to the sub-board, signals passing through the main board BTB connector are changed from 4 input signals to 12 output signals. Neither of the addresses of the control signals SDA2 and SCL2 conflicts with the control addresses in the backlight power chip and the analog SPK PA. Therefore, the control signals in the three chips can be combined. For example, in this embodiment, SDA3 and SCL3 of the backlight power chip and SDA2 and SCL2 of the headset switch switching chip are combined with control signals SDA3 and SCL3 of the analog SPK PA. VPH-PWR of the headset switch switching chip is combined with VPH-PWR of the backlight power chip, to save 1 pin.

It can be learned from Table 17 that after the backlight power chip, the headset switch switching chip, and the analog SPK PA are moved from the main board to the sub-board, a quantity of pins of the main board BTB connector is not reduced, but the occupied area on the main board is saved, which improves the utilization of the main board, so that the main board can carry more complex functional modules.

② Move a Backlight Power Chip, a Headset Switch Switching Chip, and a SMART PA from a Main Board to a Sub-Board In another scenario, the analog SPK PA in Table 17 can also be replaced by a SMART PA processing digital sound signals. Descriptions of combination and optimization of signals passing through the main board BTB connector corresponding to the scenario are shown in Table 18.

TABLE 18

| Target circuit module on main board | | | Optimization solution for target circuit module on sub-board | | |
|---|---|---|---|---|---|
| Target circuit module | Output signal | Quantity of occupied BTB pins | Quantity of occupied BTB pins | Input signal | Descriptions of combination and optimization |
| Backlight power chip | LEDA | 7 | 7 (4 after combination) | VPH-PWR | System total power supply signal | |
| | LED1- | | | VPH-PWR | System total power supply signal | |
| | LED2- | | | SDA1 | Control signal, | Used together with SDA3 and SCL3, to save 2 pins |
| | LED3- | | | SCL1 | I2C signal | |
| | LED4- | | | LCD_EN | LCD backlight enable signal | Connected to VPH-PWR or default pull-up power supply, to save 1 pin |
| | VSP | | | VSP_EN | Positive bias enable signal | |
| | VSN | | | VSN_EN | Negative bias enable signal | |
| Headset switch switching chip | SBU1 | 4 | 12 (9 after combination) | MIC | Headset microphone input signal | |
| | SBU2 | | | SGND | Feedback ground | |
| | DP | | | AGND | Analog ground | |
| | DN | | | SDA2 | Control signal | Used together with SDA3 and SCL3, to save 2 pins |
| | | | | SCL2 | | |
| | | | | DP | Data positive signal | |
| | | | | DN | Data negative signal | |
| | | | | HSL | Left channel signal | |
| | | | | HSR | Right channel signal | |
| | | | | EN | Enable signal | |
| | | | | INT | Interrupt signal | |
| | | | | VPH-PWR | System total power supply signal | Combined with VPH-PWR of backlight power chip, to save 1 pin |
| Speaker power amplifier (SMART PA) | SPKP | 4 | 11 (9 after combination) | VPH-PWR | System total power supply signal | |
| | SPKP | | | VPH-PWR | System total power supply signal | Combined with VPH-PWR of backlight power chip, to save 1 pin |
| | SPKN | | | I2S_DI | Digital signal exchanged between SMART PA and SOC chip | |
| | SPKN | | | I2S_DO | | |
| | | | | I2S_CLK | Clock signal | |
| | | | | I2S_SYNC | Synchronization signal | |
| | | | | SDA3 | Control signal, | |
| | | | | SCL3 | I2C signal | |
| | | | | INT | Interrupt signal | |
| | | | | RST | Reset signal | |

TABLE 18-continued

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| | | | | VIO_1.8V | Direct-current power signal | Combined with antenna switch power supply on sub-board, to save 1 pin |
| Other adjustment | Other signal adjustment | 7 | | | | |
| TOTAL | | 22 | | 30 (22 after combination) | | Save no pin, but adjust layout |

As shown in Table 18, after the SMART PA is moved from the main board to the sub-board, signals passing through the main board BTB connector are changed from 4 output signals to 11 input signals. Further, VPH-PWR in the input signals is combined with VPH-PWR of the backlight power chip, to save 1 pin. In addition, a direct-current power signal VIO_1.8 V is combined with the antenna switch power supply of the sub-board, to save 1 pin. That is, after being combined, input signals of the SMART PA become 9 signals.

As shown in Table 18, after the backlight power chip, the headset switch switching chip, and the SMART PA are moved from the main board to the sub-board, a quantity of signals passing through the main board BTB connector remains unchanged, but the space of the main board is saved, which optimizes the layout of the main board.

③ Move an OLED Drive Chip, a Headset Switch Switching Chip, an Analog SPK PA from a Main Board to a Sub-Board In another application scenario, the screen power chip is an OLED drive chip. The backlight power chip in Table 17 is replaced by an OLED drive chip to obtain Table 19:

TABLE 19

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| OLED drive chip | ELVDD | 7 | 4 | VPH-PWR | System total power supply signal | |
| | ELVDD | | | VPH-PWR | System total power supply signal | |
| | ELVSS | | | VPH-PWR | System total power supply signal | |
| | ELVSS | | | OLED_ERR | OLED error signal | |
| | VIN | | | | | |
| | ELVDD_EN | | | | | |
| | AVDD_EN | | | | | |
| Headset switch switching chip | SBU1 | 4 | 12 (9 after combination) | MIC | Headset microphone input signal | |
| | SBU2 | | | SGND | Feedback ground | |
| | DP | | | AGND | Analog ground | |
| | DN | | | SDA1 SCL1 | Control signal, I2C signal | Used together with SDA2 and SCL2, to save 2 pins |
| | | | | DP | Data positive signal | |
| | | | | DN | Data negative signal | |
| | | | | HSL | Left channel signal | |
| | | | | HSR | Right channel signal | |

TABLE 19-continued

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| Analog SPK PA | SPKP | 4 | 6 (3 after combination) | EN | Enable signal | |
| | | | | INT | Interrupt signal | |
| | | | | VPH-PWR | System total power supply signal | Combined with VPH-PWR of OLED drive chip, to save 1 pin |
| | SPKP | | | LINOUTP | Platform output audio positive signal | Combined with HSL of headset switch switching chip |
| | SPKN | | | LINOUTN | Platform output audio negative signal | Combined with SGND of headset switch switching chip |
| | SPKN | | | VPH-PWR | System total power supply signal | Combined with VPH-PWR of OLED drive chip, to save 1 pin |
| | | | | VPH-PWR | System total power supply signal | |
| | | | | SDA2 SCL2 | Control signal, I2C signal | |
| Other adjustment | Other signal adjustment | 1 | | | | |
| TOTAL | | 16 | 25 (16 after combination) | | | Save no pin, but adjust layout |

As shown in Table 19, after the OLED drive chip is moved from the main board to the sub-board, signals passing through the main board BTB connector are changed from 7 output signals to 4 input signals, to save 3 pins. After the OLED drive chip, the headset switch switching chip, and the analog SPK PA are moved from the main board to the sub-board, a quantity of signals passing through the main board BTB connector remains unchanged, but the occupied area on the main board is saved, which optimizes the layout of the main board.

③ Move an OLED Drive Chip, a Headset Switch Switching Chip, a SMART PA from a Main Board to a Sub-Board In still another scenario, the backlight power chip in Table 18 can be replaced by an OLED drive chip. In this scenario, comparison of signals passing through the main board BTB connector is shown in Table 20.

TABLE 20

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| OLED drive chip | ELVDD | 7 | 4 | VPH-PWR | System total power supply signal | |
| | ELVDD | | | VPH-PWR | System total power supply signal | |

TABLE 20-continued

| Target circuit module on main board | | | Optimization solution for target circuit module on sub-board | | | Descriptions of combination and optimization |
|---|---|---|---|---|---|---|
| Target circuit module | Output signal | Quantity of occupied BTB pins | Quantity of occupied BTB pins | Input signal | | |
| | ELVSS | | | VPH-PWR | System total power supply signal | |
| | ELVSS | | | OLED_ERR | OLED error signal | |
| Headset switch switching chip | VIN ELVDD_EN AVDD_EN SBU1 | 4 | 12 (9 after combination) | MIC | Headset microphone input signal | |
| | SBU2 | | | SGND | Feedback ground | |
| | DP | | | AGND | Analog ground | |
| | DN | | | SDA2 SCL2 | Control signal | Used together with SDA3 and SCL3, to save 2 pins |
| | | | | DP | Data positive signal | |
| | | | | DN | Data negative signal | |
| | | | | HSL | Left channel signal | |
| | | | | HSR | Right channel signal | |
| | | | | EN | Enable signal | |
| | | | | INT | Interrupt signal | |
| | | | | VPH-PWR | System total power supply signal | Combined with VPH-PWR of backlight power chip, to save 1 pin |
| Speaker power amplifier (SMART PA) | SPKP | 4 | 11 (9 after combination) | VPH-PWR | System total power supply signal | |
| | SPKP | | | VPH-PWR | System total power supply signal | Combined with VPH-PWR of power backlight module, to save 1 pin |
| | SPKN | | | I2S_DI | Digital signal exchanged between SMART PA and SOC chip | |
| | SPKN | | | I2S_DO | | |
| | | | | I2S_CLK | Clock signal | |
| | | | | I2S_SYNC | Synchronization signal | |
| | | | | SDA3 | Control signal, I2C signal | |
| | | | | SCL3 | | |
| | | | | INT | Interrupt signal | |
| | | | | RST | Reset signal | |

TABLE 20-continued

| Target circuit module on main board | | | Optimization solution for target circuit module on sub-board | | | Descriptions of combination and optimization |
|---|---|---|---|---|---|---|
| Target circuit module | Output signal | Quantity of occupied BTB pins | Quantity of occupied BTB pins | Input signal | | |
| | | | VIO_1.8V | Direct-current power signal | Combined with antenna switch power supply on sub-board, to save 1 pin | |
| Other adjustment | Other signal adjustment | 7 | | | | |
| TOTAL | | 22 | 27 (22 after combination) | | | Save no pin, but adjust layout |

As shown in Table 20, after the OLED drive chip is moved from the main board to the sub-board, signals passing through the main board BTB connector are changed from 7 output signals to 4 input signals, to save 3 pins. On the whole, no pin is saved by moving the three circuits from the main board to the sub-board, but the occupied area on the main board is saved, which optimizes the layout of the main board.

Figure 15:
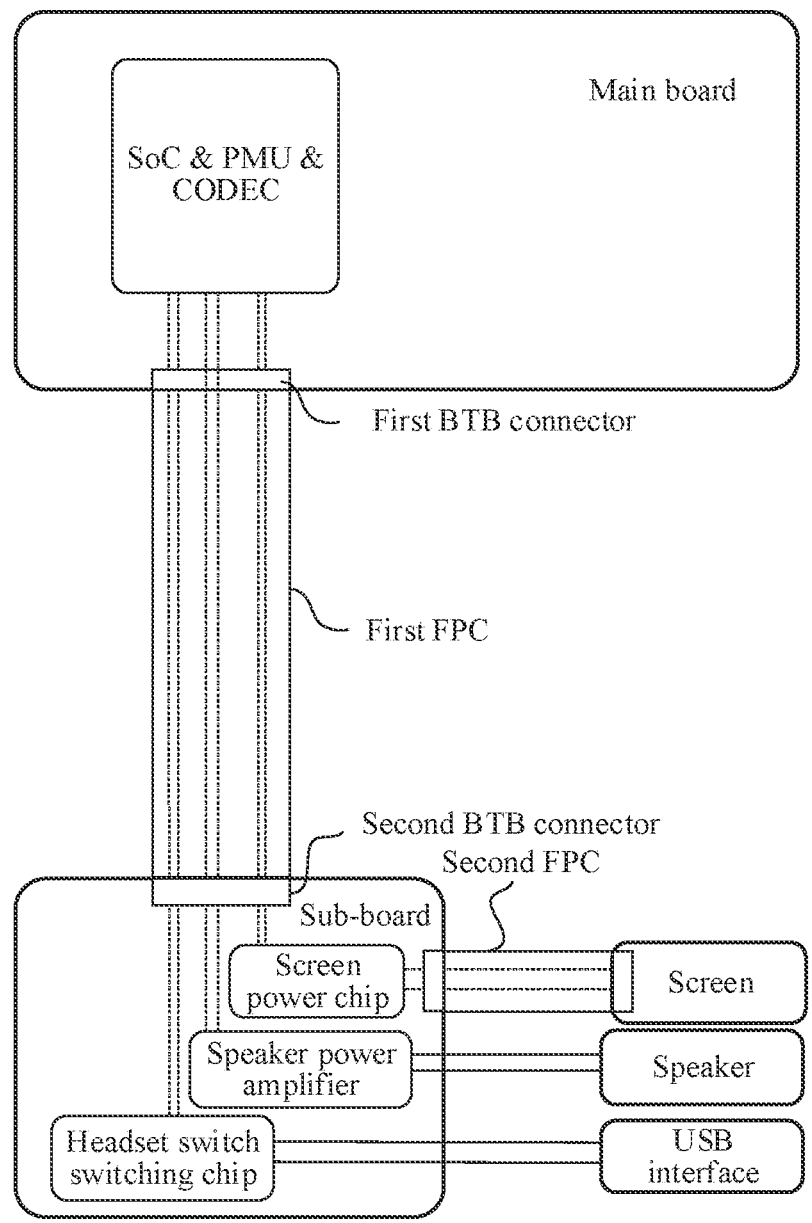

In other embodiments, the screen FPC in the embodiment shown in FIG. 14 can be combined into the main and sub-board FPC to obtain an FPC. As shown in FIG. 15, the structure and principle of the FPC is the same as the structures and the principles of the FPCs in the embodiments shown in FIG. 5, FIG. 9, FIG. 11, and FIG. 13, and details are not described herein again.

On the circuit board provided in this embodiment, the screen power chip, the headset switch switching chip, and the analog SPK PA are moved from the main board to the sub-board, and input signals of the three circuit modules are further combined and optimized, to save the occupied area on the main board without increasing a quantity of signals of the three circuits passing through the main board BTB connector, so that the main board can carry functional modules that are more complex, which improves the utilization of the entire circuit board.

Figure 16:
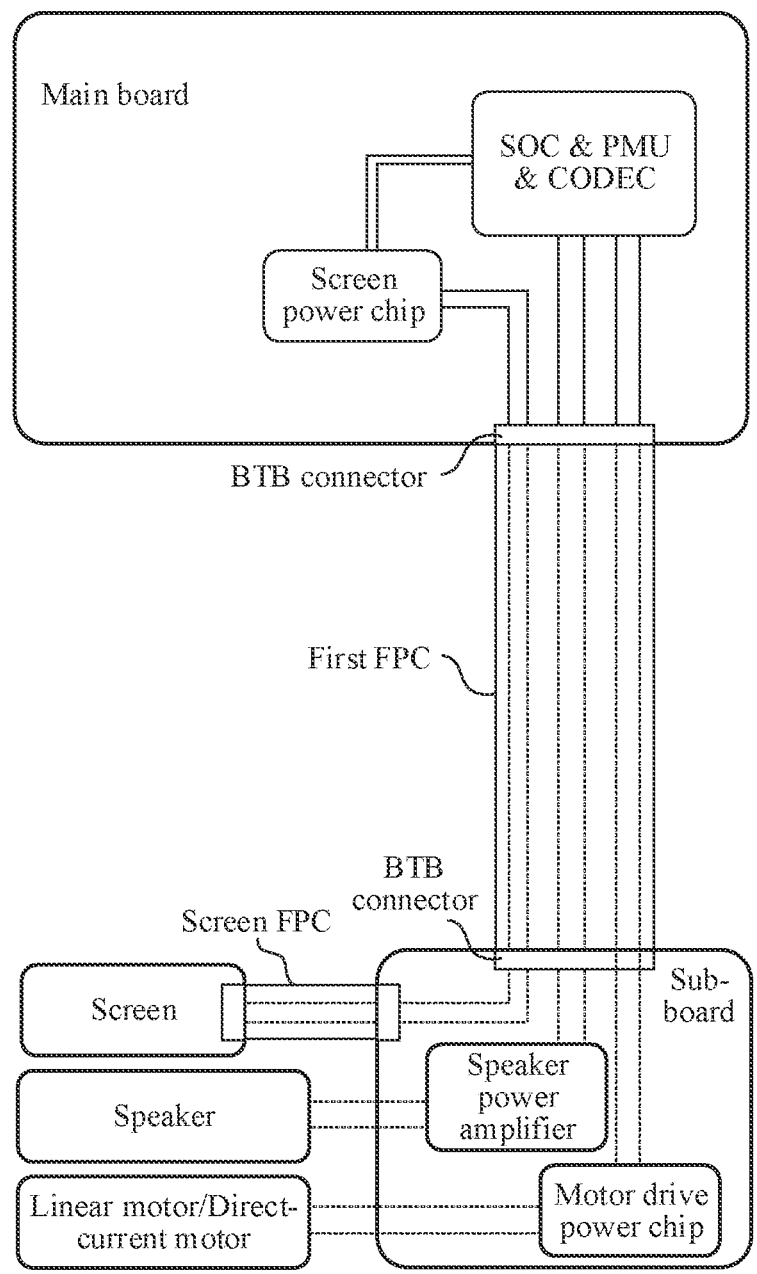

Embodiment 7: Move a Motor Drive Power Chip and a Speaker Power Amplifier from a Main Board to a Sub-Board As shown in FIG. 16, the speaker power amplifier and the motor drive power chip are moved from the main board to the sub-board. In addition, the screen FPC is combined into the main and sub-board FPC, and there is one FPC after the combination, that is, the first FPC.

Figure 17:
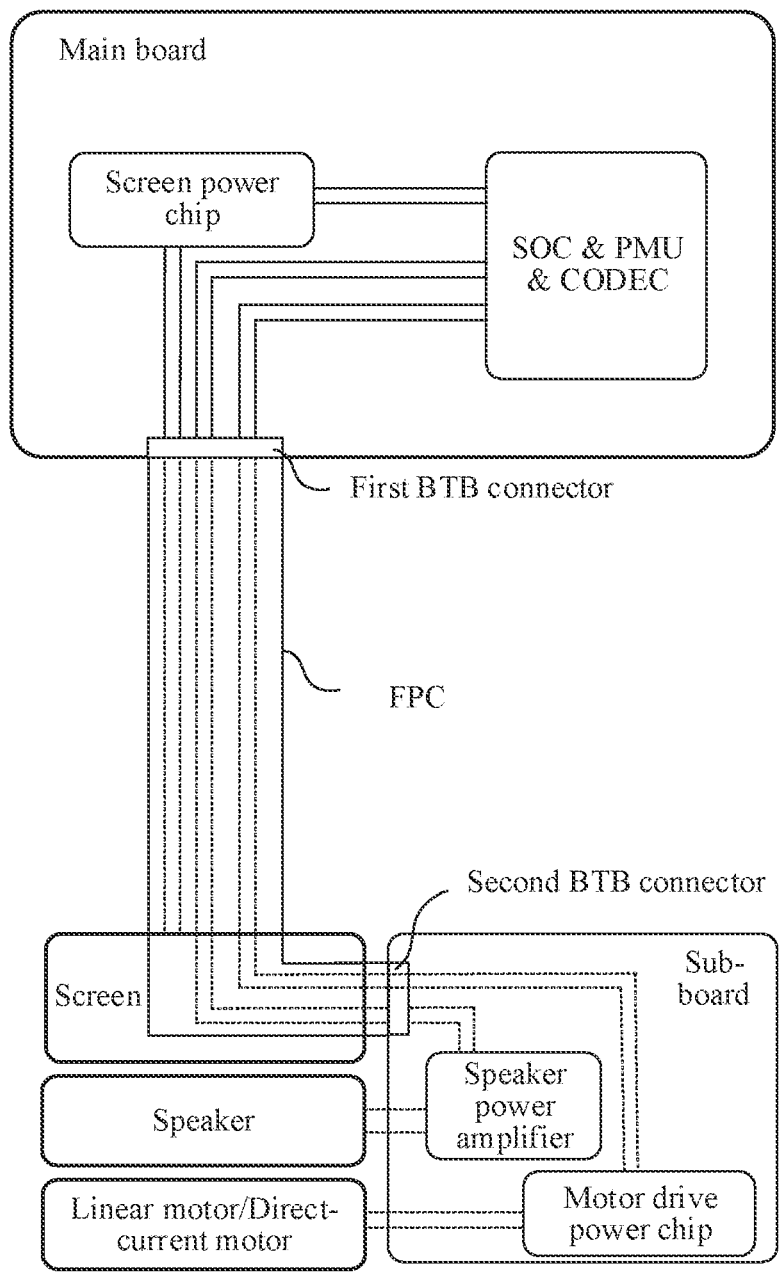

FIG. 17 differs from FIG. 16 in that the main and sub-board FPC is combined into the screen FPC, and there is one FPC after the combination. Other parts in FIG. 17 are the same as those in FIG. 16, and details are not described herein again.

① Move a Motor Drive Power Chip and an Analog SPK PA from a Main Board to a Sub-Board In an application scenario, the speaker power amplifier is an analog SPK PA processing analog sound signals. In such a scenario, descriptions of combination and optimization of signals passing through the main board BTB connector after the motor drive power chip and the analog SPK PA are moved from the main board to the sub-board are shown in Table 21.

TABLE 21

| Target circuit module on main board | | | Optimization solution for target circuit module on sub-board | | | Descriptions of combination and optimization |
|---|---|---|---|---|---|---|
| Target circuit module | Output signal | Quantity of occupied BTB pins | Quantity of occupied BTB pins | Input signal | | |
| Motor drive power chip | VIBR_P | 2 | 5 (4 after combination) | VPH-PWR | System total power supply signal | Combined with VPH-PWR of analog SPK PA, to save 1 pin |
| | VIBR_N | | | SDA1 | Control signal, I2C signal | |
| | | | | SCL1 | Enable signal | |
| | | | | MOTOR_EN | | |
| | | | | MOTOR_INT | Interrupt signal | |

TABLE 21-continued

| Target circuit module on main board | | | Optimization solution for target circuit module on sub-board | | Descriptions of combination and optimization |
|---|---|---|---|---|---|
| Target circuit module | Output signal | Quantity of occupied BTB pins | Quantity of occupied BTB pins | Input signal | |
| Analog SPK PA | SPKP | 4 | 6 (4 after combination) | LINOUTP | Platform output audio positive signal | |
| | SPKP | | | LINOUTN | Platform output audio negative signal | |
| | SPKN | | | VPH-PWR | System total power supply signal | |
| | SPKN | | | VPH-PWR | System total power supply signal | |
| | | | | SDA2 | Control signal, I2C signal | Used together with SDA1 and SCL1, to save 2 pins |
| | | | | SCL2 | | |
| Other adjustment | Other signal adjustment | 2 | | | | |
| TOTAL | | 8 | 11 (8 after combination) | | | Save no pin, but adjust layout |

As shown in Table 21, a quantity of signals passing through the main board BTB connector remains unchanged before and after the motor drive power chip and the analog SPK PA are moved from the main board to the sub-board, but the occupied area on the main board is saved, which optimizes the layout of the main board.

② Move a Motor Drive Power Chip and a SMART PA from a Main Board to a Sub-Board

In another scenario, the speaker power amplifier is a SMART PA processing digital sound signals. Signals passing through the main board BTB connector are shown in Table 22:

TABLE 22

| Target circuit module on main board | | | Optimization solution for target circuit module on sub-board | | Descriptions of combination and optimization |
|---|---|---|---|---|---|
| Target circuit module | Output signal | Quantity of occupied BTB pins | Quantity of occupied BTB pins | Input signal | |
| Motor drive power chip | VIBR_P | 2 | 5 (2 after combination) | VPH-PWR | System total power supply signal | Combined with VPH-PWR of backlight power chip, to save 1 pin |
| | VIBR_N | | | SDA2 | Control signal, I2C signal | Used together with SDA3 and SCL3, to save 2 pins |
| | | | | SCL2 | | |
| | | | | MOTOR_EN | Enable signal | |
| | | | | MOTOR_INT | Interrupt signal | |
| Speaker power amplifier (SMART PA) | SPKP | 4 | 11 (9 after combination) | VPH-PWR | System total power supply signal | |
| | SPKP | | | VPH-PWR | System total power supply signal | Combined with VPH-PWR of backlight power chip, to save 1 pin |

TABLE 22-continued

| Target circuit module on main board | | | Optimization solution for target circuit module on sub-board | | Descriptions of combination and optimization |
|---|---|---|---|---|---|
| Target circuit module | Output signal | Quantity of occupied BTB pins | Quantity of occupied BTB pins | Input signal | |
| | SPKN | | | I2S_DI | Digital signal exchanged between SMART PA and SOC chip |
| | SPKN | | | I2S_DO | |
| | | | | I2S_CLK | Clock signal |
| | | | | I2S_SYNC | Synchronization signal |
| | | | | SDA3 | Control signal, I2C signal |
| | | | | SCL3 | |
| | | | | INT | Interrupt signal |
| | | | | RST | Reset signal |
| | | | | VIO_1.8V | Direct-current power signal | Combined with antenna switch power supply on sub-board, to save 1 pin |
| Other adjustment | Other signal adjustment | 5 | | | |
| TOTAL | | 11 | 16 (11 after combination) | | Save no pin, but can optimize layout |

As shown in Table 22, a quantity of signals passing through the main board BTB connector remains unchanged before and after the motor drive power chip and the SMART PA are moved from the main board to the sub-board, but the occupied area on the main board is saved, which optimizes the layout of the main board.

Figure 18:
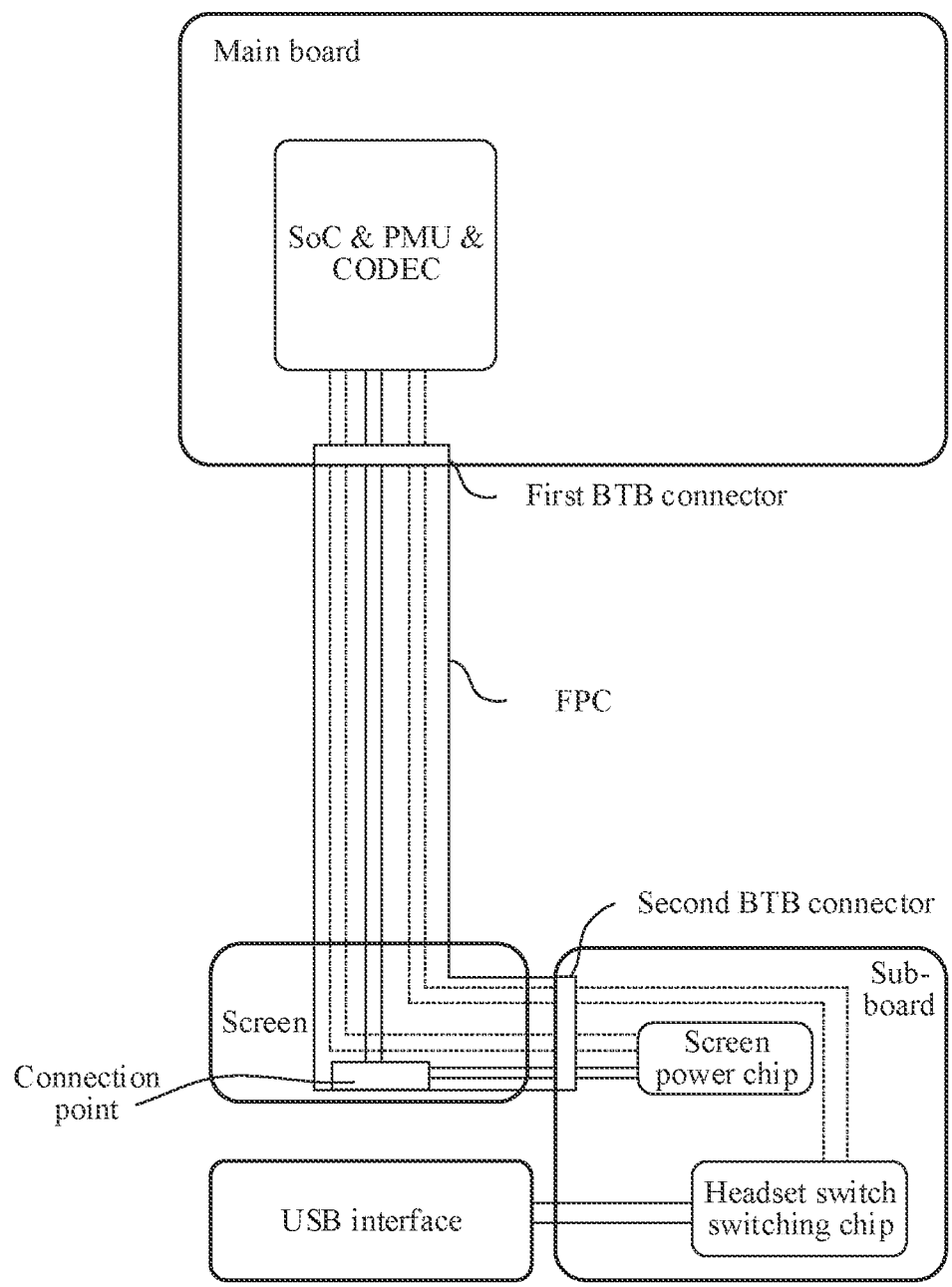

Embodiment 8: Move a Screen Power Chip and a Headset Switch Switching Chip from a Main Board to a Sub-Board As shown in FIG. 18, the screen power chip and the headset switch switching chip are moved from the main board to the sub-board, and the main and sub-board FPC is combined into the screen FPC, that is, the FPC in FIG. 18.

Figure 19:
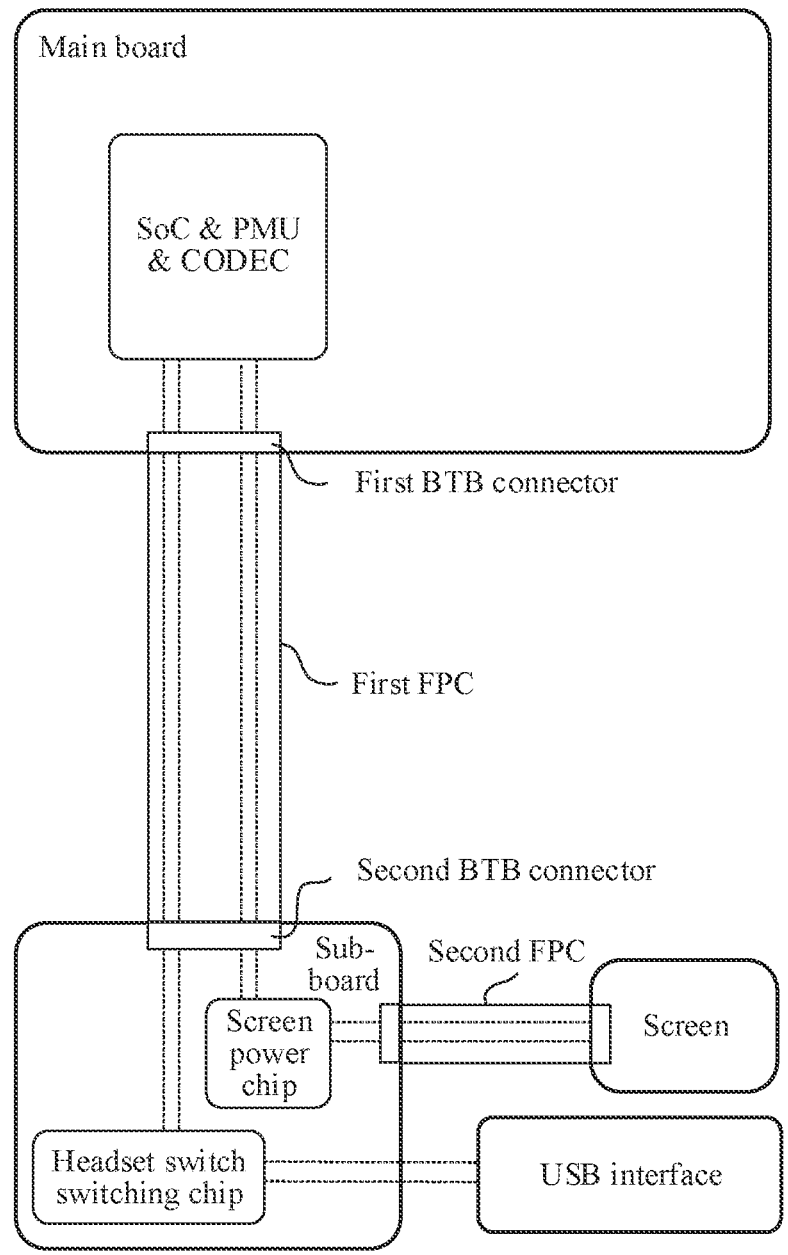

In another exemplary embodiment, as shown in FIG. 19, the screen FPC can also be combined into the main and sub-board FPC, to obtain a first FPC. The other parts are the same as those in FIG. 18, and details are not described herein again.

① Move a Backlight Power Chip and a Headset Switch Switching Chip from a Main Board to a Sub-Board In a scenario, if the screen is an LCD, the screen power chip is a backlight power chip. In this scenario, combination and optimization of signals passing through the main board BTB connector after the backlight power chip and the headset switch switching chip are moved from the main board to the sub-board are shown in Table 23:

TABLE 23

| Target circuit module on main board | | | Optimization solution for target circuit module on sub-board | | Descriptions of combination and optimization |
|---|---|---|---|---|---|
| Target circuit module | Output signal | Quantity of occupied BTB pins | Quantity of occupied BTB pins | Input signal | |
| Backlight power chip | LEDA | 7 | 7 (4 after combination) | VPH-PWR | System total power supply signal | |
| | LED1- | | | VPH-PWR | System total power supply signal | |
| | LED2- | | | SDA1 | Control signal, I2C signal | Used together with SDA2 and SCL2 of headset switch switching |

TABLE 23-continued

| Target circuit module on main board | | Quantity of occupied BTB pins | Optimization solution for target circuit module on sub-board | | |
|---|---|---|---|---|---|
| Target circuit module | Output signal | | Quantity of occupied BTB pins | Input signal | Descriptions of combination and optimization |
| | | | | | chip, to save 2 pins |
| | LED3- | | | SCL1 | |
| | LED4- | | | LCD_EN | Backlight enable signal | Connected to VPH-PWR or default pull-up power supply, to save 1 pin |
| | IVSP | | | VSP_EN | Positive bias enable signal |
| | IVSN | | | VSN_EN | Negative bias enable signal |
| Headset switch switching chip | SBU1 | 4 | 12 (11 after combination) | MIC | Headset microphone input signal |
| | SBU2 | | | SGND | Feedback ground |
| | DP | | | AGND | Analog ground |
| | DN | | | SDA2 SCL2 | Control signal, I2C signal |
| | | | | DP | Data positive signal |
| | | | | DN | Data negative signal |
| | | | | HSL | Left channel signal |
| | | | | HSR | Right channel signal |
| | | | | EN | Enable signal |
| | | | | INT | Interrupt signal |
| | | | | VPH-PWR | power System total supply signal | Combined with VPH-PWR of backlight power chip, to save 1 pin |
| Other adjustment | Other signal adjustment | 4 | | | |
| TOTAL | | 15 | 19 (15 after combination) | | Save no pin, but adjust layout |

As shown in Table 23, after the backlight power chip is moved from the main board to the sub-board, signals passing through the main board BTB connector are changed from 7 output signals to 7 input signals. Addresses of the control signals SDA1 and SCL1 do not conflict with addresses of the control signals SDA2 and SCL2 of the headset switch switching chip. Therefore, SDA1 and SCL1 can be used together with SDA2 and SCL2, to save 2 pins. Other signal combination manners are the same as those in Table 18, and details are not described herein again.

As shown in Table 23, before and after the backlight power chip and the headset switch switching chip are moved from the main board to the sub-board, a quantity of signals passing through the main board BTB connector remains unchanged, but the occupied area on the main board is saved, which optimizes the layout of the main board.

② Move an OLED Drive Chip and a Headset Switch Switching Chip from a Main Board to a Sub-Board In another scenario, if the screen is an OLED, the screen power chip is an OLED drive chip. In such a scenario, combination and optimization of signals passing through the main board BTB connector after the OLED drive chip and the headset switch switching chip are moved from the main board to the sub-board are shown in Table 24:

TABLE 24

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| OLED drive chip | ELVDD | 7 | 4 | VPH-PWR | System total power supply signal | |
| | ELVDD | | | VPH-PWR | System total power supply signal | |
| | ELVSS | | | VPH-PWR | System total power supply signal | |
| | ELVSS | | | OLED_ERR | OLED error signal | |
| | VIN | | | | | |
| | ELVDD_EN | | | | | |
| | AVDD_EN | | | | | |
| Headset switch switching chip | SBU1 | 4 | 12 (11 after combination) | MIC | Headset microphone input signal | |
| | SBU2 | | | SGND | Feedback ground | |
| | DP | | | AGND | Analog ground | |
| | DN | | | SDA1 SCL1 | Control signal, I2C signal | |
| | | | | DP | Data positive signal | |
| | | | | DN | Data negative signal | |
| | | | | HSL | Left channel signal | |
| | | | | HSR | Right channel signal | |
| | | | | EN | Enable signal | |
| | | | | INT | Interrupt signal | |
| | | | | VPH-PWR | System total power supply signal | Combined with VPH-PWR of OLED drive chip, to save 1 pin |
| Other adjustment | adjustment Other signal | 4 | | | | |
| TOTAL | | 15 | 16 (15 after combination) | | | Save no pin, but adjust layout |

As shown in Table 24, after the OLED drive chip is moved from the main board to the sub-board, signals passing through the main board BTB connector are changed from 7 output signals to 4 input signals, so that 3 pins can be directly saved. After the headset switch switching chip is moved from the main board to the sub-board, signals passing through the main board BTB connector are changed from 4 output signals to 12 input signals, in which VPH-PWR is combined with VPH-PWR of the OLED drive chip, to save 1 pin. On the whole, no pin of the main board BTB connector is saved in this solution, but the occupied area on the main board is saved, which optimizes the layout of the main board.

Figure 20:
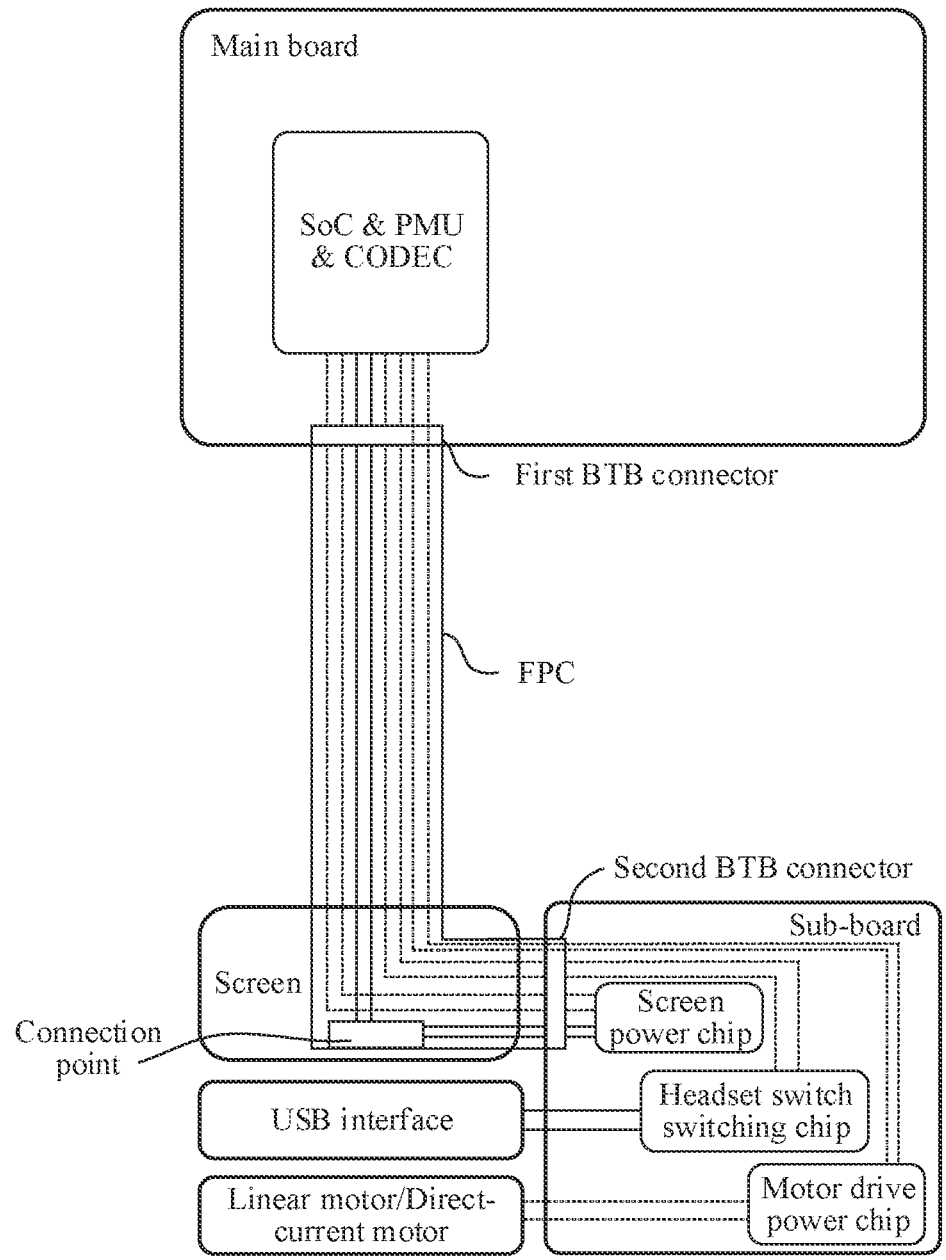

Embodiment 9: Move a Screen Power Chip, a Headset Switch Switching Chip, and a Motor Drive Power Chip from a Main Board to a Sub-Board As shown in FIG. 20, based on FIG. 18, the motor drive power chip can be further moved from the main board to the sub-board, and the main and sub-board FPC is combined into the screen FPC.

Figure 21:
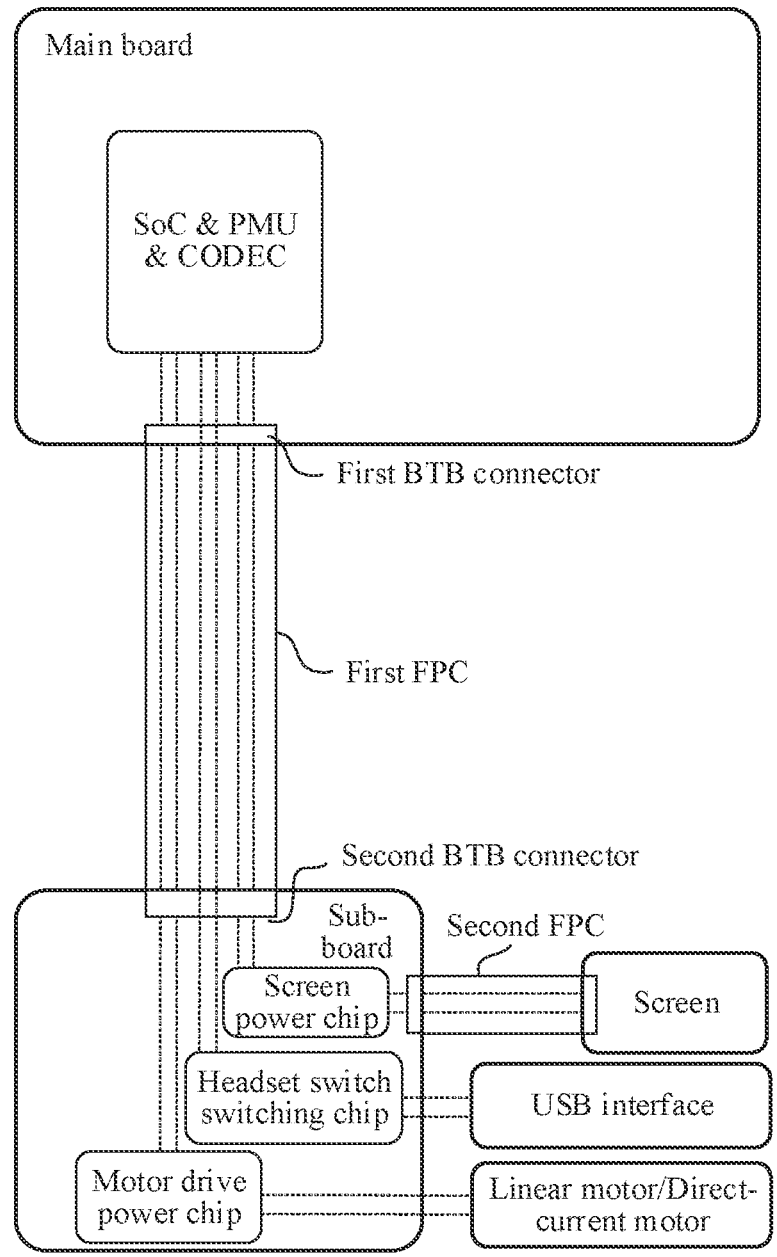

In another exemplary embodiment, as shown in FIG. 21, the screen FPC can also be combined into the main and sub-board FPC. The other parts are the same as those in FIG. 20, and details are not described herein again.

① Move a Backlight Power Chip, a Headset Switch Switching Chip, and a Motor Drive Power Chip from a Main Board to a Sub-Board Combination and optimization of signals passing through the main board BTB connector after the backlight power chip, the headset switch switching chip, and the motor drive power chip are moved from the main board to the sub-board are shown in Table 25.

As shown in Table 25, after the backlight power chip, the headset switch switching chip, and the motor drive power chip are moved from the main board to the sub-board, a total quantity of signals passing through the main board BTB connector remains unchanged, but the occupied area on the main board is saved, which optimizes the layout of the main board.

TABLE 25

| Target circuit module on main board | | | Optimization solution for target circuit module on sub-board | | | Descriptions of combination and optimization |
|---|---|---|---|---|---|---|
| Target circuit module | Output signal | Quantity of occupied BTB pins | Quantity of occupied BTB pins | Input signal | | |
| Backlight power chip | LEDA | 7 | 7 (4 after combination) | VPH-PWR | System total power supply signal | |
| | LED1- | | | VPH-PWR | System total power supply signal | |
| | LED2- | | | SDA1 | Control signal, I2C signal | Used together with SDA3 and SCL3 of motor drive power chip, to save 2 pins up power Connected to VPH-PWR or default pull-supply, to save 1 pin |
| | LED3- | | | SCL1 | | |
| | LED4- | | | LCD_EN | Backlight enable signal | |
| | VSP | | | VSP_EN | Positive bias enable signal | |
| | VSN | | | VSN_EN | Negative bias enable signal | |
| Headset switch switching chip | SBU1 | 4 | 12 (9 after combination) | MIC | Headset microphone input signal | |
| | SBU2 | | | SGND | Feedback ground | |
| | DP | | | AGND | Analog ground | |
| | DN | | | SDA2 | Control signal, I2C signal | Used together with SDA3 and SCL3, to save 2 pins |
| | | | | SCL2 | | |
| | | | | DP | Data positive signal | |
| | | | | DN | Data negative signal | |
| | | | | HSL | Left channel signal | |
| | | | | HSR | Right channel signal | |
| | | | | EN | Enable signal | |
| | | | | INT | Interrupt signal | |
| | | | | VPH-PWR | System total power supply signal | Combined with VPH-PWR of backlight power chip, to save 1 pin |
| Motor drive power chip | VIBR_P | 2 | 5 (4 after combination) | VPH-PWR | System total power supply signal | Combined with VPH-PWR of backlight power chip, to save 1 pin |

TABLE 25-continued

| Target circuit module on main board | | | Optimization solution for target circuit module on sub-board | | | Descriptions of combination and optimization |
|---|---|---|---|---|---|---|
| Target circuit module | Output signal | Quantity of occupied BTB pins | Quantity of occupied BTB pins | Input signal | | |
| | VIBR_N | | | MOTOR_INT | Interrupt signal | |
| | | | | MOTOR_EN | Enable signal | |
| | | | | SDA3 | Control signal, I2C signal | |
| | | | | SCL3 | | |
| Other adjustment | Other signal adjustment | 4 | | | | |
| TOTAL | | 17 | 24 (17 after combination) | | | Save no pin, but adjust layout |

① Move an OLED Drive Chip, a Headset Switch Switching Chip, and a Motor Drive Power Chip from a Main Board to a Sub-Board Descriptions of combination and optimization of signals passing through the main board BTB connector after the OLED drive chip, the headset switch switching chip, and the motor drive power chip are moved from the main board to the sub-board are shown in Table 26.

As shown in Table 26, a total quantity of signals passing through the main board BTB connector remains unchanged after the three chips are moved from the main board to the sub-board, but the occupied area on the main board is saved, which optimizes the layout of the main board.

TABLE 26

| Target circuit module on main board | | | Optimization solution for target circuit module on sub-board | | | Descriptions of combination and optimization |
|---|---|---|---|---|---|---|
| Target circuit module | Output signal | Quantity of occupied BTB pins | Quantity of occupied BTB pins | Input signal | | |
| OLED drive chip | ELVDD | 7 | 4 | VPH-PWR | System total power supply signal | |
| | ELVDD | | | VPH-PWR | System total power supply signal | |
| | ELVSS | | | VPH-PWR | System total power supply signal | |
| | ELVSS | | | OLED_ERR | OLED error signal | |
| | VIN | | | | | |
| | ELVDD_EN | | | | | |
| | AVDD_EN | | | | | |
| Headset switch switching chip | SBU1 | 4 | 12 (9 after combination) | MIC | Headset microphone input signal | |
| | SBU2 | | | SGND | Feedback ground | |
| | DP | | | AGND | Analog ground | |
| | DN | | | SDA1 | Control signal, I2C signal | Used together with SDA2 and SCL2, to save 2 pins |
| | | | | SCL1 | | |
| | | | | DP | Data positive signal | |

TABLE 26-continued

| Target circuit module on main board | | | Optimization solution for target circuit module on sub-board | | Descriptions of combination and optimization |
|---|---|---|---|---|---|
| Target circuit module | Output signal | Quantity of occupied BTB pins | Quantity of occupied BTB pins | Input signal | |
| | | | | DN | Data negative signal |
| | | | | HSL | Left channel signal |
| | | | | HSR | Right channel signal |
| | | | | EN | Enable signal |
| | | | | INT | Interrupt signal |
| | | | | VPH-PWR | System total power supply signal | Combined with VPH-PWR of OLED drive chip, to save 1 pin |
| Motor drive power chip | VIBR_P | 2 | 5 (4 after combination) | VPH-PWR | System total power supply signal | Combined with VPH-PWR of OLED drive chip, to save 1 pin |
| | VIBR_N | | | MOTOR_INT | Interrupt signal |
| | | | | MOTOR_EN | Enable signal |
| | | | | SDA2 | Control signal, I2C signal |
| | | | | SCL2 | |
| Other adjustment | Other signal adjustment | 4 | | | |
| TOTAL | | 17 | 21 (17 after combination) | | Save no pin, but adjust layout |

Figure 22:
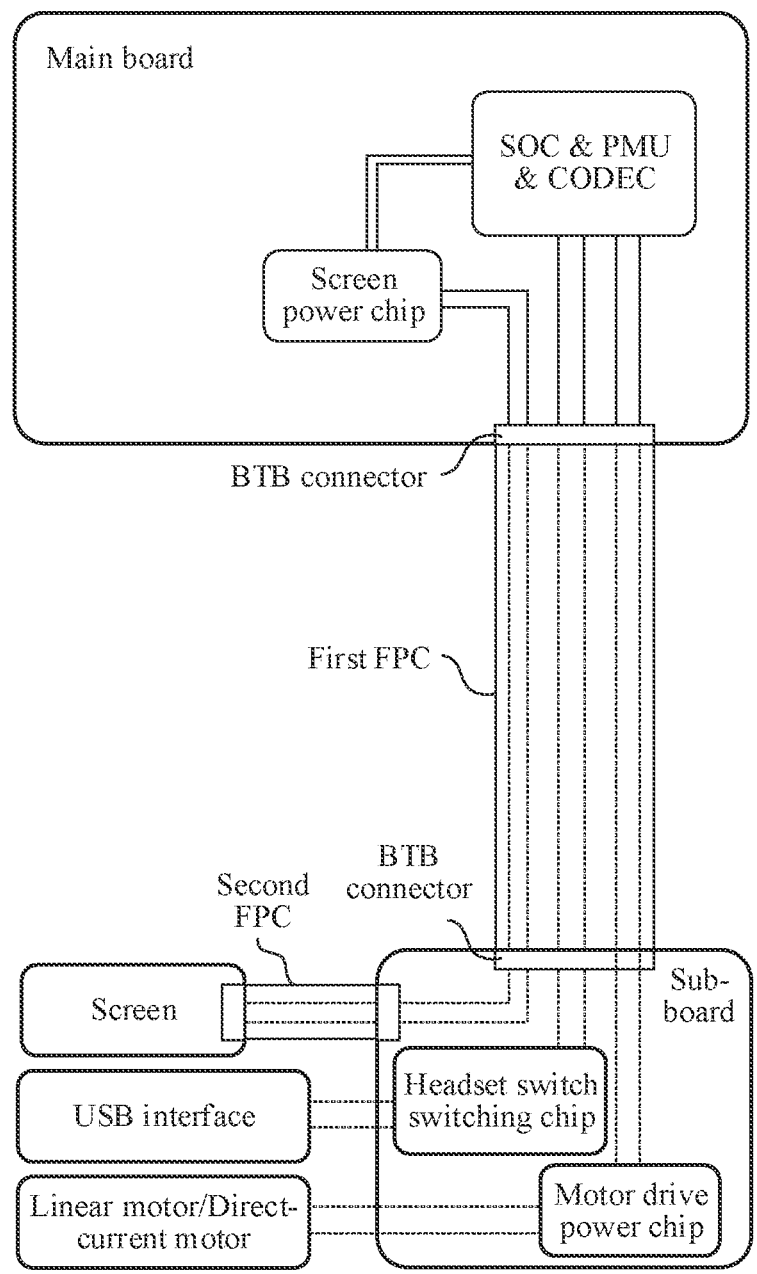

Embodiment 10: Move a Headset Switch Switching Chip, and a Motor Drive Power Chip from a Main Board to a Sub-Board As shown in FIG. 22, the headset switch switching chip and the motor drive power chip are moved from the main board to the sub-board. In addition, the screen FPC is combined into the main and sub-board FPC (that is, the first FPC). The screen power chip is located on the main board, and an output signal of the screen power chip is transmitted to the screen chip through the first FPC and the second FPC. The SOC chip on the main board is provided for transmitting input signals of the headset switch switching chip and the motor drive power chip to corresponding chips through the first FPC, and output signals of the two chips are transmitted to corresponding circuits or chips.

Figure 23:
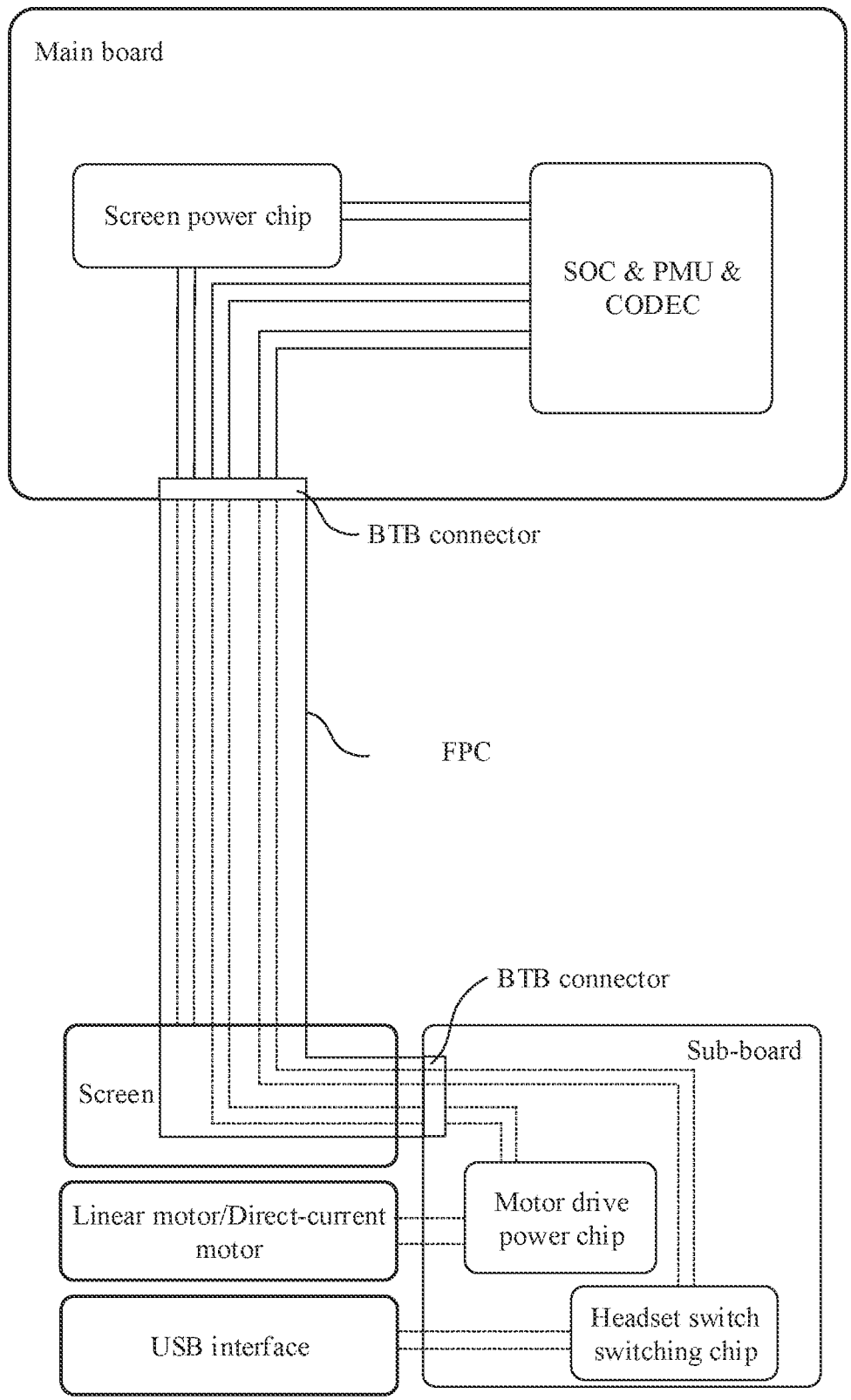

In another exemplary embodiment, as shown in FIG. 23, the headset switch switching chip and the motor drive power chip are moved from the main board to the sub-board. In addition, the main and sub-board FPC is combined into the screen FPC, that is, the FPC in FIG. 23.

As shown in Table 27, the control signals SDA1 and SCL1 of the headset switch switching chip can be used together with SDA2 and SCL2 of the motor drive power chip, to save 2 pins. VPH-PWR of the motor drive power chip is combined with VPH-PWR of the headset switch switching chip, to save 1 pin. In addition, after the two chips are moved from the main board to the sub-board, other signals (for example, GND signals) can be combined and adjusted. A quantity of signals passing through the main board BTB connector remains unchanged, but the occupied area on the main board is saved, which optimizes the layout of the main board.

TABLE 27

| Target circuit module on main board | | | Optimization solution for target circuit module on sub-board | | Descriptions of combination and optimization |
|---|---|---|---|---|---|
| Target circuit module | Output signal | Quantity of occupied BTB pins | Quantity of occupied BTB pins | Input signal | |
| Headset switch switching chip | SBU1 | 4 | 12 (10 after combination) | MIC | Headset microphone input signal |
| | SBU2 | | | SGND | Feedback ground |
| | DP | | | AGND | Analog ground |
| | DN | | | SDA1 | Control signal, I2C signal | Used together with SDA2 and SCL2, to save 2 pins |
| | | | | SCL1 | |
| | | | | DP | Data positive signal |
| | | | | DN | Data negative signal |
| | | | | HSL | Left channel signal |
| | | | | HSR | Right channel signal |
| | | | | EN | Enable signal |
| | | | | INT | Interrupt signal |
| | | | | VPH-PWR | System total power supply signal |
| Motor drive power chip | VIBR_P | 2 | 5 (4 after combination) | VPH-PWR | System total power supply signal | Combined with VPH-PWR of headset switch switching chip, to save 1 pin |
| | VIBR_N | | | MOTOR_INT | Interrupt signal |
| | | | | MOTOR_EN | Enable signal |
| | | | | SDA2 | Control signal, I2C signal |
| | | | | SCL2 | |
| Other adjustment | Other signal adjustment | 8 | | | |
| TOTAL | | 14 | 17 (14 after combination) | | Save no pin, but adjust layout |

Figure 24:
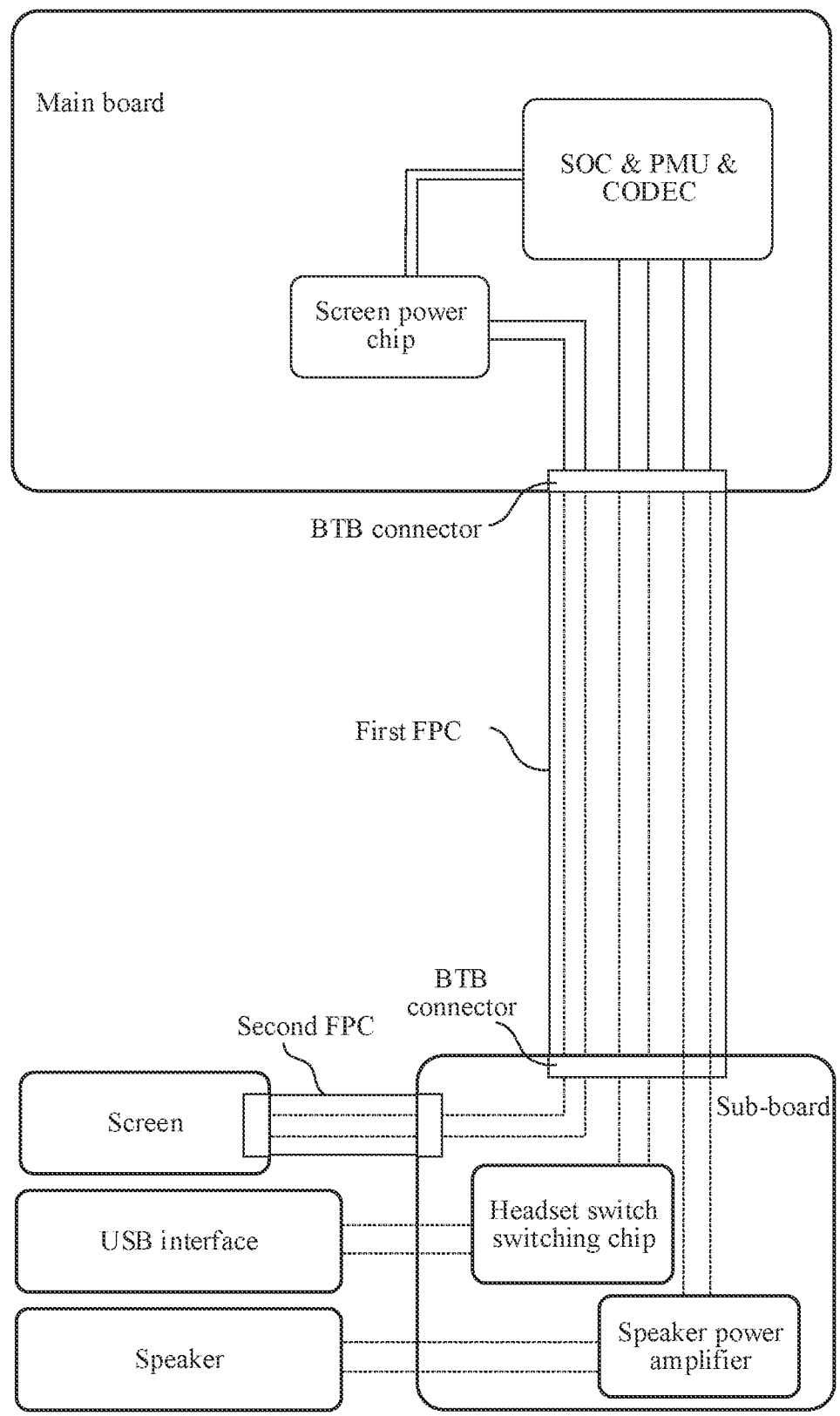

Embodiment 11: Move a Headset Switch Switching Chip and a Speaker Power Amplifier from a Main Board to a Sub-Board In this embodiment, the motor drive power chip in FIG. 22 can be replaced by a speaker power amplifier. As shown in FIG. 24, the headset switch switching chip and the speaker power amplifier are moved from the main board to the sub-board. In addition, the screen FPC is combined into the main and sub-board FPC, to obtain the first FPC.

Figure 25:
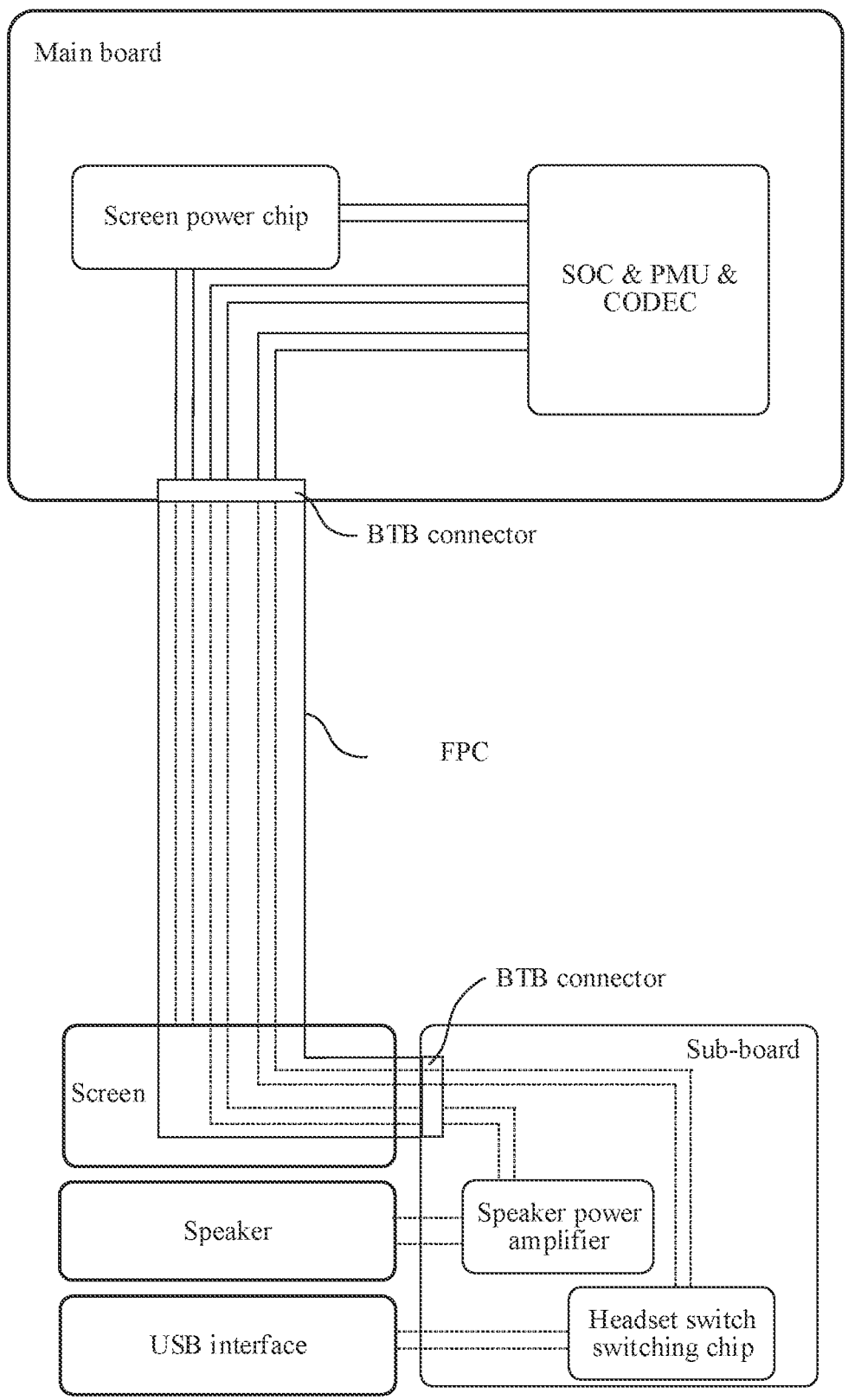

In another exemplary embodiment, as shown in FIG. 25, the exemplary embodiment differs from the embodiment shown in FIG. 24 in that: the main and sub-board FPC is combined into the screen FPC, that is, the FPC in FIG. 25. The other parts are the same as those in FIG. 24, and details are not described herein again.

① Move an Analog SPK PA and a Headset Switch Switching Chip from a Main Board to a Sub-Board In a scenario, the speaker power amplifier may be an analog SPK PA capable of processing analog sound signals.

As shown in Table 28, after the analog SPK PA and the headset switch switching chip are moved from the main board to the sub-board, a total quantity of signals passing through the main board BTB connector remains unchanged, but the occupied area on the main board is saved, which optimizes the layout of the main board.

TABLE 28

| Target circuit module on main board | | | Optimization solution for target circuit module on sub-board | | Descriptions of combination and optimization |
|---|---|---|---|---|---|
| Target circuit module | Output signal | Quantity of occupied BTB pins | Quantity of occupied BTB pins | Input signal | |
| Headset switch switching chip | SBU1 | 4 | 12 (9 after combination) | MIC | Headset microphone input signal |
| | SBU2 | | | SGND | Feedback ground |
| | DP | | | AGND | Analog ground |
| | DN | | | SDA1 SCL1 | Control signal, I2C signal | Used together with SDA2 and SCL2, to save 2 pins |
| | | | | DP | Data positive signal |
| | | | | DN | Data negative signal |
| | | | | HSL | Left channel signal |
| | | | | HSR | Right channel signal |
| | | | | EN | Enable signal |
| | | | | INT | Interrupt signal |
| | | | | VPH-PWR | System total power supply signal | Combined with VPH-PWR of analog SPK PA, to save 1 pin |
| Analog SPK PA | SPKP | 4 | 6 (4 after combination) | LINOUTP | Platform output audio positive signal | Combined with HSL of headset switch switching chip |
| | SPKP | | | LINOUTN | Platform output audio negative signal | Combined with SGND of headset switch switching chip |
| | SPKN | | | VPH-PWR | System total power supply signal |
| | SPKN | | | VPH-PWR | System total power supply signal |
| | | | | SDA2 SCL2 | Control signal, I2C signal |
| Other adjustment | Other signal adjustment | 5 | | | |
| TOTAL | | 13 | 18 (13 after combination) | | Save no pin, but adjust layout |

② Move a SPK PA and a Headset Switch Switching Chip from a Main Board to a Sub-Board In another scenario, the speaker power amplifier may be a SMART PA capable of processing digital sound signals.

As shown in Table 29, after the SMART PA and the headset switch switching chip are moved from the main board to the sub-board, a total quantity of signals passing through the main board BTB connector remains unchanged, but the occupied area on the main board is saved, which optimizes the layout of the main board.

Embodiment 12: Move a Headset Switch Switching Chip, a Motor Drive Power Chip, and a Speaker Power Amplifier from a Main Board to a Sub-Board In this embodiment, based on Embodiment 10, the motor drive power chip can be further moved from the main board to the sub-board.

Figure 26:
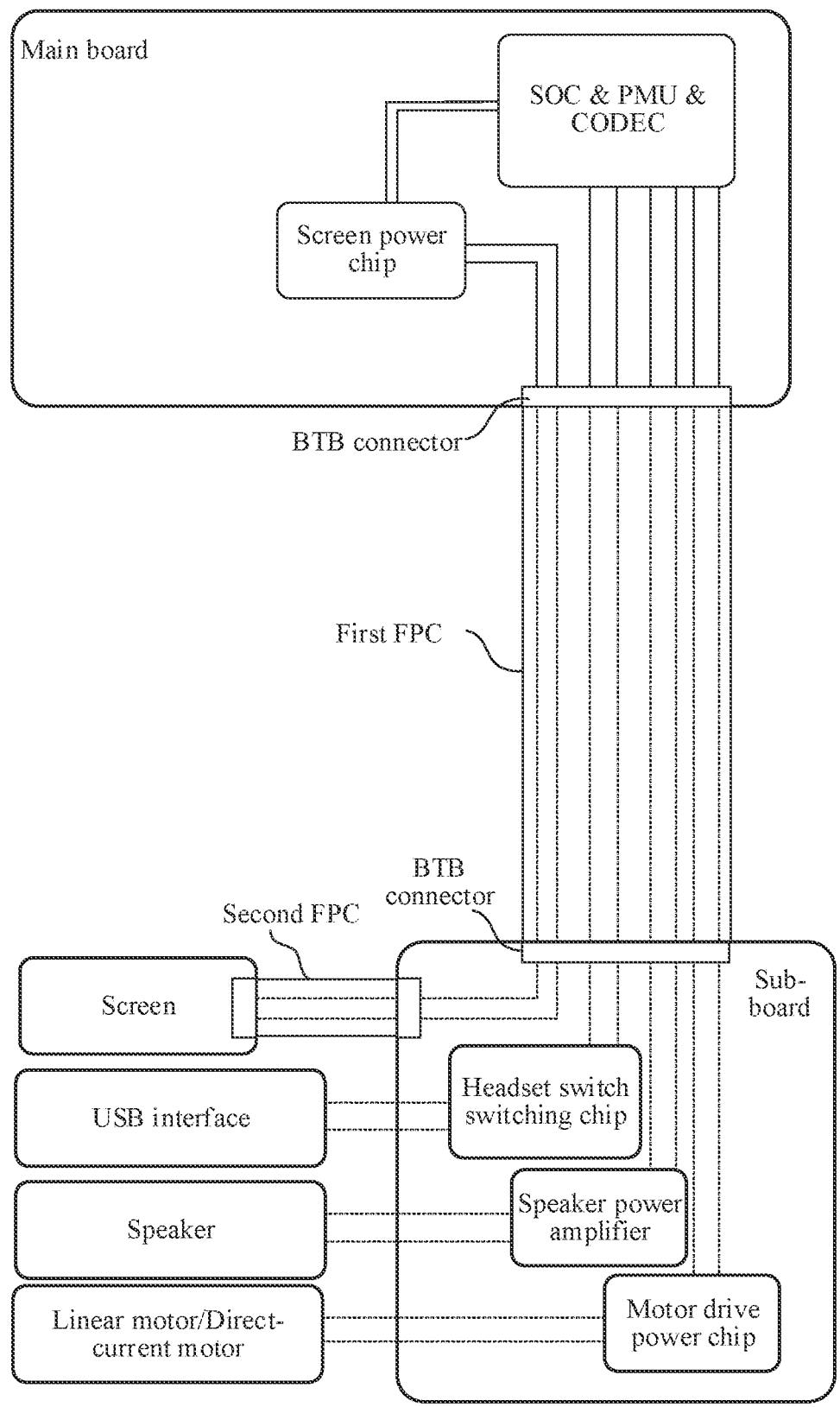

As shown in FIG. 26, in this embodiment, based on FIG. 24, the motor drive power chip can be further moved from

TABLE 29

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | | Input signal | Descriptions of combination and optimization |
| Headset switch switching chip | SBU1 | 4 | 12 (9 after combination) | MIC | Headset microphone input signal | |
| | SBU2 | | | SGND | Feedback ground | |
| | DP | | | AGND | Analog ground | |
| | DN | | | SDA2 | Control signal | Used together with SDA3 and SCL3, to save 2 pins |
| | | | | SCL2 | | |
| | | | | DP | Data positive signal | |
| | | | | DN | Data negative signal | |
| | | | | HSL | Left channel signal | |
| | | | | HSR | Right channel signal | |
| | | | | EN | Enable signal | |
| | | | | INT | Interrupt signal | |
| | | | | VPH-PWR | System total power supply signal | Combined with VPH-PWR of SMART PA chip, to save 1 pin |
| Speaker power amplifier (SMART PA) | SPKP | 4 | 11 (10 after combination) | VPH-PWR | System total power supply signal | |
| | SPKP | | | VPH-PWR | System total power supply signal | |
| | SPKN | | | I2S_DI | Digital signal exchanged between SMART PA and SOC chip on main board | |
| | SPKN | | | I2S_DO | | |
| | | | | I2S_CLK | Clock signal | |
| | | | | I2S_SYNC | Synchronization signal | |
| | | | | SDA3 | Control signal, I2C signal | |
| | | | | SCL3 | | |
| | | | | INT | Interrupt signal | |
| | | | | RST | Reset signal | |
| | | | | VIO_1.8 V | Direct-current power signal | Combined with antenna switch power supply on sub-board, to save 1 pin |
| Other adjustment | Other signal adjustment | 11 | | | | |
| TOTAL | | 19 | 23 (19 after combination) | | | Save no pin, but adjust layout | the main board to the sub-board, and the screen FPC is combined with the main and sub-board FPC, that is, the first FPC in FIG. 26.

Figure 27:
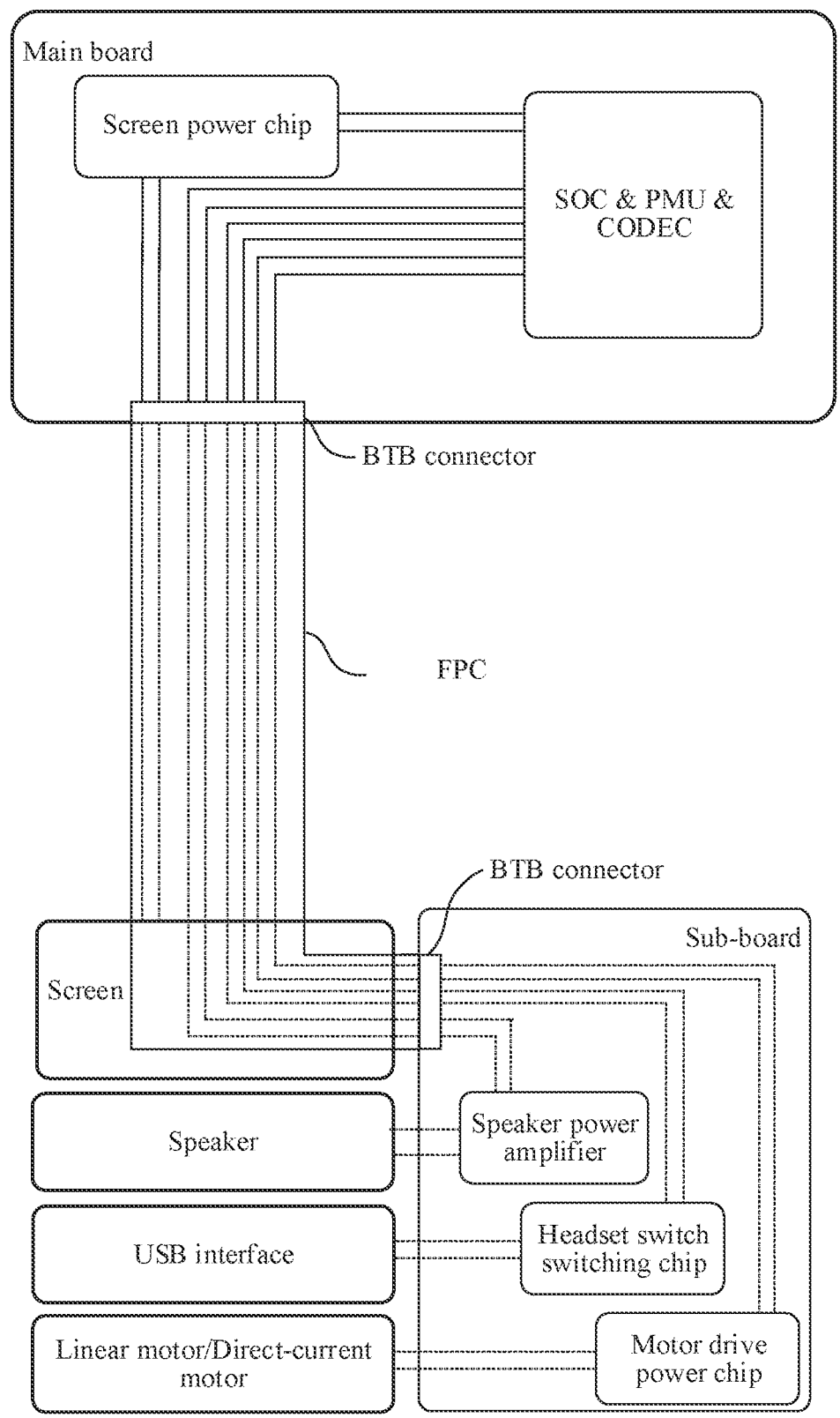

In another exemplary embodiment, as shown in FIG. 27, in this embodiment, based on FIG. 25, the motor drive power chip is further moved from the main board to the sub-board, and the main and sub-board FPC is combined into the screen FPC, that is, the FPC in FIG. 27.

① Move a Headset Switch Switching Chip, a Motor Drive Power Chip, and an Analog SPK PA from a Main Board to a Sub-Board As shown in Table 30, after the headset switch switching chip, the motor drive power chip, and the analog SPK PA are moved from the main board to the sub-board, a total quantity of other signals that need to be adjusted and signals passing through the main board BTB connector remains unchanged, but the occupied area on the main board is saved, which optimizes the layout of the main board.

TABLE 30

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| Headset switch switching chip | SBU1 | 4 | 12 (9 after combination) | MIC | Headset microphone input signal | |
| | SBU2 | | | SGND | Feedback ground | |
| | DP | | | AGND | Analog ground | |
| | DN | | | SDA1 SCL1 | Control signal, I2C signal | Used together with SDA3 and SCL3, to save 2 pins |
| | | | | DP | Data positive signal | |
| | | | | DN | Data negative signal | |
| | | | | HSL | Left channel signal | |
| | | | | HSR | Right channel signal | |
| | | | | EN | Enable signal | |
| | | | | INT | Interrupt signal | |
| | | | | VPH-PWR | System total power supply signal | Combined with VPH-PWR of analog SPK PA, to save 1 pin |
| Motor drive power chip | VIBR_P | 2 | 5 (2 after combination) | VPH-PWR | System total power supply signal | Combined with VPH-PWR of analog SPK PA, to save 1 pin |
| | VIBR_N | | | MOTOR_INT | Interrupt signal | |
| | | | | MOTOR_EN | Enable signal | |
| | | | | SDA2 SCL2 | Control signal, I2C signal | Used together with SDA3 and SCL3, to save 2 pins |
| Analog SPK PA | SPKP | 4 | 6 (4 after combination) | LINOUTP | Platform output audio positive signal | Combined with HSL of headset switch switching chip |
| | SPKP | | | LINOUTN | Platform output audio negative signal | Combined with SGND of headset switch switching chip |
| | SPKN | | | VPH-PWR | System total power supply signal | |
| | SPKN | | | VPH-PWR | System total power supply signal | |

TABLE 30-continued

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| | | | | SDA3 SCL3 | Control signal, I2C signal | |
| Other adjustment | Other signal adjustment | 5 | | | | |
| TOTAL | | 15 | 23 (15 after combination) | | | Save no pin, but adjust layout |

② Move a Headset Switch Switching Chip, a Motor Drive Power Chip, and a SMART PA from a Main Board to a Sub-Board In another application scenario, the speaker power amplifier may be a SMART PA capable of processing digital sound signals. In this scenario, as shown in Table 31, after the headset switch switching chip, the motor drive power chip, and the SMART PA are moved from the main board to the sub-board, a total quantity of signals passing through the main board BTB connector remains unchanged, but the occupied area on the main board is saved, which optimizes the layout of the main board.

TABLE 31

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| Headset switch switching chip | SBU1 | 4 | 12 (9 after combination) | MIC | Headset microphone input signal | |
| | SBU2 | | | SGND | Feedback ground | |
| | DP | | | AGND | Analog ground | |
| | DN | | | SDA1 SCL1 | Control signal, I2C signal | Used together with SDA3 and SCL3, to save 2 pins |
| | | | | DP | Data positive signal | |
| | | | | DN | Data negative signal | |
| | | | | HSL | Left channel signal | |
| | | | | HSR | Right channel signal | |
| | | | | EN | Enable signal | |
| | | | | INT | Interrupt signal | |
| | | | | VPH-PWR | System total power supply signal | Combined with VPH-PWR of SMART PA, to save 1 pin |
| Motor drive power chip | VIBR_P | 2 | 5 (2 after combination) | VPH-PWR | System total power supply signal | Combined with VPH-PWR of SMART PA, to save 1 pin |
| | VIBR_N | | | MOTOR_INT | Interrupt signal | |
| | | | | MOTOR_EN | Enable signal | |
| | | | | SDA2 SCL2 | Control signal, I2C signal | Used together with SDA3 and SCL3, to save 2 pins |

TABLE 31-continued

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| Speaker power amplifier (SMART PA) | SPKP | 4 | 11 (10 after combination) | VPH-PWR | System total power supply signal | |
| | SPKP | | | VPH-PWR | System total power supply signal | |
| | SPKN | | | I2S_DI | Digital signal exchanged between SMART PA and SOC chip on main board | |
| | SPKN | | | I2S_DO | | |
| | | | | I2S_CLK | Clock signal | |
| | | | | I2S_SYNC | Synchronization signal | |
| | | | | SDA3 | Control signal, I2C signal | |
| | | | | SCL3 | | |
| | | | | INT | Interrupt signal | |
| | | | | RST | Reset signal | |
| | | | | VIO_1.8 V | Direct-current power signal | Combined with antenna switch power supply on sub-board, to save 1 pin |
| Other adjustment | Other signal adjustment | 11 | | | | |
| TOTAL | | 21 | 28 (21 after combination) | | | Save no pin, but adjust layout |

Figure 28:
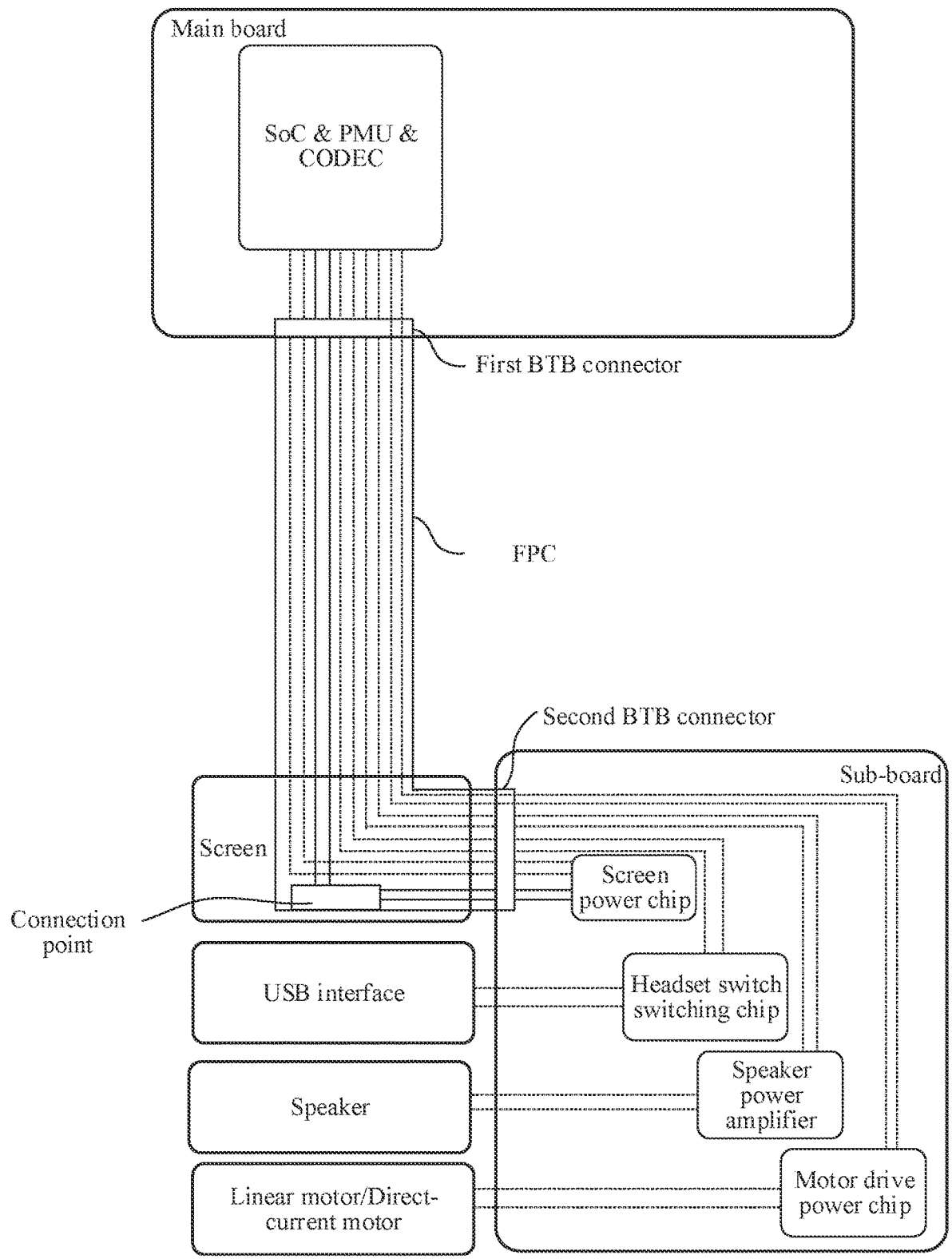

Embodiment 13: Move a Screen Power Chip, a Headset Switch Switching Chip, a Motor Drive Power Chip, and a Speaker Power Amplifier from a Main Board to a Sub-Board As shown in FIG. 28, the screen power chip, the speaker power amplifier, the headset switch switching chip, and the motor drive power chip are moved from the main board to the sub-board, and the main and sub-board FPC is combined into the screen FPC, to obtain one FPC after the combination, that is, the FPC in FIG. 28. Signals provided by the SOC chip on the main board to the screen and the foregoing four chips are transmitted to the screen through the first BTB connector and the FPC, and further, signals on the foregoing four chips are transmitted to the sub-board. Further, the foregoing four chips transmit their respective output signals to corresponding hardware modules.

Figure 29:
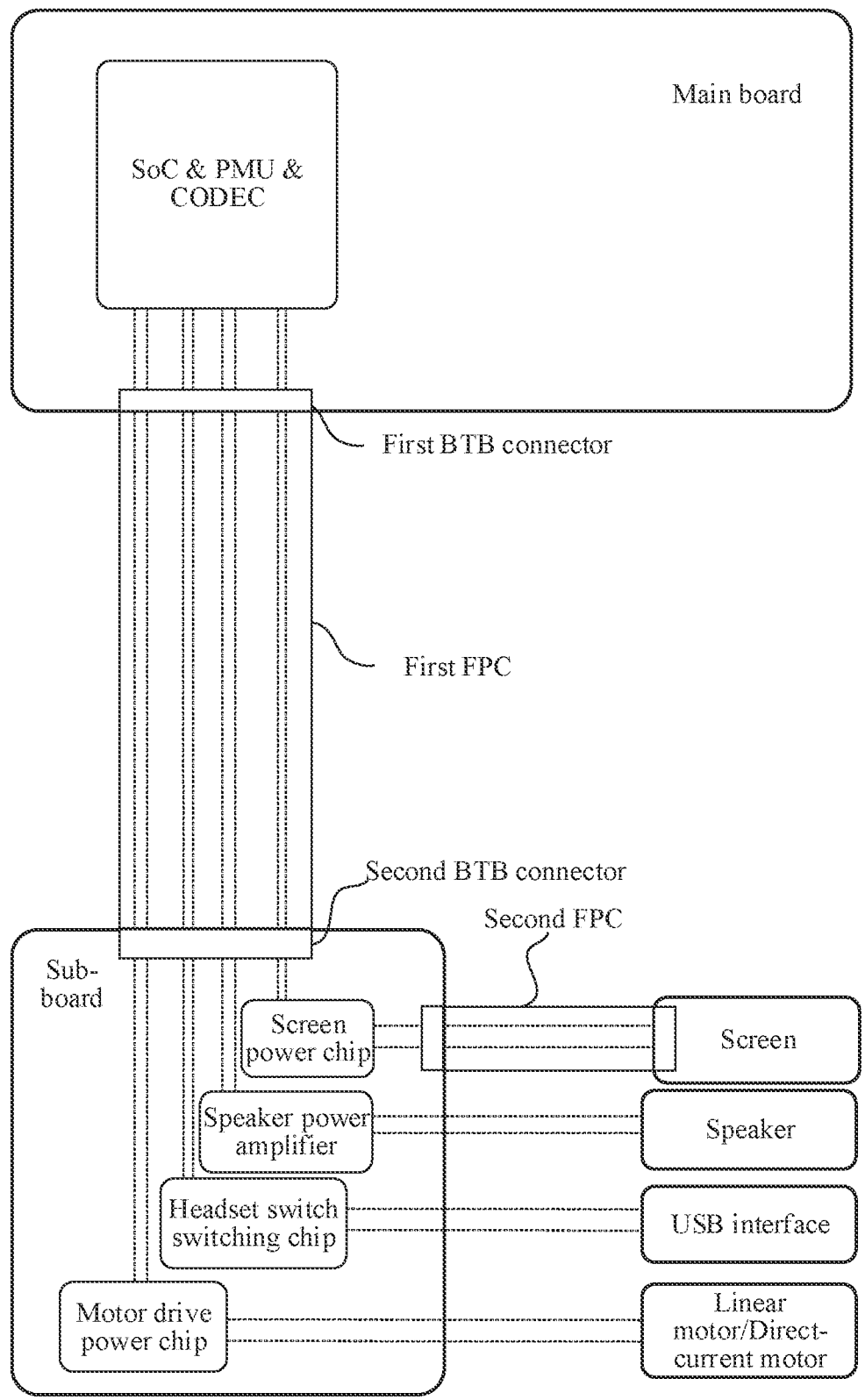

In addition, as shown in FIG. 29, the screen FPC may also be combined into the main and sub-board FPC, that is, the first FPC in FIG. 29. Signals between the screen power chip and the screen chip are transmitted through the second FPC.

① Move a Backlight Power Chip, a Headset Switch Switching Chip, a Motor Drive Power Chip, and an Analog SPK PA from a Main Board to a Sub-Board In a scenario, if the screen is an LCD, the screen power chip is a backlight power chip, and the speaker power amplifier is an analog SPK PA capable of processing analog sound signals. In this scenario, as shown in Table 32, a total quantity of signals passing through the main board BTB connector remains unchanged after the four chips are moved from the main board to the sub-board, but the occupied area on the main board is saved, which optimizes the layout of the main board.

TABLE 32

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| Backlight power chip | LEDA | 7 | 7 (4 after combination) | VPH-PWR | System total power supply signal | |
| | LED1- | | | VPH-PWR | System total power supply signal | |

TABLE 32-continued

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| | LED2- | | | SDA1 | Control signal, I2C signal | Used together with SDA4 and SCL4 of analog SPK PA, to save 2 pins |
| | LED3- | | | SCL1 | | |
| | LED4- | | | LCD_EN | Backlight enable signal | Connected to VPH-PWR or default pull-up power supply, to save 1 pin |
| | VSP | | | VSP_EN | Positive bias enable signal | |
| | VSN | | | VSN_EN | Negative bias enable signal | |
| Headset switch switching chip | SBU1 | 4 | 12 (9 after combination) | MIC | Headset microphone input signal | |
| | SBU2 | | | SGND | Feedback ground | |
| | DP | | | AGND | Analog ground | |
| | DN | | | SDA2 | Control signal, I2C signal | Used together with SDA4 and SCL4 of analog SPK PA, to save 2 pins |
| | | | | SCL2 | | |
| | | | | DP | Data positive signal | |
| | | | | DN | Data negative signal | |
| | | | | HSL | Left channel signal | |
| | | | | HSR | Right channel signal | |
| | | | | EN | Enable signal | |
| | | | | INT | Interrupt signal | |
| | | | | VPH-PWR | System total power supply signal | Combined with VPH-PWR of backlight power supply, to save 1 pin |
| Motor drive power chip | VIBR_P | 2 | 5 (2 after combination) | VPH-PWR | System total power supply signal | Combined with VPH-PWR of backlight power supply, to save 1 pin |
| | VIBR_N | | | MOTOR_INT | Interrupt signal | |
| | | | | MOTOR_EN | Enable signal | |
| | | | | SDA3 | Control signal, I2C signal | Used together with SDA4 and SCL4, to save 2 pins |
| | | | | SCL3 | | |
| Analog SPK PA | SPKP | 4 | 6 (3 after combination) | LINOUTP | Platform output audio positive signal | Combined with HSL of headset switch switching chip |
| | SPKP | | | LINOUTN | Platform output audio negative signal | Combined with SGND of headset switch switching chip |

TABLE 32-continued

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | | Input signal | Descriptions of combination and optimization |
| | SPKN | | | VPH-PWR | System total power supply signal | Combined with VPH-PWR of backlight power supply, to save 1 pin |
| | SPKN | | | VPH-PWR | System total power supply signal | |
| | | | | SDA4 | Control signal, I2C signal | |
| | | | | SCL4 | | |
| Other adjustment | Other signal adjustment | 1 | | | | |
| TOTAL | | 18 | 30 (18 after combination) | | | Save no pin, but adjust layout |

② Backlight Power Chip, Headset Switch Switching Chip, Motor Drive Power Chip, and SMART PA In another scenario, the speaker power amplifier may also be a SMART PA capable of processing digital sound signals. In this scenario, as shown in Table 33, this solution does not save a quantity of pins of the main board BTB connector, but the occupied area on the main board is saved, which optimizes the layout of the main board.

TABLE 33

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| Backlight power chip | LEDA | 7 | 7 (4 after combination) | VPH-PWR | System total power supply signal | |
| | LED1- | | | VPH-PWR | System total power supply signal | |
| | LED2- | | | SDA1 | Control signal, I2C signal | Used together with SDA4 and SCL4 of SMART PA, to save 2 pins |
| | LED3- | | | SCL1 | | |
| | LED4- | | | LCD_EN | Backlight enable signal | Connected to VPH-PWR or default pull-up power supply, to save 1 pin |
| | VSP | | | VSP_EN | Positive bias enable signal | |
| | VSN | | | VSN_EN | Negative bias enable signal | |
| Headset switch switching chip | SBU1 | 4 | 12 (9 after combination) | MIC | Headset microphone input signal | |
| | SBU2 | | | SGND | Feedback ground | |
| | DP | | | AGND | Analog ground | |
| | DN | | | SDA2 | Control signal, I2C signal | Used together with SDA4 and SCL4, to save 2 pins |
| | | | | SCL2 | | |
| | | | | DP | Data positive signal | |

TABLE 33-continued

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| | | | | DN | Data negative signal | |
| | | | | HSL | Left channel signal | |
| | | | | HSR | Right channel signal | |
| | | | | EN | Enable signal | |
| | | | | INT | Interrupt signal | |
| | | | | VPH-PWR | System total power supply signal | Combined with VPH-PWR of backlight power supply, to save 1 pin |
| Motor drive power chip | VIBR_P | 2 | 5 (2 after combination) | VPH-PWR | System total power supply signal | Combined with VPH-PWR of backlight power supply, to save 1 pin |
| | VIBR_N | | | MOTOR_INT | Interrupt signal | |
| | | | | MOTOR_EN | Enable signal | |
| | | | | SDA3 | Control signal, I2C signal | Used together with SDA4 and SCL4, to save 2 pins |
| | | | | SCL3 | | |
| Speaker power amplifier (SMART PA) | SPKP | 4 | 11 (9 after combination) | VPH-PWR | System total power supply signal | Combined with VPH-PWR of backlight power supply, to save 1 pin |
| | SPKP | | | VPH-PWR | System total power supply signal | |
| | SPKN | | | I2S_DI | Digital signal exchanged between SMART PA and SOC chip on main board | |
| | SPKN | | | I2S_DO | | |
| | | | | I2S_CLK | Clock signal | |
| | | | | I2S_SYNC | Synchronization signal | |
| | | | | SDA4 | Control signal, I2C signal | |
| | | | | SCL4 | | |
| | | | | INT | Interrupt signal | |
| | | | | RST | Reset signal | |
| | | | | VIO_1.8 V | Direct-current power signal | Combined with antenna switch power supply on sub-board, to save 1 pin |
| Other adjustment | Other signal adjustment | 8 | | | | |
| TOTAL | | 24 | 35 (24 after combination) | | | Save no pin, but adjust layout |

③ OLED Drive Chip, Headset Switch Switching Chip, Motor Drive Power Chip, and Analog SPK PA In another exemplary embodiment, if the screen is an OLED, the screen power chip is an OLED drive chip, and the speaker power amplifier is an analog SPK PA capable of processing analog sound signals. As shown in Table 34, a total quantity of signals passing through the main board BTB connector remains unchanged after the foregoing chips are moved from the main board to the sub-board, but the occupied area on the main board is saved, which optimizes the layout of the main board.

TABLE 34

| | Target circuit module on main board | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| OLED drive chip | ELVDD | 7 | 4 | VPH-PWR | System total power supply signal | |
| | ELVDD | | | VPH-PWR | System total power supply signal | |
| | ELVSS | | | VPH-PWR | System total power supply signal | |
| | ELVSS | | | OLED_ERR | OLED error signal | |
| | VIN | | | | | |
| | ELVDD_EN | | | | | |
| | AVDD_EN | | | | | |
| Headset switch switching chip | SBU1 | 4 | 12 (9 after combination) | MIC | Headset microphone input signal | |
| | SBU2 | | | SGND | Feedback ground | |
| | DP | | | AGND | Analog ground | |
| | DN | | | SDA2 | Control signal, I2C signal | Used together with SDA4 and SCL4, to save 2 pins |
| | | | | SCL2 | | |
| | | | | DP | Data positive signal | |
| | | | | DN | Data negative signal | |
| | | | | HSL | Left channel signal | |
| | | | | HSR | Right channel signal | |
| | | | | EN | Enable signal | |
| | | | | INT | Interrupt signal | |
| | | | | VPH-PWR | System total power supply signal | Combined with VPH-PWR of backlight, to save 1 pin |
| Motor drive power chip | VIBR_P | 2 | 5 (2 after combination) | VPH-PWR | System total power supply signal | Combined with VPH-PWR of backlight, to save 1 pin |
| | VIBR_N | | | MOTOR_INT | Interrupt signal | |
| | | | | MOTOR_EN | Enable signal | |
| | | | | SDA3 | Control signal, I2C signal | Used together with SDA4 and SCL4, to save 2 pins |
| | | | | SCL3 | | |
| Analog SPK PA | SPKP | 4 | 6 (3 after combination) | LINOUTP | Platform output audio positive signal | Combined with HSL of headset switch switching chip |
| | SPKP | | | LINOUTN | Platform output audio negative signal | Combined with SGND of headset switch switching chip |

TABLE 34-continued

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| | SPKN | | | VPH-PWR | System total power supply signal | Combined with VPH-PWR of backlight, to save 1 pin |
| | SPKN | | | VPH-PWR | System total power supply signal | |
| | | | | SDA4 | Control signal, I2C signal | |
| | | | | SCL4 | | |
| Other adjustment | Other signal adjustment | 1 | | | | |
| TOTAL | | 18 | 27 (18 after combination) | | | Save no pin, but adjust layout |

④ Move an OLED Drive Chip, a Headset Switch Switching Chip, a Motor Drive Power Chip, and a SMART PA from a Main Board to a Sub-Board

TABLE 35

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| OLED drive chip | ELVDD | 7 | 4 | VPH-PWR | System total power supply signal | |
| | ELVDD | | | VPH-PWR | System total power supply signal | |
| | ELVSS | | | VPH-PWR | System total power supply signal | |
| | ELVSS | | | OLED_ERR | OLED error signal | |
| | VIN | | | | | |
| | ELVDD_EN | | | | | |
| | AVDD_EN | | | | | |
| Headset switch switching chip | SBU1 | 4 | 12 (9 after combination) | MIC | Headset microphone input signal | |
| | SBU2 | | | SGND | Feedback ground | |
| | DP | | | AGND | Analog ground | |
| | DN | | | SDA1 | Control signal, I2C signal | Used together with SDA3 and SCL3 of SMART PA, to save 2 pins |
| | | | | SCL1 | | |
| | | | | DP | Data positive signal | |
| | | | | DN | Data negative signal | |
| | | | | HSL | Left channel signal | |
| | | | | HSR | Right channel signal | |
| | | | | EN | Enable signal | |
| | | | | INT | Interrupt signal | |

TABLE 35-continued

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| | | | | VPH-PWR | System total power supply signal | Combined with VPH-PWR of OLED power supply, to save 1 pin |
| Motor drive power chip | VIBR_P | 2 | 5 (2 after combination) | VPH-PWR | System total power supply signal | Combined with VPH-PWR of OLED power supply, to save 1 pin |
| | VIBR_N | | | MOTOR_INT | Interrupt signal | |
| | | | | MOTOR_EN | Enable signal | |
| | | | | SDA2 | Control signal, I2C signal | Used together with SDA3 and SCL3, to save 2 pins |
| | | | | SCL2 | | |
| Speaker power amplifier (SMART PA | SPKP | 4 | 11 (9 after combination) | VPH-PWR | System total power supply signal | Combined with VPH-PWR of OLED power supply, to save 1 pin |
| | SPKP | | | VPH-PWR | System total power supply signal | |
| | SPKN | | | I2S_DI | Digital signal exchanged between SMART PA and SOC chip on main board | |
| | SPKN | | | I2S_DO | | |
| | | | | I2S_CLK | Clock signal | |
| | | | | I2S_SYNC | Synchronization signal | |
| | | | | SDA3 | Control signal, I2C signal | |
| | | | | SCL3 | | |
| | | | | INT | Interrupt signal | |
| | | | | RST | Reset signal | |
| | | | | VIO_1.8 V | Direct-current power signal | Combined with antenna switch power supply on sub-board, to save 1 pin |
| Other adjustment | Other signal adjustment | 8 | | | | |
| TOTAL | | 24 | | 32 (24 after combination) | | Save no pin, but adjust layout |

As shown in Table 35, after the OLED drive chip, the headset switch switching chip, the motor drive power chip, and the SMART PA are moved from the main board to the sub-board, a total quantity of signals passing through the main board BTB connector remains unchanged, but the occupied area on the main board is saved, which optimizes the layout of the main board.

Embodiment 14: Move a Screen Power Chip and a PD (Power Delivery) Charging Protocol Chip from a Main Board to a Sub-Board The PD charging protocol is a fast charging specification of which a full name is USB Power Delivery and that is formulated by the USB-IF organization, for compatibility with devices such as mobile phone, a tablet computer, and notebook computer. The PD fast charging increases power transmission through a USB cable and a connector, and expands a power supply capability of the USB cable bus, to achieve a higher voltage and a higher current.

Figure 30:
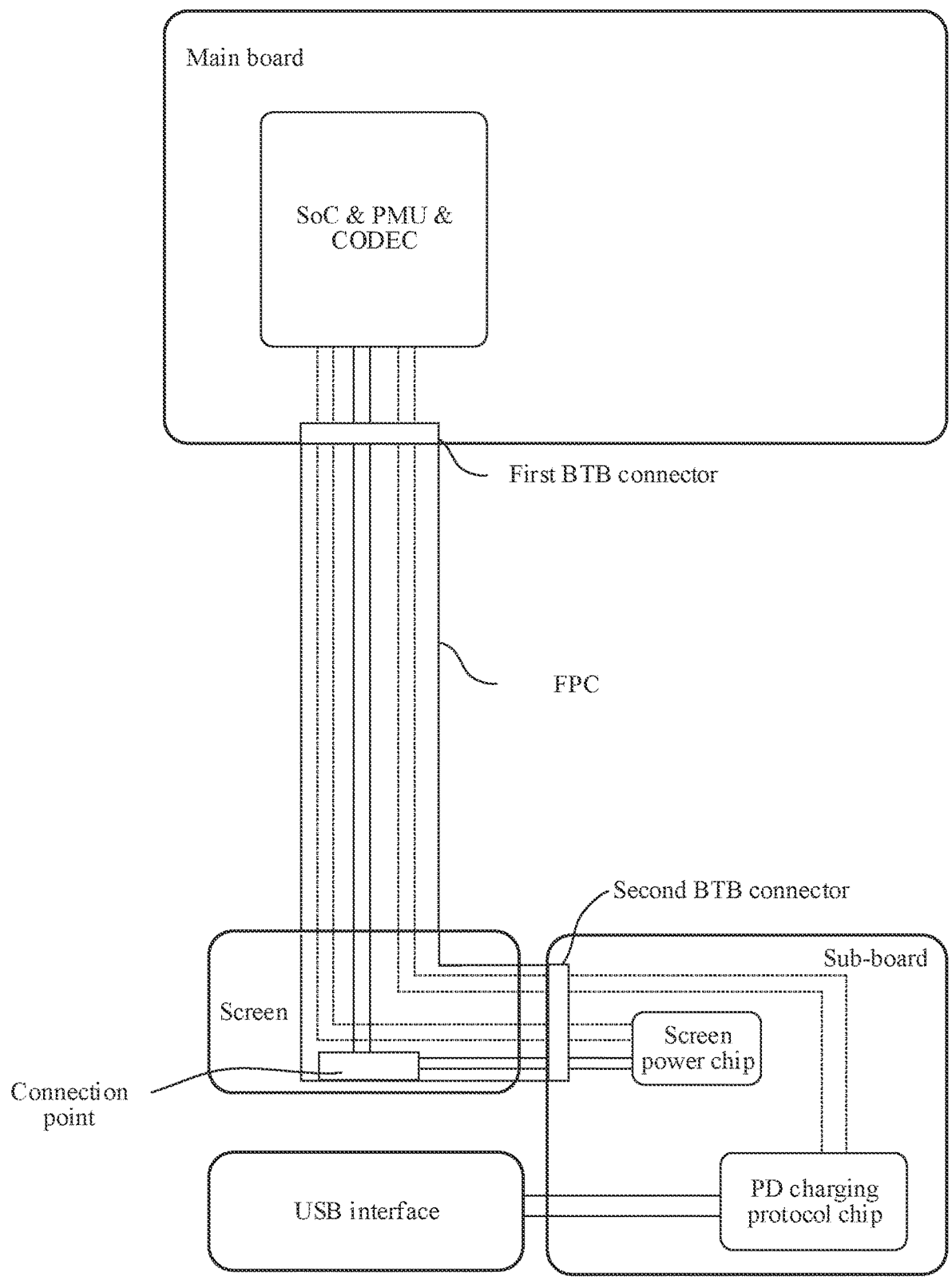

As shown in FIG. 30, the screen power chip and the PD charging protocol chip are arranged on the sub-board, and the main and sub-board FPC are combined into the screen FPC, that is, the FPC in FIG. 30. Signals provided by the SOC chip to the screen power chip and the PD charging protocol chip are transmitted to the screen chip through the first BTB connector and the FPC, and are further transmitted to corresponding chips on the sub-board.

Figure 31:
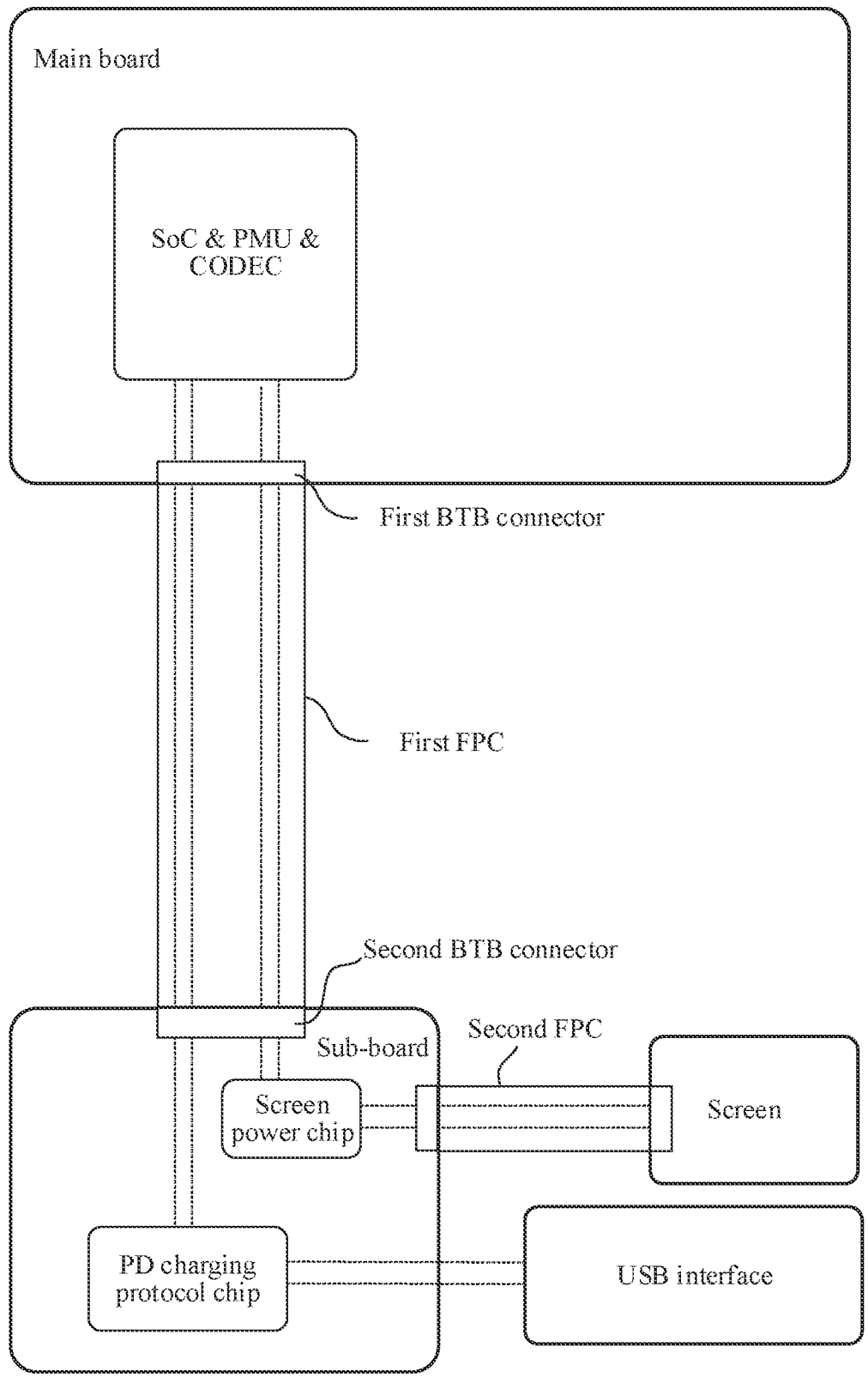

In another exemplary embodiment, as shown in FIG. 31, the screen FPC may also be combined into the main and sub-board FPC, that is, the first FPC in FIG. 31. Signals between the screen power chip and the screen chip are transmitted through the second FPC. The other parts are the same as those in FIG. 30, and details are not described herein again.

① Move a Backlight Power Chip and a PD Charging Protocol Chip from a Main Board to a Sub-Board In a scenario, if the screen is an LCD, the screen power chip is a backlight power chip.

As shown in Table 36, after the backlight power chip is moved from the main board to the sub-board, signals passing through the main board BTB connector are changed from 7 output signals to 7 input signals. The PD charging protocol chip is moved from the main board to the sub-board, and signals passing through the main board BTB connector are changed from 2 output signals to 5 input signals.

The charging power positive signal VBUS of the PD charging protocol chip can be multiplexed with the VBUS signal of the USB interface, to save 1 pin. The chip power supply VDD is combined with VPH-PWR of the backlight power chip, to save 1 pin. Addresses of the control signals SDA1 and SCL1 of the backlight power chip do not conflict with addresses of the control signals SDA2 and SCL2 of the PD charging protocol chip. Therefore, the two pairs of control signals can be combined, to save 2 pins. In addition, the backlight enable signal of the backlight power chip can be combined with VPH-PWR, to save 1 pin. In view of the above, after the backlight power chip and the PD charging protocol chip are moved from the main board to the sub-board, a quantity of signals passing through the main board BTB connector is reduced from 9 to 7, which saves a quantity of pins of the main board BTB connector. In addition, the occupied area on the main board is saved, which optimizes the layout of the main board.

TABLE 36

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| Backlight power chip | LEDA | 7 | 7 (4 after combination) | VPH-PWR | System total power supply signal | |
| | LED1- | | | VPH-PWR | System total power supply signal | |
| | LED2- LED3- | | | SDA1 SCL1 | Control signal, I2C signal | Used together with SDA2 and SCL2 of PD charging protocol, to save 2 pins |
| | LED4- | | | LCD_EN | Backlight enable signal | Connected to VPH-PWR or default pull-up power supply, to save 1 pin |
| | VSP | | | VSP_EN | Positive bias enable signal | |
| | VSN | | | VSN_EN | Negative bias enable signal | |
| PD charging protocol chip | CC1 | 2 | 5 (3 after combination) | VBUS | Charging power positive signal | Multiplexed with VBUS of USB interface, to save 1 pin |
| | CC2 | | | VDD | Chip power supply | Combined with VPH-PWR of backlight power chip, to save 1 pin |
| | | | | INT SDA2 SCL2 | Interrupt signal Control signal, I2C signal | |
| TOTAL | | 9 | 12 (7 after combination) | | | 9 − 7 = 2, saving 2 pins in total |

② Move an OLED Drive Chip and a PD Charging Protocol Chip from a Main Board to a Sub-Board As shown in Table 37, the OLED drive chip is moved from the main board to the sub-board, and signals passing through the main board BTB connector are changed from 7 output signals to 4 input signals, to save 3 pins. Moreover, after the PD charging protocol chip is moved from the main board to the sub-board, VBUS in the input signals of the chip can be multiplexed with the VBUS signal of the USB interface, to save 1 pin. In addition, VDD may be multiplexed with VPH-PWR of the OLED drive chip, to save 1 pin. In view of the above, a quantity of signals passing through the main board BTB connector is reduced from 9 to 7, to save 2 pins. In addition, the occupied area on the main board is saved, which optimizes the layout of the main board.

and the screen power chip is arranged on the main board. In addition, the screen FPC between the screen power chip and the screen chip is combined into the main and sub-board FPC, that is, the first FPC.

Figure 32:
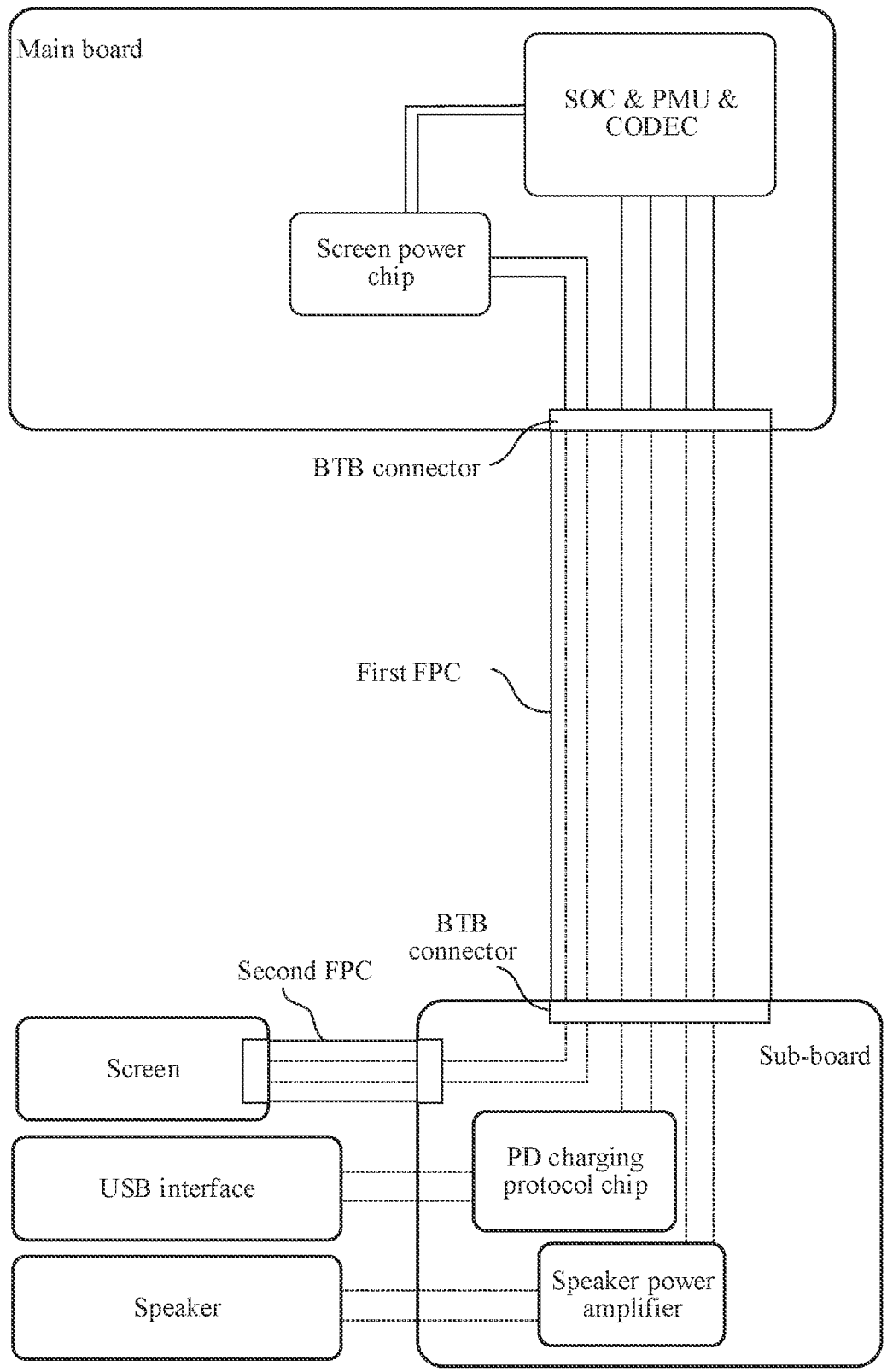
Figure 33:
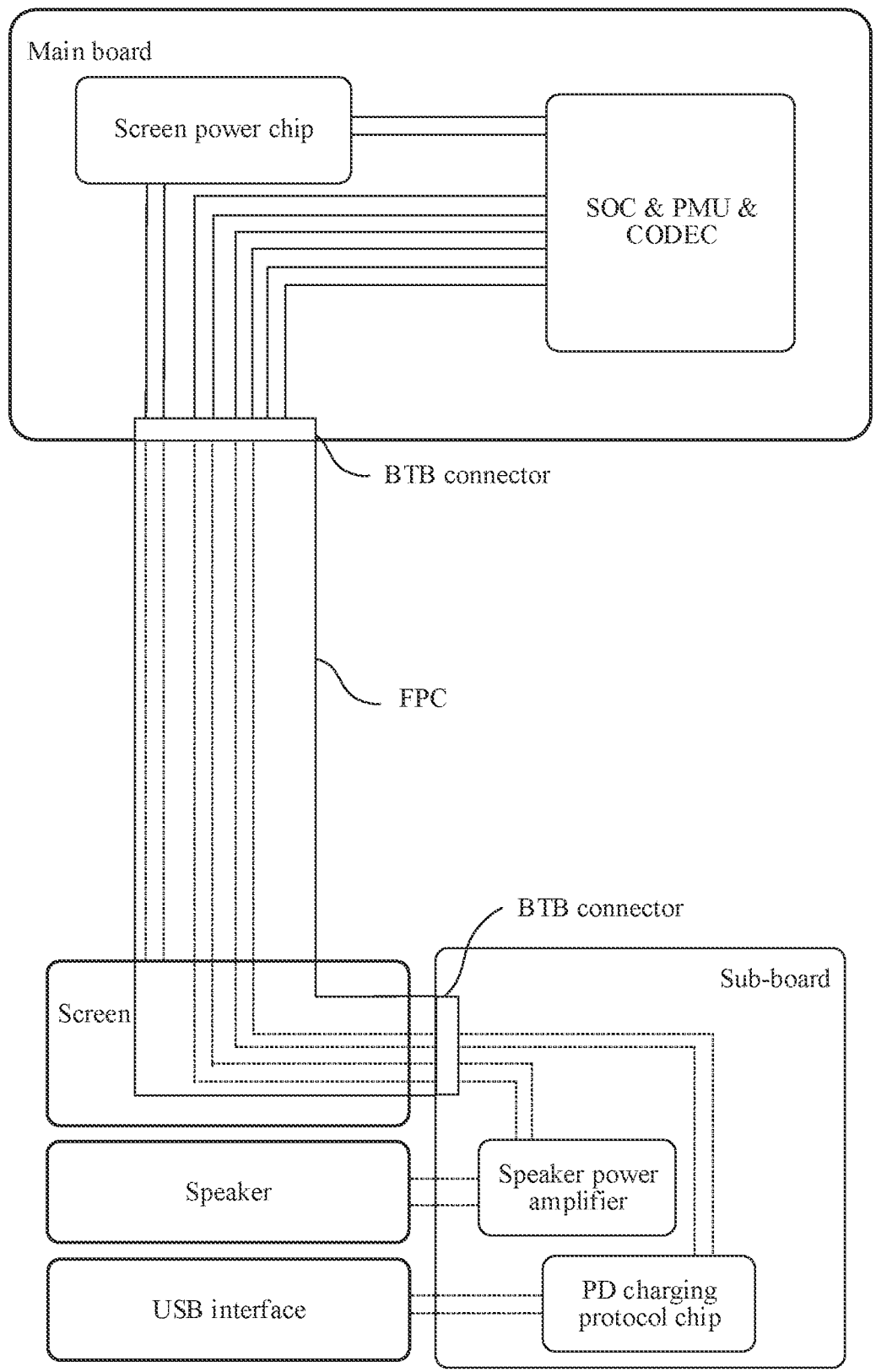

As shown in FIG. 33, the main and sub-board FPC can also be combined into the screen FPC, that is, the FPC in FIG. 33, and other structures are the same as those in FIG. 32.

① Move a PD Charging Protocol Chip and an Analog SPK PA from a Main Board to a Sub-Board As shown in Table 38, after the PD charging protocol chip and the analog SPK PA are moved from the main board to the sub-board, the control signals SDA1 and SCL1 of the PD charging protocol chip are multiplexed with the control signals SDA2 and SCL2 of the analog SPK PA, to save 2 pins. VDD of the PD charging protocol chip is multiplexed

TABLE 37

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| OLED drive chip | ELVDD | 7 | 4 | VPH-PWR | System total power supply signal | |
| | ELVDD | | | VPH-PWR | System total power supply signal | |
| | ELVSS | | | VPH-PWR | System total power supply signal | |
| | ELVSS | | | OLED_ERR | OLED error signal | |
| | VIN | | | | | |
| | ELVDD_EN | | | | | |
| | AVDD_EN | | | | | |
| PD charging protocol chip | CC1 | 2 | 5 (3 after combination) | VBUS | Charging power positive signal | Multiplexed with VBUS of USB interface, to save 1 pin |
| | CC2 | | | VDD | Chip power supply | Combined with VPH-PWR of OLED drive chip, to save 1 pin |
| | | | | INT | Interrupt signal | |
| | | | | SDA2 | Control signal, | |
| | | | | SCL2 | I2C signal | |
| TOTAL | | 9 | 9 (7 after combination) | | | 9 − 7 = 2, saving 2 pins in total |

Embodiment 15: Move a PD Charging Protocol and a Speaker Power Amplifier from a Main Board to a Sub-Board As shown in FIG. 32, the PD charging protocol chip and the speaker power amplifier are arranged on the sub-board, with VPH-PWR of the analog SPK PA, to save 1 pin. VBUS of the PD charging protocol chip is multiplexed with VBUS of the USB interface, to save 1 pin. A total quantity of signals passing through the main board BTB connector remains unchanged, but the occupied area on the main board is saved, which optimizes the layout of the main board.

TABLE 38

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| PD charging protocol chip | CC1 | 2 | 5 (3 after combination) | VBUS | Charging power positive signal | Multiplexed with VBUS of USB interface, to save 1 pin |
| | CC2 | | | VDD | Chip power supply | Multiplexed with VPH-PWR of analog SPK PA, to save 1 pin |
| | | | | INT | Interrupt signal | |
| | | | | SDA1 | Control signal, | |
| | | | | SCL1 | I2C signal | |
| Analog SPK PA | SPKP | 4 | 6 (4 after combination) | LINOUTP | Platform output audio positive signal | |
| | SPKP | | | LINOUTN | Platform output audio negative signal | |
| | SPKN | | | VPH-PWR | System total power supply signal | |
| | SPKN | | | VPH-PWR | System total power supply signal | |
| | | | | SDA2 | Control signal, | Used together with SDA1 and SCL1, to save 2 pins |
| | | | | SCL2 | I2C signal | |
| Other adjustment | Other signal adjustment | 1 | | | | |
| TOTAL | | 7 | 11 (7 after combination) | | | Save no pin, but adjust layout |

② Move a PD Charging Protocol Chip and a SMART PA from a Main Board to a Sub-Board As shown in Table 39, control addresses of the control signals SDA1 and SCL1 of the PD charging protocol chip do not conflict with control addresses of the control signals SDA2 and SCL2 of the SMART PA. Therefore, the two groups of control signals can be multiplexed, to save 2 pins. A direct-current power signal VIO_1.8 V of the SMART PA is multiplexed with the antenna switch power signal of the sub-board, to save 1 pin. The multiplexing of VBUS and VDD of the PD charging protocol chip is the same as that in Embodiment 14 including the PD charging protocol, and details are not described herein again. A total quantity of signals passing through the main board BTB connector is not reduced in this solution, but the occupied area on the main board is saved, which optimizes the layout of the main board.

TABLE 39

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| PD charging protocol chip | CC1 | 2 | 5 (3 after combination) | VBUS | Charging power positive signal | Multiplexed with VBUS of USB interface, to save 1 pin |
| | CC2 | | | VDD | Chip power supply | Multiplexed with VPH-PWR of SMART PA, to save 1 pin |
| | | | | INT | Interrupt signal | |
| | | | | SDA1 | Control signal, | |
| | | | | SCL1 | I2C signal | |
| Speaker power amplifier (SMART PA) | SPKP | 4 | 11 (8 after combination) | VPH-PWR | System total power supply signal | |
| | SPKP | | | VPH-PWR | System total power supply signal | |

TABLE 39-continued

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| | SPKN | | | I2S_DI | Digital signal exchanged between SMART PA and SOC chip on main board | |
| | SPKN | | | I2S_DO | | |
| | | | | I2S_CLK | Clock signal | |
| | | | | I2S_SYNC | Synchronization signal | |
| | | | | SDA2 | Control signal, I2C signal | Used together with SDA1 and SCL1, to save 2 pins |
| | | | | SCL2 | | |
| | | | | INT | Interrupt signal | |
| | | | | RST | Reset signal | |
| | | | | VIO_1.8 V | Direct-current power signal | Combined with antenna switch power supply on sub-board, to save 1 pin |
| Other adjustment | Other signal adjustment | 5 | | | | |
| TOTAL | | 11 | 16 (11 after combination) | | | Save no pin, but adjust layout |

Embodiment 16: Move a PD Charging Protocol Chip and a Motor Drive Power Chip from a Main Board to a Sub-Board In this embodiment, the speaker power amplifier in FIG. 32 and FIG. 33 is replaced by a motor drive power chip, and other structures remain unchanged.

As shown in Table 40, control signals SDA1 and SCL1 of the motor drive power chip are multiplexed with SDA2 and SCL2 of the PD charging protocol, to save 2 pins. Combination and optimization of other signals are the same as those in Embodiment 15, and details are not described herein again. In view of the above, in this solution, a total quantity of signals passing through the main board BTB connector remains unchanged after the PD charging protocol chip and the motor drive power chip are moved from the main board to the sub-board, but the occupied area on the main board is saved, which optimizes the layout of the main board.

TABLE 40

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| Motor drive power chip | VIBR_P | 2 | 5 (3 after combination) | VPH-PWR | System total power supply signal | |
| | VIBR_N | | | SDA1 | Control signal, I2C signal | Multiplexed with SDA2 and SCL2, to save 2 pins |
| | | | | SCL1 | | |
| | | | | MOTOR_EN | Enable signal | |
| | | | | MOTOR_INT | Interrupt signal | |
| PD charging protocol chip | CC1 | 2 | 5 (3 after combination) | VBUS | Charging power positive signal | Multiplexed with VBUS of USB interface, to save 1 pin |
| | CC2 | | | VDD | Chip power supply | Multiplexed with VPH-PWR of motor drive power chip, to save 1 pin |
| | | | | INT | Interrupt signal | |
| | | | | SDA2 | Control signal, I2C signal | |
| | | | | SCL2 | | |
| Other adjustment | Other signal adjustment | 2 | | | | |
| TOTAL | | 6 | 10 (6 after combination) | | | Save no pin, but adjust layout |

Embodiment 17: Move a PD Charging Protocol Chip, a Screen Power Chip, and a Motor Drive Power Chip from a Main Board to a Sub-Board In this embodiment, based on FIG. 30 and FIG. 31, the motor drive power chip can be further moved from the main board to the sub-board.

① Move a PD Charging Protocol Chip, a Backlight Power Chip, and a Motor Drive Power Chip from a Main Board to a Sub-Board described herein again. This solution can finally save 2 pins of the main board BTB connector.

② Move a PD Charging Protocol Chip, an OLED Drive Chip, and a Motor Drive Power Chip from a Main Board to a Sub-Board As shown in Table 42, VPH-PWR of the motor drive power chip is multiplexed with VPH-PWR of the OLED drive chip, to save 1 pin. Control signals SDA1 and SCL1 of the motor drive power chip are multiplexed with control signals SDA2 and SCL2 of the PD charging protocol chip,

TABLE 41

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| Backlight power chip | LEDA | 7 | 7 (4 after combination) | VPH-PWR | System total power supply signal | |
| | LED1- | | | VPH-PWR | System total power supply signal | |
| | LED2- | | | SDA1 | Control signal, | Used together with |
| | LED3- | | | SCL1 | I2C signal | SDA3 and SCL3 in PD charging protocol chip, to save 2 pins |
| | LED4- | | | LCD_EN | Backlight enable signal | Connected to VPH-PWR or default pull-up power supply, to save 1 pin |
| | VSP | | | VSP_EN | Positive bias enable signal | |
| | VSN | | | VSN_EN | Negative bias enable signal | |
| Motor drive power chip | VIBR_P | 2 | 5 (2 after combination) | VPH-PWR | System total power supply signal | Combined with VPH-PWR of backlight power chip, to save 1 pin |
| | VIBR_N | | | SDA2 SCL2 | Control signal, I2C signal | Used together with SDA3 and SCL3, to save 2 pins |
| | | | | MOTOR_EN MOTOR_INT | Enable signal Interrupt signal | |
| PD charging protocol chip | CC1 | 2 | 5 (3 after combination) | VBUS | Charging power positive signal | Multiplexed with VBUS of USB interface, to save 1 pin |
| | CC2 | | | VDD | Chip power supply | Multiplexed with VPH-PWR of backlight power chip, to save 1 pin |
| | | | | INT SDA3 SCL3 | Interrupt signal Control signal, I2C signal | |
| TOTAL | | 11 | 17 (9 after combination) | | | 11 − 9 = 2, saving 2 pins in total |

As shown in Table 41, addresses of control signals of the backlight power chip, the motor drive power chip, and the PD charging protocol chip do not conflict with each other, so that the control signals of the three chips can be multiplexed, that is. SDA1 and SCL1, as well as SDA2 and SCL2 can be multiplexed with SDA3 and SCL3, to save 4 pins in total. Combination and optimization of other signals are the same as those in the foregoing embodiments, and details are not to save 2 pins. VBUS of the PD charging protocol chip is multiplexed with VBUS of the USB interface, and VDD is multiplexed with VPH-PWR of the OLED drive chip. In view of the above, signals of the three chips are reduced to 9 signals after combination and optimization, to save 2 pins of the main board BTB connector. In addition, the occupied area on the main board is saved, which optimizes the layout of the main board.

TABLE 42

| Target circuit module | Target circuit module on main board | | Optimization solution for target circuit module on sub-board | | | |
|---|---|---|---|---|---|---|
| | Output signal | Quantity of occupied BTB pins | Quantity of occupied BTB pins | Input signal | | Descriptions of combination and optimization |
| OLED drive chip | ELVDD | 7 | 4 | VPH-PWR | System total input power signal | |
| | ELVDD | | | VPH-PWR | System total input power signal | |
| | ELVSS | | | VPH-PWR | System total input power signal | |
| | ELVSS | | | OLED_ERR | OLED error signal | |
| | VIN | | | | | |
| | ELVDD_EN | | | | | |
| | AVDD_EN | | | | | |
| Motor drive power chip | VIBR_P | 2 | 5 (2 after combination) | VPH-PWR | System total power supply signal | Combined with VPH-PWR of OLED drive chip, to save 1 pin |
| | VIBR_N | | | SDA1 | Control signal, | Used together with SDA2 and SCL2, to save 2 pins |
| | | | | SCL1 | I2C signal | |
| | | | | MOTOR_EN | Enable signal | |
| | | | | MOTOR_INT | Interrupt signal | |
| PD charging protocol chip | CC1 | 2 | 5 (3 after combination) | VBUS | Charging power positive signal | Multiplexed with VBUS of USB interface, to save 1 pin |
| | CC2 | | | VDD | Chip power supply | Replaced by VPH-PWR of OLED drive chip, to save 1 pin |
| | | | | INT | Interrupt signal | |
| | | | | SDA2 | Control signal, | |
| | | | | SCL2 | I2C signal | |
| TOTAL | | 11 | 14 (9 after combination) | | | 11 − 9 = 2, saving 2 pins in total |

Figure 34:
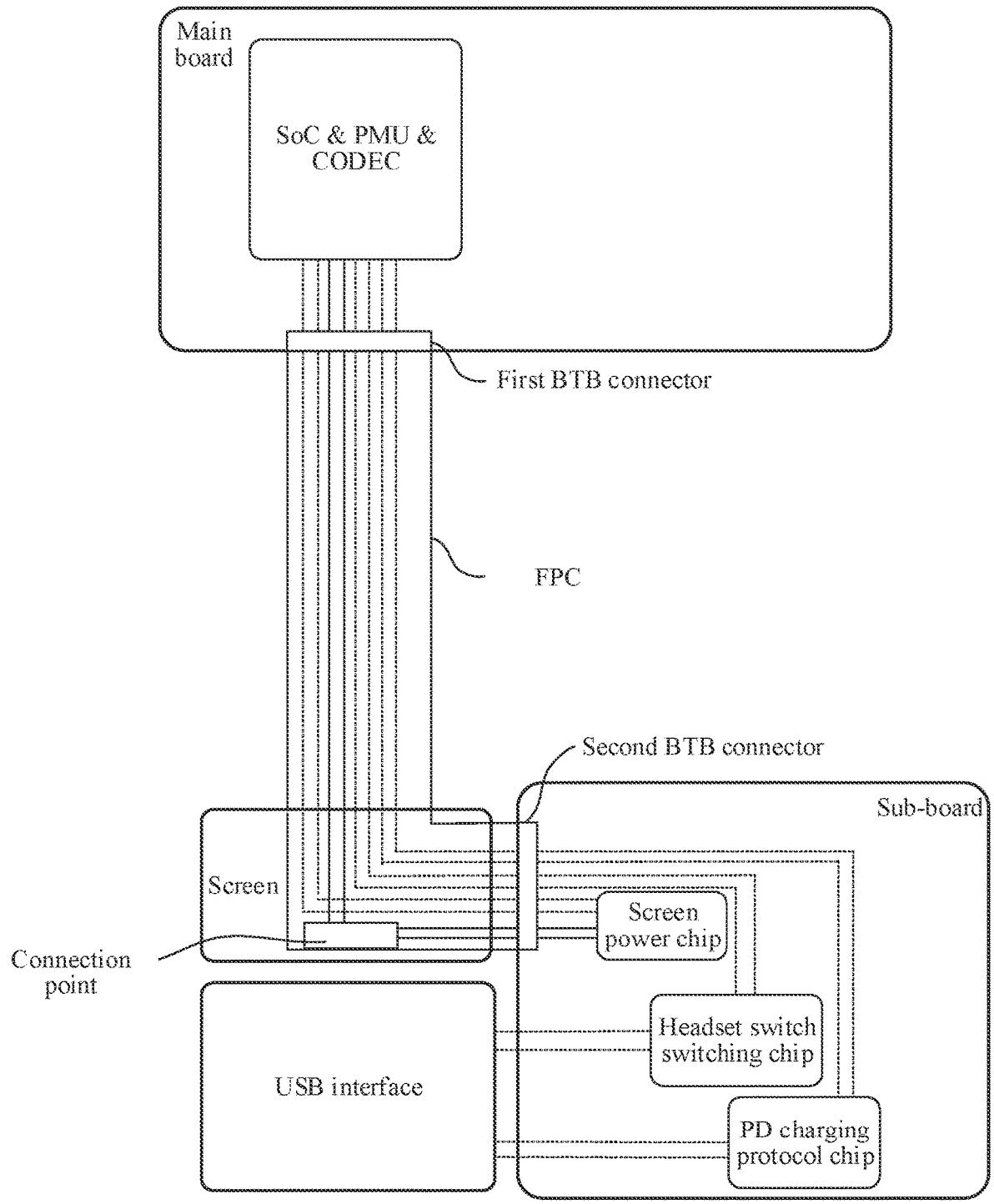

Embodiment 18: Move a Screen Power Chip, a Headset Switch Switching Chip, and a PD Charging Protocol Chip from a Main Board to a Sub-Board As shown in FIG. 34, the screen power chip, the headset switch switching chip, and the PD charging protocol chip are arranged on the sub-board, and the main and sub-board FPC is combined into the screen FPC, that is, the FPC in FIG. 34. Input pins of the three chips are connected to the FPC by the second BTB connector, and output pins of the screen power chip are connected to the screen chip by the second BTB connector. Output pins of the headset switch switching chip and the PD charging protocol chip are all connected to the USB interface.

Figure 35:
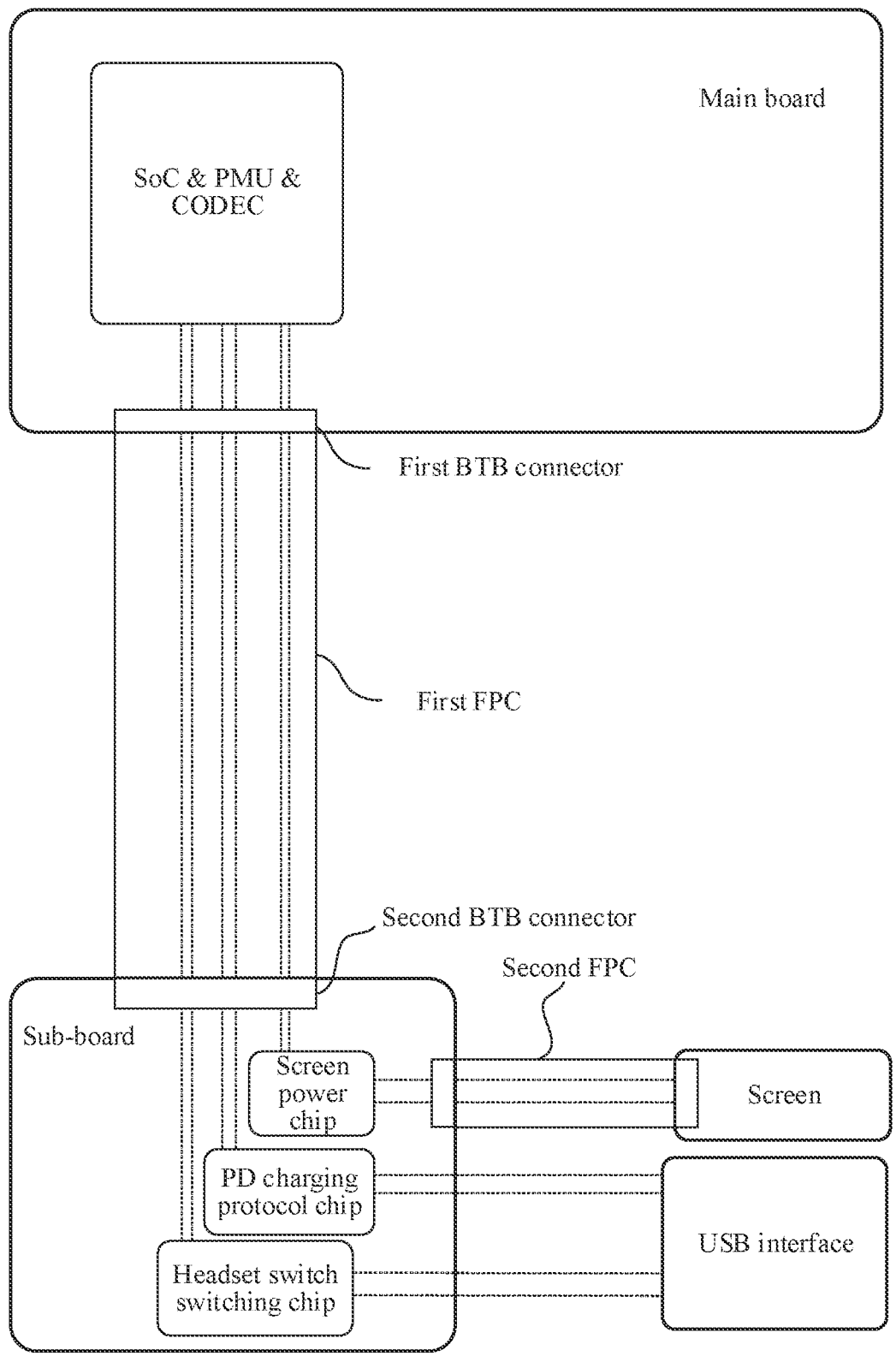

In another exemplary embodiment, as shown in FIG. 35, the screen FPC is combined into the main and sub-board FPC, that is, the first FPC in FIG. 35. Output pins of the screen power chip are connected to the screen chip by the second FPC. The other structures are the same as those in FIG. 34, and details are not described herein again.

① Backlight Power Chip, Headset Switch Switching Chip, and PD Charging Protocol Chip As shown in Table 43, the control signals SDA1 and SCL1 in the backlight power chip and the control signals SDA2 and SCL2 of the headset switch switching chip are used together with SDA3 and SCL3 of the PD charging protocol chip, to save 4 pins. Combination and optimization of other signals are the same as those in the foregoing embodiments, and details are not described herein again.

In view of the above, in this solution, after the backlight power chip, the headset switch switching chip, and the PD charging protocol chip are moved from the main board to the sub-board, a total quantity of signals passing through the main board BTB connector remains unchanged, but the occupied area on the main board is saved, which optimizes the layout of the main board.

TABLE 43

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | | Input signal | Descriptions of combination and optimization |
| Backlight power chip | LEDA | 7 | 7 (4 after combination) | VPH-PWR | System total power supply signal | |
| | LED1- | | | VPH-PWR | System total power supply signal | |
| | LED2- | | | SDA1 | Control signal, I2C signal | Used together with SDA3 and SCL3 of PD charging protocol chip, to save 2 pins |
| | LED3- | | | SCL1 | | |
| | LED4- | | | LCD_EN | Backlight enable signal | Connected to VPH-PWR or default pull-up power supply, to save 1 pin |
| | VSP | | | VSP_EN | Positive bias enable signal | |
| | VSN | | | VSN_EN | Negative bias enable signal | |
| Headset switch switching chip | SBU1 | 4 | 12 (9 after combination) | MIC | Headset microphone input signal | |
| | SBU2 | | | SGND | Feedback ground | |
| | DP | | | AGND | Analog ground | |
| | DN | | | SDA2 | Control signal, I2C signal | Used together with SDA3 and SCL3, to save 2 pins |
| | | | | SCL2 | | |
| | | | | DP | Data positive signal | |
| | | | | DN | Data negative signal | |
| | | | | HSL | Left channel signal | |
| | | | | HSR | Right channel signal | |
| | | | | EN | Enable signal | |
| | | | | INT | Interrupt signal | |
| | | | | VPH-PWR | System total power supply signal | Combined with VPH-PWR of OLED drive chip, to save 1 pin |
| PD charging protocol chip | CC1 | 2 | 5 (3 after combination) | VBUS | Charging power positive signal | Multiplexed with VBUS of USB interface, to save 1 pin |
| | CC2 | | | VDD | Chip power supply | Replaced by VPH-PWR, to save 1 pin |
| | | | | INT | Interrupt signal | |
| | | | | SDA3 | Control signal, I2C signal | |
| | | | | SCL3 | | |
| Other adjustment | Other signal adjustment | 3 | | | | |
| TOTAL | | 16 | 24 (16 after combination) | | | Save no pin, but adjust layout |

② OLED Drive Chip, Headset Switch Switching Chip, and PD Charging Protocol Chip

As shown in Table 44, control signals SDA1 and SCL1 of the headset switch switching chip are multiplexed with SDA2 and SCL2 of the PD charging protocol chip, to save 2 pins. VPH-PWR of the headset switch switching chip is combined with VPH-PWR of the OLED drive chip, to save 1 pin. The optimization of other signals of the PD charging protocol chip is the same as the combination and optimization of signals of the PD charging protocol chip in other embodiments, and details are not described herein again.

In view of the above, in this solution, after the three chips, namely, the OLED drive chip, the headset switch switching chip, and the PD charging protocol chip are moved to the sub-board, a total quantity of signals passing through the main board BTB connector remains unchanged, but the occupied area on the main board is saved, which optimizes the layout of the main board.

TABLE 44

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| OLED drive chip | ELVDD | 7 | 4 | VPH-PWR | System total power supply signal | |
| | ELVDD | | | VPH-PWR | System total power supply signal | |
| | ELVSS | | | VPH-PWR | System total power supply signal | |
| | ELVSS | | | OLED_ERR | OLED error signal | |
| | VIN | | | | | |
| | ELVDD_EN | | | | | |
| | AVDD_EN | | | | | |
| Headset switch switching chip | SBU1 | 4 | 12 (9 after combination) | MIC | Headset microphone input signal | |
| | SBU2 | | | SGND | Feedback ground | |
| | DP | | | AGND | Analog ground | |
| | DN | | | SDA1 | Control signal, | Used together with SDA2 and SCL2 of PD charging protocol chip, to save 2 pins |
| | | | | SCL1 | I2C signal | |
| | | | | DP | Data positive signal | |
| | | | | DN | Data negative signal | |
| | | | | HSL | Left channel signal | |
| | | | | HSR | Right channel signal | |
| | | | | EN | Enable signal | |
| | | | | INT | Interrupt signal | |
| | | | | VPH-PWR | System total power supply signal | Combined with VPH-PWR of OLED drive chip, to save 1 pin |
| PD charging protocol chip | CC1 | 2 | 5 (3 after combination) | VBUS | Charging power positive signal | Multiplexed with VBUS of USB interface, to save 1 pin |
| | CC2 | | | VDD | Chip power supply | Replaced by VPH-PWR of OLED drive chip, to save 1 pin |
| | | | | INT | Interrupt signal | |
| | | | | SDA2 | Control signal, | |
| | | | | SCL2 | I2C signal | |
| Other adjustment | Other signal adjustment | 3 | | | | |
| TOTAL | | 16 | 21 (16 after combination) | | | Save no pin, but adjust layout |

Embodiment 19: Move a Screen Power Chip, a Motor Drive Power Chip, a Speaker Power Amplifier, and a PD Charging Protocol Chip from a Main Board to a Sub-Board In this embodiment, based on FIG. 30 and FIG. 31, the motor drive power chip and the speaker power amplifier can be further moved to the sub-board. Other structures are the same, and details are not described herein again.

① Move a Backlight Power Chip, a Motor Drive Power Chip, an Analog SPK PA, and a PD Charging Protocol Chip from a Main Board to a Sub-Board In a scenario, if the screen is an LCD, the screen power chip is a screen power chip, and the speaker power amplifier is an analog SPK PA capable of processing analog sound signals.

As shown in Table 45, the control signals SDA1 and SCL1 of the backlight power chip, the control signals SDA2 and SCL2 of the motor drive power chip, control signals SDA4 and SCL4 of the analog SPK PA are used together with SDA3 and SCL3 of the PD charging protocol chip, to save 6 pins. The backlight enable signal LCD_EN of the backlight power chip can be combined with VPH-PWR of the backlight power chip, to save 1 pin.

VPH-PWR of the motor drive power chip is combined with VPH-PWR of the backlight power chip, to save 1 pin.

VBUS of the PD charging protocol chip is multiplexed with VBUS of the USB interface, to save 1 pin. VDD of the PD charging protocol chip is combined with VPH-PWR of the backlight power chip, to save 1 pin.

VPH-PWR of the analog SPK PA is combined with VPH-PWR of the backlight power chip, to save 1 pin.

In view of the above, in this solution, signals of the three chips are reduced to 12 signals after combination and optimization, to save 2 pins of the main board BTB connector. In addition, the occupied area on the main board is saved, which optimizes the layout of the main board.

② Backlight Power Chip, Motor Drive Power Chip, PD Charging Protocol Chip, and SMART PA In another scenario, the speaker power amplifier may also be a SMART PA capable of processing digital signals. In this

TABLE 45

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| Backlight power chip | LEDA | 7 | 7 (4 after combination) | VPH-PWR | System total power supply signal | |
| | LED1- | | | VPH-PWR | System total power supply signal | |
| | LED2- | | | SDA1 | Control signal, I2C signal | Used together with SDA3 and SCL3 of PD charging protocol chip, to save 2 pins |
| | LED3- | | | SCL1 | | |
| | LED4- | | | LCD_EN | Backlight enable signal | Connected to VPH-PWR or default pull-up power supply, to save 1 pin |
| | VSP | | | VSP_EN | Positive bias enable signal | |
| | VSN | | | VSN_EN | Negative bias enable signal | |
| Motor drive power chip | VIBR_P | 2 | 5 (2 after combination) | VPH-PWR | System total power supply signal | Combined with VPH-PWR of backlight power chip, to save 1 pin |
| | VIBR_N | | | SDA2 SCL2 | Control signal, I2C signal | Used together with SDA3 and SCL3, to save 2 pins |
| | | | | MOTOR_EN MOTOR_INT | Enable signal Interrupt signal | |
| PD charging protocol chip | CC1 | 2 | 5 (3 after combination) | VBUS | Charging power positive signal | Multiplexed with VBUS of USB port, to save 1 pin |
| | CC2 | | | VDD | Chip power supply | Multiplexed with VPH-PWR of backlight power chip, to save 1 pin |
| | | | | INT | Interrupt signal | |
| | | | | SDA3 | Control signal, | |
| | | | | SCL3 | I2C signal | |
| Analog SPK PA | SPKP | 4 | 6 (3 after combination) | LINOUTP | Platform output audio positive signal | |
| | SPKP | | | LINOUTN | Platform output audio negative signal | |
| | SPKN | | | VPH-PWR | System total power supply signal | |
| | SPKN | | | VPH-PWR | System total power supply signal | Combined with VPH-PWR of backlight power chip, to save 1 pin |
| | | | | SDA4 SCL4 | Control signal, I2C signal | Used together with SDA3 and SC3, to save 2 pins |
| TOTAL | | 15 | 23 (12 after combination) | | | 15 − 12 = 3, saving 3 pins | scenario, combination and optimization solutions of signals moved the sub-board are shown in Table 46. In view of the above, a total quantity of signals passing through the main board BTB connector remains unchanged in this solution, but the occupied area on the main board is saved, which optimizes the layout of the main board.

TABLE 46

| Target circuit module on main board | | | Optimization solution for target circuit module on sub-board | | | Descriptions of combination and optimization |
|---|---|---|---|---|---|---|
| Target circuit module | Output signal | Quantity of occupied BTB pins | Quantity of occupied BTB pins | Input signal | | |
| Backlight power chip | LEDA | 7 | 7 (4 after combination) | VPH-PWR | System total power supply signal | |
| | LED1- | | | VPH-PWR | System total power supply signal | |
| | LED2- | | | SDA1 | Control signal, I2C signal | Used together with SDA3 and SCL3 in PD charging protocol chip, to save 2 pins |
| | LED3- | | | SCL1 | | |
| | LED4- | | | LCD_EN | Backlight enable signal | Connected to VPH-PWR or default pull-up power supply, to save 1 pin |
| | VSP | | | VSP_EN | Positive bias enable signal | |
| | VSN | | | VSN_EN | Negative bias enable signal | |
| Motor drive power chip | VIBR_P | 2 | 5 (2 after combination) | VPH-PWR | System total power supply signal | Combined with VPH-PWR of backlight power chip, to save 1 pin |
| | VIBR_N | | | SDA2 SCL2 | Control signal, I2C signal | Used together with SDA3 and SCL3, to save 2 pins |
| | | | | MOTOR_EN MOTOR_INT | Enable signal Interrupt signal | |
| PD charging protocol chip | CC1 | 2 | 5 (3 after combination) | VBUS | Charging power positive signal | Multiplexed with VBUS of USB interface, to save 1 pin |
| | CC2 | | | VDD | Chip power supply | Replaced by VPH-PWR, to save 1 pin |
| | | | | INT | Interrupt signal | |
| | | | | SDA3 SCL3 | Control signal, I2C signal | |
| Speaker power (SMART PA) | SPKP | 4 | 11 (7 after combination) | VPH-PWR | System total power supply signal | Combined with VPH-PWR of screen power supply, to save 1 pin |
| | SPKP | | | VPH-PWR | System total power supply signal | |
| | SPKN | | | I2S_DI | Digital signal exchanged between SMART PA and SOC chip on main board | |
| | SPKN | | | I2S_DO | | |

TABLE 46-continued

| Target circuit module on main board | | | Optimization solution for target circuit module on sub-board | | Descriptions of combination and optimization |
|---|---|---|---|---|---|
| Target circuit module | Output signal | Quantity of occupied BTB pins | Quantity of occupied BTB pins | Input signal | |
| | | | I2S_CLK | Clock signal | |
| | | | I2S_SYNC | Synchronization signal | |
| | | | SDA4 | Control signal, I2C signal | Used together with SDA3 and SCL3, to save 2 pins |
| | | | SCL4 | | |
| | | | INT | Interrupt signal | |
| | | | RST | Reset signal | |
| | | | VIO_1.8V | Direct-current power signal | Combined with antenna switch power supply on sub-board, to save 1 pin |
| Other adjustment | Other signal adjustment | 1 | | | |
| TOTAL | | 16 | 28 (16 after combination) | | Save no pin, but adjust layout |

③ Move an OLED Drive Chip, a Motor Drive Power Chip, a PD Charging Protocol Chip, and an Analog SPK PA from a Main Board to a Sub-Board In still another scenario, if the screen is an OLED, the screen power chip is an OLED drive chip. The speaker power amplifier may be an analog SPK PA capable of processing analog sound signals.

As shown in Table 47, after signals of the chips moved to the sub-board are optimized and combined, a quantity of signals passing through the main board BTB connector is reduced from 15 to 12, which spares 3 pins of the main board BTB connector. In addition, the occupied area on the main board is saved, which optimizes the layout of the main board.

TABLE 47

| Target circuit module on main board | | | Optimization solution for target circuit module on sub-board | | | Descriptions of combination and optimization |
|---|---|---|---|---|---|---|
| Target circuit module | Output signal | Quantity of occupied BTB pins | Quantity of occupied BTB pins | Input signal | | |
| OLED drive chip | ELVDD | 7 | 4 | VPH-PWR | System total power supply signal | |
| | ELVDD | | | VPH-PWR | System total power supply signal | |
| | ELVSS | | | VPH-PWR | System total power supply signal | |
| | ELVSS | | | OLED_ERR | OLED error signal | |
| | VIN | | | | | |
| | ELVDD_EN | | | | | |
| | AVDD_EN | | | | | |
| Motor drive power chip | VIBR_P | 2 | 5 (2 after combination) | VPH-PWR | System total power supply signal | Combined with VPH-PWR of OLED drive chip, to save 1 pin |

TABLE 47-continued

| Target circuit module on main board | | | Optimization solution for target circuit module on sub-board | | | Descriptions of combination and optimization |
|---|---|---|---|---|---|---|
| Target circuit module | Output signal | Quantity of occupied BTB pins | Quantity of occupied BTB pins | Input signal | | |
| | VIBR_N | | | SDA2 SCL2 | Control signal, I2C signal | Used together with SDA3 and SCL3, to save 2 pins |
| | | | | MOTOR_EN MOTOR_INT | Enable signal Interrupt signal | |
| PD charging protocol chip | CC1 | 2 | 5 (3 after combination) | VBUS | Charging power positive signal | Multiplexed with VBUS of USB port, to save 1 pin |
| | CC2 | | | VDD | Chip power supply | Replaced by VPH-PWR of OLED drive chip, to save 1 pin |
| | | | | INT SDA3 SCL3 | Interrupt signal Control signal, I2C signal | |
| Analog SPK PA | SPKP | 4 | 6 (3 after combination) | LINOUTP | Platform output audio positive signal | |
| | SPKP | | | LINOUTN | Platform output audio negative signal | |
| | SPKN | | | VPH-PWR | System total power supply signal | |
| | SPKN | | | VPH-PWR | System total power supply signal | Combined with VPH-PWR of backlight power chip, to save 1 pin |
| | | | | SDA4 SCL4 | Control signal, I2C signal | Used together with SDA3 and SC3, to save 2 pins |
| TOTAL | | 15 | | 20 (12 after combination) | | 15 − 12 = 3, saving 3 pins |

③ Move an OLED Drive Chip, a Motor Drive Power Chip, a PD Charging Protocol Chip, and a SMART PA from a Main Board to a Sub-Board In another scenario, the speaker power amplifier may be a SMART PA capable of processing digital sound signals.

As shown in Table 48, a total quantity of signals passing through the main board BTB connector remains unchanged after the OLED drive chip, the motor drive power chip, the PD charging protocol chip, and the SMART PA are moved to the sub-board, but the occupied area on the main board is saved, which optimizes the layout of the main board.

TABLE 48

| Target circuit module on main board | | | Optimization solution for target circuit module on sub-board | | | Descriptions of combination and optimization |
|---|---|---|---|---|---|---|
| Target circuit module | Output signal | Quantity of occupied BTB pins | Quantity of occupied BTB pins | Input signal | | |
| OLED drive chip | ELVDD | 7 | 4 | VPH-PWR | System total power supply signal | |

TABLE 48-continued

| Target circuit module on main board | | | Optimization solution for target circuit module on sub-board | | | Descriptions of combination and optimization |
|---|---|---|---|---|---|---|
| Target circuit module | Output signal | Quantity of occupied BTB pins | Quantity of occupied BTB pins | Input signal | | |
| | ELVDD | | | VPH-PWR | System total power supply signal | |
| | ELVSS | | | VPH-PWR | System total power supply signal | |
| | ELVSS | | | OLED_ERR | OLED error signal | |
| | VIN ELVDD_EN AVDD_EN | | | | | |
| Motor drive power chip | VIBR_P | 2 | 5 (2 after combination) | VPH-PWR | System total power supply signal | Combined with VPH-PWR of OLED drive chip, to save 1 pin |
| | VIBR_N | | | SDA1 SCL1 | Control signal, I2C signal | Used together with SDA2 and SCL2 of PD charging protocol chip, to save 2 pins |
| | | | | MOTOR_EN | Enable signal | |
| | | | | MOTOR_INT | Interrupt signal | |
| PD charging protocol chip | CC1 | 2 | 5 (3 after combination) | VBUS | Charging power positive signal | Multiplexed with VBUS of USB interface, to save 1 pin |
| | CC2 | | | VDD | Chip power supply | Replaced by VPH-PWR of OLED drive chip, to save 1 pin |
| | | | | INT | Interrupt signal | |
| | | | | SDA2 SCL2 | Control signal, I2C signal | |
| Speaker power amplifier (SMART PA) | SPKP | 4 | 11 (7 after combination) | VPH-PWR | System total power supply signal | Combined with VPH-PWR of OLED drive chip, to save 1 pin |
| | SPKP | | | VPH-PWR | System total power supply signal | |
| | SPKN | | | I2S_DI | Digital signal exchanged between SMART PA and SOC chip on main board | |
| | SPKN | | | I2S_DO | | |
| | | | | I2S_CLK I2S_SYNC | Clock signal Synchronization signal | |
| | | | | SDA3 SCL3 | Control signal, I2C signal | Used together with SDA2 and SCL2, to save 2 pins |

TABLE 48-continued

| Target circuit module on main board | | | Optimization solution for target circuit module on sub-board | | |
|---|---|---|---|---|---|
| Target circuit module | Output signal | Quantity of occupied BTB pins | Quantity of occupied BTB pins | Input signal | Descriptions of combination and optimization |
| | | | INT | Interrupt signal | |
| | | | RST | Reset signal | |
| | | | VIO 1.8V | Direct-current power signal | Combined with antenna switch power supply on sub-board, to save 1 pin |
| Other adjustment | Other signal adjustment | 1 | | | |
| TOTAL | | 16 | 24 (16 after combination) | | Save no pin, but adjust layout |

Embodiment 20: Move a Charging Protocol Chip and a PD Charging Protocol Chip from a Main Board to a Sub-Board In this embodiment, the speaker power amplifier in FIG. 32 and FIG. 33 is replaced by a charging protocol chip, and other structures remain unchanged.

As shown in Table 49, after the charging protocol chip and the PD charging protocol chip are moved from the main board to the sub-board, the control signals SDA1 and SCL1 of the charging protocol chip are used together with SDA2 and SCL2 of the PD charging protocol chip, to save 2 pins. VDD of the PD charging protocol chip is multiplexed with VPH-PWR of the PD charging protocol chip, to save 1 pin.

As shown in Table 49, in this solution, after combination and optimization, signals passing through the main board BTB connector are reduced 11 signals to 7 signals, to save 4 pins. In addition, the occupied area on the main board is also saved, which optimizes the layout of the main board.

TABLE 49

| Target circuit module on main board | | | Optimization solution for target circuit module on sub-board | | |
|---|---|---|---|---|---|
| Target circuit module | Output signal | Quantity of occupied BTB pins | Quantity of occupied BTB pins | Input signal | Descriptions of combination and optimization |
| Charging protocol chip | USB_DP | 2 | 8 (4 after combination) | VPH-PWR | System total power supply signal | |
| | USB_DN | | | SDA1 SCL1 | Control signal, I2C signal | Used together with SDA2 and SCL2 of PD charging protocol chip, to save 2 pins |
| | | | | VBUS | Charging power positive signal | Combined with VBUS signal on USB interface, to save 1 pin |
| | | | | VIO_1.8V | Direct-current power supply | Combined with antenna switch VIO power supply on sub-board, to save 1 pin |
| | | | | EINT | Interrupt signal | |
| | | | | USB_DP | Data positive signal | |
| | | | | USB_DN | Data negative signal | |

TABLE 49-continued

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| PD charging protocol chip | CC1 | 2 | 5 (3 after combination) | VBUS | Charging power positive signal | Multiplexed with VBUS of USB interface, to save 1 pin |
| | CC2 | | | VDD | Chip power supply | Multiplexed with VPH-PWR of charging protocol chip, to save 1 pin |
| | | | | INT SDA2 SCL2 | Interrupt signal Control signal, I2C signal | |
| Other adjustment | Other signal adjustment | 4 | | | | |
| TOTAL | | 11 | 13 (7 after combination) | | | 11 − 7 = 4, saving 4 pins |

Embodiment 21: Motor Drive Power Chip, Speaker Power Amplifier, and PD Charging Protocol Chip In this embodiment, based on FIG. 32 and FIG. 33, the motor drive power chip is further moved to the sub-board. Other structures remain unchanged.

① PD Charging Protocol Chip, Motor Drive Power Chip, and Analog SPK PA

In a scenario, the speaker power amplifier may be an analog SPK PA capable of processing analog sound signals.

As shown in Table 50, after the motor drive power chip is moved to the sub-board, VPH-PWR of the chip is combined with VPH-PWR of the analog SPK PA, to save 1 pin. Control signals SDA1 and SCL1 of the chip are used together with SDA2 and SCL2 of the PD charging protocol chip, to save 2 pins. VDD of the PD charging protocol chip is combined with VPH-PWR of the analog SPK PA, to save 1 pin. Control signals SDA3 and SCL3 of the analog SPK PA are used together with SDA2 and SCL2 of the PD charging protocol chip, to save 2 pins. Combination solutions of other signals are the same as those in the foregoing embodiments, and details are not described herein again.

In view of the above, a total quantity of signals passing through the main board BTB connector remains unchanged after the PD charging protocol chip, the motor drive power chip, and the analog SPK PA are moved from the main board to the sub-board, but the occupied area on the main board is saved, which optimizes the layout of the main board.

TABLE 50

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| Motor drive power chip | VIBR_P | 2 | 5 (2 after combination) | VPH-PWR | System total power supply signal | PA, to save 1 Combined with VPH-PWR of analog SPK pin |
| | VIBR_N | | | SDA1 SCL1 | Control signal, I2C signal | Used together with SDA2 and SCL2 of PD charging protocol chip, to save 2 pins |
| | | | | MOTOR_EN | Enable signal | |
| | | | | MOTOR_INT | Interrupt signal | |

TABLE 50-continued

| Target circuit module on main board | | | Optimization solution for target circuit module on sub-board | | Descriptions of combination and optimization |
|---|---|---|---|---|---|
| Target circuit module | Output signal | Quantity of occupied BTB pins | Quantity of occupied BTB pins | Input signal | |
| PD charging protocol chip | CC1 | 2 | 5 (3 after combination) | VBUS / Charging power positive signal | Multiplexed with VBUS of USB interface, to save 1 pin |
| | CC2 | | | VDD / Chip power supply | Combined with VPH-PWR of analog SPK PA, to save 1 pin |
| | | | | INT / Interrupt signal | |
| | | | | SDA2 / Control signal, I2C signal | |
| | | | | SCL2 | |
| Analog SPK PA | SPKP | 4 | 6 (4 after combination) | LINOUTP / Platform output audio positive signal | |
| | SPKP | | | LINOUTN / Platform output audio negative signal | |
| | SPKN | | | VPH-PWR / System total power supply signal | |
| | SPKN | | | VPH-PWR / System total power supply signal | |
| | | | | SDA3 / Control signal, I2C signal | Used together with SDA2 and SC2, to save 2 pins |
| | | | | SCL3 | |
| Other adjustment | Other signal adjustment | 1 | | | |
| TOTAL | | 9 | 16 (9 after combination) | | Save no pin, but adjust layout |

② Move a PD Charging Protocol Chip, a Motor Drive Power Chip, and a SMART PA from a Main Board to a Sub-Board In another scenario, the speaker power amplifier may also be a SMART PA capable of processing digital sound signals.

As shown in Table 51, a total quantity of signals passing through the main board BTB connector remains unchanged after the PD charging protocol chip, the motor drive power chip, and the SMART PA are moved from the main board to the sub-board, but the occupied area on the main board is saved, which optimizes the layout of the main board.

TABLE 51

| Target circuit module | Target circuit module on main board | | Optimization solution for target circuit module on sub-board | | | Descriptions of combination and optimization |
|---|---|---|---|---|---|---|
| | Output signal | Quantity of occupied BTB pins | Quantity of occupied BTB pins | Input signal | | |
| Motor drive power chip | VIBR_P | 2 | 5 (2 after combination) | VPH-PWR | System total power supply signal | Combined with VPH-PWR of backlight power chip, to save 1 pin |
| | VIBR_N | | | SDA1 SCL1 | Control signal, I2C signal | Used together with SDA2 and SCL2 of PD charging protocol chip, to save 2 pins |
| | | | | MOTOR_EN | Enable signal | |
| | | | | MOTOR_INT | Interrupt signal | |
| PD charging protocol chip | CC1 | 2 | 5 (3 after combination) | VBUS | Charging power positive signal | Multiplexed with VBUS of USB port, to save 1 pin |
| | CC2 | | | VDD | Chip power supply | Replaced by VPH-PWR, to save 1 pin |
| | | | | INT | Interrupt signal | |
| | | | | SDA2 SCL2 | Control signal, I2C signal | |
| Speaker power amplifier (SMART PA) | SPKP | 4 | 11 (8 after combination) | VPH-PWR | System total power supply signal | |
| | SPKP | | | VPH-PWR | System total power supply signal | |
| | SPKN SPKN | | | I2S_DI I2S_DO | Digital signal exchanged between SMART PA and SOC chip on main board | |
| | | | | I2S_CLK | Clock signal | |
| | | | | I2_SYNC | Synchronization signal | |
| | | | | SDA3 SCL3 | Control signal, I2C signal | Used together with SDA2 and SCL2, to save 2 pins |
| | | | | INT | Interrupt signal | |
| | | | | RST | Reset signal | |
| | | | | VIO_1.8V | Direct-current power signal | Combined with antenna switch power supply on sub-board, to save 1 pin |
| Other adjustment | Other signal adjustment | 5 | | | | |
| TOTAL | | 13 | 21 (13 after combination) | | | Save no pin, but adjust layout |

Embodiment 22: Move a Screen Power Chip, a Speaker Power Amplifier, and a PD Charging Protocol from a Main Board to a Sub-Board In this embodiment, based on FIG. 30 and FIG. 31, the speaker power amplifier is further moved to the sub-board. Other structures remain unchanged.

①Backlight Power Chip, PD Charging Protocol Chip, and Analog SPK PA

In a scenario, if the screen is an LCD, the screen power chip is a backlight power chip. The speaker power amplifier may be an analog SPK PA capable of processing analog sound signals.

As shown in Table 52, after the backlight power chip, the PD charging protocol, and the analog SPK PA are moved from the main board to the sub-board, a quantity of signals passing through the main board BTB connector is reduced by 3, that is, 3 pins of the main board BTB connector are saved. In addition, the occupied area on the main board is saved, which optimizes the layout of the main board.

TABLE 52

| Target circuit module on main board | | | Optimization solution for target circuit module on sub-board | | Descriptions of combination and optimization |
|---|---|---|---|---|---|
| Target circuit module | Output signal | Quantity of occupied BTB pins | Quantity of occupied BTB pins | Input signal | |
| Backlight power chip | LEDA | 7 | 7 (4 after combination) | VPH-PWR | System total power supply signal | |
| | LED1- | | | VPH-PWR | System total power supply signal | |
| | LED2- | | | SDA1 | Control signal, | Used together with SDA2 and SCL2 in PD charging protocol chip, to save 2 pins |
| | LED3- | | | SCL1 | I2C signal | |
| | LED4- | | | LCD_EN | Backlight enable signal | Connected to VPH-PWR or default pull-up power supply, to save 1 pin |
| | VSP | | | VSP_EN | Positive bias enable signal | |
| | VSN | | | VSN_EN | Negative bias enable signal | |
| PD charging protocol chip | CC1 | 2 | 5 (3 after combination) | VBUS | Charging power positive signal | Multiplexed with VBUS of USB interface, to save 1 pin |
| | CC2 | | | VDD | Chip power supply | Combined with VPH-PWR of backlight power chip, to save 1 pin |
| | | | | INT | Interrupt signal | |
| | | | | SDA2 | Control signal, | |
| | | | | SCL2 | I2C signal | |
| Analog SPK PA | SPKP | 4 | 6 (3 after combination) | LINOUTP | Platform output audio positive signal | |
| | SPKP | | | LINOUTN | Platform output audio negative signal | |
| | SPKN | | | VPH-PWR | System total power supply signal | |
| | SPKN | | | VPH-PWR | System total power supply signal | Combined with VPH-PWR of backlight power chip, to save 1 pin |
| | | | | SDA3 | Control signal, | Used together with SDA2 and SC2, to save 2 pins |
| | | | | SCL3 | I2C signal | |
| TOTAL | | 13 | 18 (10 after combination) | | | 13 − 10 = 3, saving 3 pins |

② Move a Backlight Power Chip, a PD Charging Protocol Chip, and a SMART PA from a Main Board to a Sub-Board In another scenario, the speaker power amplifier may be a SMART PA capable of processing digital sound signals.

As shown in Table 53, a total quantity of signals passing through the main board BTB connector remains unchanged after the backlight power chip, the PD charging protocol chip, and the SMART PA are moved to from the main board to the sub-board, but the occupied area on the main board is saved, which optimizes the layout of the main board.

TABLE 53

| | Target circuit module on main board | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| Backlight power chip | LEDA | 7 | 7 (4 after combination) | VPH-PWR | power System total supply signal | |
| | LED1- | | | VPH-PWR | System total power supply signal | |
| | LED2- | | | SDA1 | Control | Used together with SDA2 and SCL2 of PD charging protocol chip, to save 2 pins |
| | LED3- | | | SCL1 | signal, I2C signal | |
| | LED4- | | | LCD_EN | Backlight enable signal | Connected to VPH-PWR or default pull-up power supply, to save 1 pin |
| | VSP | | | VSP_EN | Positive bias enable signal | |
| | VSN | | | VSN_EN | Negative bias enable signal | |
| PD charging protocol chip | CC1 | 2 | 5 (3 after combination) | VBUS | Charging power positive signal | Multiplexed with VBUS of USB interface, to save 1 pin |
| | CC2 | | | VDD | Chip power supply | Combined with VPH-PWR of backlight power chip, to save 1 pin |
| | | | | INT | Interrupt signal | |
| | | | | SDA2 | Control | |
| | | | | SCL2 | signal, I2C signal | |
| Speaker power amplifier (SMART PA) | SPKP | 4 | 11 (7 after combination) | VPH-PWR | System total power supply signal | Combined with VPH-PWR of backlight power chip, to save 1 pin |
| | SPKP | | | VPH-PWR | System total power supply signal | |
| | SPKN | | | I2S_DI | Digital | |
| | SPKN | | | I2S_DO | signal exchanged between SMART PA and SOC chip on main board | |
| | | | | I2S_CLK | Clock signal | |
| | | | | I2S_SYNC | Synchronization signal | |
| | | | | SDA3 | Control | Used together with SDA2 and SCL2, to save 2 pins |
| | | | | SCL3 | signal, I2C signal | |

TABLE 53-continued

| Target circuit module on main board | | | | Optimization solution for target circuit module on sub-board | | Descriptions of combination and optimization |
|---|---|---|---|---|---|---|
| Target circuit module | Output signal | Quantity of occupied BTB pins | Quantity of occupied BTB pins | Input signal | | |
| | | | | INT | Interrupt signal | |
| | | | | RST | Reset signal | |
| | | | | VIO_1.8V | Direct-current power signal | Combined with antenna switch power supply on sub-board, to save 1 pin |
| Other adjustment | Other signal adjustment | 1 | | | | |
| TOTAL | | 14 | 23 (14 after combination) | | | Save no pin, but adjust layout |

③ Move an OLED Drive Chip, a PD Charging Protocol Chip, and an Analog SPK PA from a Main Board to a Sub-Board In another scenario, if the screen is an OLED, the screen power chip is an OLED drive chip. The speaker power amplifier is an analog SPK PA.

As shown in Table 54, after the OLED drive chip is moved from the main board to the sub-board, signals passing through the main board BTB connector are changed from 7 output signals to 4 input signals, to save 3 pins. VBUS of the PD charging protocol chip is multiplexed with VBUS of the USB interface, to save 1 pin. In addition, VDD is multiplexed with VPH-PWR of the OLED drive chip, to save 1 pin.

Control signals SDA2 and SCL2 of the analog SPK PA are used together with SDA1 and SCL1 of the PD charging protocol chip, to save 2 pins. VPH-PWR of the analog SPK PA is multiplexed with VPH-PWR of the OLED drive chip, to save 1 pin.

In view of the above, in this solution, signals passing through the main board BTB connector are reduced 13 signals to 10 signals, to save 3 pins of the main board BTB connector. In addition, the occupied area on the main board is saved, which optimizes the layout of the main board.

TABLE 54

| Target circuit module on main board | | | | Optimization solution for target circuit module on sub-board | | Descriptions of combination and optimization |
|---|---|---|---|---|---|---|
| Target circuit module | Output signal | Quantity of occupied BTB pins | Quantity of occupied BTB pins | Input signal | | |
| OLED drive chip | ELVDD | 7 | 4 | VPH-PWR | System total power supply signal | |
| | ELVDD | | | VPH-PWR | System total power supply signal | |
| | ELVSS | | | VPH-PWR | System total power supply signal | |
| | ELVSS | | | OLED_ERR | OLED error signal | |
| | VIN ELVDD_EN AVDD_EN | | | | | |
| PD charging protocol chip | CC1 | 2 | 5 (3 after combination) | VBUS | Charging power positive signal | Multiplexed with VBUS of USB interface, to save 1 pin |
| | CC2 | | | VDD | Chip power supply | Replaced by VPH-PWR of OLED drive chip, to save 1 pin |

TABLE 54-continued

| Target circuit module on main board | | | Optimization solution for target circuit module on sub-board | | | Descriptions of combination and optimization |
|---|---|---|---|---|---|---|
| Target circuit module | Output signal | Quantity of occupied BTB pins | Quantity of occupied BTB pins | Input signal | | |
| Analog SPK PA | SPKP | 4 | 6 (3 after combination) | INT<br>SDA1<br>SCL1<br>LINOUTP | Interrupt signal<br>Control signal,<br>I2C signal<br>Platform output audio positive signal | |
| | SPKP | | | LINOUTN | Platform output audio negative signal | |
| | SPKN | | | VPH-PWR | System total power supply signal | |
| | SPKN | | | VPH-PWR | System total power supply signal | Combined with VPH-PWR of OLED drive chip, to save 1 pin |
| | | | | SDA2<br>SCL2 | Control signal,<br>I2C signal | Used together with SDA1 and SCL1 of PD charging protocol chip, to save 2 pins |
| TOTAL | | 13 | 15 (10 after combination) | | | 13 − 10 = 3, saving 3 pins |

③ Move an OLED Drive Chip, a PD Charging Protocol Chip, and a SMART PA from a Main Board to a Sub-Board In still another scenario, the speaker power amplifier is a SMART PA capable of processing digital signals.

As shown in Table 55, in this solution VPH-PWR of the SMART PA is combined with VPH-PWR of the OLED drive chip, to save 1 pin. Control signals of the SMART PA are multiplexed with control signals SDA1 and SCL1 of the PD charging protocol chip, to save 2 pins. Combination and optimization of other signals have been described in detail in the foregoing embodiments, and details are not described herein again.

As shown in Table 55, a total quantity of signals passing through the main board BTB connector remains unchanged in this solution, but the occupied area on the main board is saved, which optimizes the layout of the main board.

TABLE 55

| Target circuit module on main board | | | Optimization solution for target circuit module on sub-board | | | Descriptions of combination and optimization |
|---|---|---|---|---|---|---|
| Target circuit module | Output signal | Quantity of occupied BTB pins | Quantity of occupied BTB pins | Input signal | | |
| OLED drive chip | ELVDD | 7 | 4 | VPH-PWR | System total power supply signal | |
| | ELVDD | | | VPH-PWR | System total power supply signal | |
| | ELVSS | | | VPH-PWR | System total power supply signal | |
| | ELVSS | | | OLED_ERR | OLED error signal | |
| | VIN<br>ELVDD_EN<br>AVDD_EN | | | | | |
| PD charging protocol chip | CC1 | 2 | 5 (3 after combination) | VBUS | Charging power positive signal | Multiplexed with VBUS of USB interface, to save 1 pin |

TABLE 55-continued

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| | CC2 | | | VDD | Chip power supply | Multiplexed with VPH-PWR of OLED drive chip, to save 1 pin |
| | | | | INT | Interrupt signal | |
| | | | | SDA1 SCL1 | Control signal, I2C signal | |
| Speaker power amplifier (SMART PA) | SPKP | 4 | 11 (7 after combination) | VPH-PWR | System total power supply signal | Combined with VPH-PWR of OLED drive chip, to save 1 pin |
| | SPKP | | | VPH-PWR | System total power supply signal | |
| | SPKN SPKN | | | I2S_DI I2S_DO | Digital signal exchanged between SMART PA and SOC chip on main board | |
| | | | | I2S_CLK I2S_SYNC | Clock signal Synchronization signal | |
| | | | | SDA2 SCL2 | Control signal, I2C signal | Multiplexed with SDA1 and SCL1 of PD charging protocol chip, to save 2 pins |
| | | | | INT | Interrupt signal | |
| | | | | RST | Reset signal | |
| | | | | VIO_1.8V | Direct-current power signal | Combined with antenna switch power supply on sub-board, to save 1 pin |
| Other adjustment | Other signal adjustment | 1 | | | | |
| TOTAL | | 14 | 20 (14 after combination) | | | Save no pin, but adjust layout |

Embodiment 23: Move a PD Charging Protocol Chip, a Screen Power Chip, and a Charging Protocol Chip from a Main Board to a Sub-Board The PD charging protocol chip in this application refers to a universal fast charging protocol chip between various device manufacturers, including functions such as the fast charging protocol, USB port identification, the OTG (On The Go) function, and water entry monitoring.

The charging protocol chips in this application refer to private fast-charging protocol chips developed by different device manufacturers, have small differences in hardware, and mainly differ from each other in terms of the software protocol.

The PD charging protocol has high universality but a limited charging speed, while the charging protocol chip has a higher charging speed but poor universality.

There may be both the charging protocol chips in the device. For example, in a scenario in which an electronic device uses a charger matching the device, the electronic device is charged by using the charging protocol chip, and the charging speed is higher. In a scenario in which an electronic device is charged by using a charger device of another device manufacturer, the PD charging protocol chip is used for charging.

In this embodiment, based on FIG. 30 and FIG. 31, the charging protocol chip is further moved to the sub-board.

Other structures remain unchanged. The occupied area on the main board is further saved.

① Move a Backlight Power Chip, a PD Charging Protocol Chip, and a Charging Protocol Chip from a Main Board to a Sub-Board In a scenario, if the screen is an LCD, the screen power chip is a backlight power chip.

As shown in Table 56, control signals SDA1 and SCL1 of the backlight power chip are used together with SDA2 and SCL2 of the PD charging protocol chip, to save 2 pins. The backlight enable signal LCD_EN of the backlight power chip can be combined with VPH-PWR or a default pull-up power supply of the backlight power chip, to save 1 pin. VDD of the PD charging protocol chip is multiplexed with VPH-PWR of the backlight power chip, to save 1 pin. Combination and optimization of other signals are similar to those in the foregoing embodiments, and details are not described herein again.

In view of the above, in this solution, after the backlight power chip, the PD charging protocol chip, and the charging protocol chip are moved from the main board to the sub-board, a total quantity of signals passing through the main board BTB connector remains unchanged, but the occupied area on the main board is reduced, which optimizes the layout of the main board.

TABLE 56

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| Backlight power chip | LEDA | 7 | 7 (4 after combination) | VPH-PWR | System total power supply signal | |
| | LED1- | | | VPH-PWR | System total power supply signal | |
| | LED2- | | | SDA1 SCL1 | Control signal, I2C signal | Used together with SDA2 and SCL2 of PD charging protocol chip, to save 2 pins |
| | LED3- | | | | | |
| | LED4- | | | LCD_EN | Backlight enable signal | Connected to VPH-PWR or default pull-up power supply, to save 1 pin |
| | VSP | | | VSP_EN | Positive bias enable signal | |
| | VSN | | | VSN_EN | Negative bias enable signal | |
| PD charging protocol chip | CC1 | 2 | 5 (3 after combination) | VBUS | Charging power positive signal | Multiplexed with VBUS of USB interface, to save 1 pin |
| | CC2 | | | VDD | Chip power supply | Multiplexed with VPH-PWR of backlight power chip, to save 1 pin |
| | | | | INT | Interrupt signal | |
| | | | | SDA2 SCL2 | Control signal, I2C signal | |
| Charging protocol chip | USB_DP | 2 | 8 (3 after combination) | VPH-PWR | System total power supply signal | Combined with VPH-PWR of backlight power chip, to save 1 pin |

TABLE 56-continued

| Target circuit module on main board | | | Optimization solution for target circuit module on sub-board | | |
|---|---|---|---|---|---|
| Target circuit module | Output signal | Quantity of occupied BTB pins | Quantity of occupied BTB pins | Input signal | Descriptions of combination and optimization |
| | USB_DN | | SDA3 SCL3 | Control signal, I2C signal | Used together with SDA2 and SCL2, to save 2 pins |
| | | | VBUS | Charging power positive signal | Combined with VBUS on USB interface, to save 1 pin |
| | | | VIO_1.8V | Direct-current power supply | Combined with antenna switch VIO power supply on sub-board, to save 1 pin |
| | | | EINT | Interrupt signal | |
| | | | USB_DP | Data positive signal | |
| | | | USB_DN | Data negative signal | |
| TOTAL | | 11 | 20 (10 after combination) | 11 − 10 = 1, saving 1 pin | |

② Move a PD Charging Protocol Chip, an OLED Drive Chip, and a Charging Protocol Chip from a Main Board to a Sub-Board In another scenario, if the screen is an OLED, the screen power chip is an OLED drive chip. In this scenario, combination and optimization of signals passing through the main board BTB connector are shown in Table 57.

As shown in Table 57, a power supply signal VDD of the PD charging protocol chip is combined with VPH-PWR of the OLED drive chip after the PD charging protocol chip is moved to the sub-board, to save 1 pin.

An input signal VPH-PWR of the charging protocol chip is combined with VPH-PWR of the OLED drive chip after the charging protocol chip is moved to the sub-board, to save 1 pin. Combination and optimization manners of other signals are similar to those in the foregoing embodiments, and details are not described herein again.

In view of the above, in this solution, after the PD charging protocol chip, the OLED drive chip, and the charging protocol chip are moved from the main board to the sub-board, signals passing through the main board BTB connector are reduced from 11 signals to 10 signals, to save 1 pin. In addition, the occupied area on the main board is reduced, which optimizes the layout of the main board.

TABLE 57

| Target circuit module on main board | | | Optimization solution for target circuit module on sub-board | | |
|---|---|---|---|---|---|
| Target circuit module | Output signal | Quantity of occupied BTB pins | Quantity of occupied BTB pins | Input signal | Descriptions of combination and optimization |
| OLED drive chip | ELVDD | 7 | 4 | VPH-PWR | System total power supply signal |
| | ELVDD | | | VPH-PWR | System total power supply signal |
| | ELVSS | | | VPH-PWR | System total power supply signal |
| | ELVSS | | | OLED_ERR | OLED error signal |
| | VIN ELVDD_EN AVDD_EN | | | | |

TABLE 57-continued

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| PD charging protocol chip | CC1 | 2 | 5 (3 after combination) | VBUS | Charging power positive signal | Multiplexed with VBUS of USB interface, to save 1 pin |
| | CC2 | | | VDD | Chip power supply | Multiplexed with VPH-PWR of OLED drive chip, to save 1 pin |
| | | | | INT | Interrupt signal | |
| | | | | SDA1 | Control signal, | |
| | | | | SCL1 | I2C signal | |
| Charging protocol chip | USB_DP | 2 | 8 (3 after combination) | VPH-PWR | System total power supply signal | Combined with VPH-PWR of OLED drive chip, to save 1 pin |
| | USB_DN | | | SDA2 SCL2 | Control signal, I2C signal | Used together with SDA1 and SCL1, to save 2 pins |
| | | | | VBUS | Charging power positive signal | Combined with VBUS signal on USB interface, to save 1 pin |
| | | | | VIO_1.8V | Direct-current power supply | Combined with antenna switch VIO power supply on sub-board, to save 1 pin |
| | | | | EINT | Interrupt signal | |
| | | | | USB_DP | Data positive signal | |
| | | | | USB_DN | Data negative signal | |
| TOTAL | | 11 | 27 (10 after combination) | | | 11 − 10 = 1, saving 1 pin |

Embodiment 24: Move a Screen Power Chip, a Headset Switch Switching Chip, a PD Charging Protocol Chip, and a Speaker Power Amplifier from a Main Board to a Sub-Board In this embodiment, based on FIG. 34 and FIG. 35, the speaker power amplifier is further moved from the main board to the sub-board, to further reduce the occupied area on the main board.
① Move a Backlight Power Chip, a Headset Switch Switching Chip, a PD Charging Protocol Chip, and an Analog SPK PA from a Main Board to a Sub-Board In a scenario, if the screen is an LCD, the screen power chip is a backlight power chip. The speaker power amplifier is an analog SPK PA capable of processing analog sound signals.

As shown in Table 58, in this solution, after the backlight power chip, the headset switch switching chip, the PD charging protocol chip, and the analog SPK PA are moved from the main board to the sub-board, a quantity of signals passing through the main board BTB connector remains unchanged, but the occupied area on the main board is reduced, which optimizes the layout of the main board.

TABLE 58

| Target circuit module on main board | | | Optimization solution for target circuit module on sub-board | | Descriptions of combination and optimization |
|---|---|---|---|---|---|
| Target circuit module | Output signal | Quantity of occupied BTB pins | Quantity of occupied BTB pins | Input signal | |
| Backlight power chip | LEDA | 7 | 7 (4 after combination) | VPH-PWR | System total power supply signal | |
| | LED1- | | | VPH-PWR | System total power supply signal | |
| | LED2- | | | SDA1 | Control signal, I2C signal | Used together with SDA3 and SCL3 in PD charging protocol chip, to save 2 pins |
| | LED3- | | | SCL1 | | |
| | LED4- | | | LCD_EN | Backlight enable signal | Connected to VPH-PWR or default pull-up power supply, to save 1 pin |
| | VSP | | | VSP_EN | Positive bias enable signal | |
| | VSN | | | VSN_EN | Negative bias enable signal | |
| Headset switch switching chip | SBU1 | 4 | 12 (9 after combination) | MIC | Headset microphone input signal | |
| | SBU2 | | | SGND | Feedback ground | |
| | DP | | | AGND | Analog ground | |
| | DN | | | SDA2 | Control signal, I2C signal | Used together with SDA3 and SCL3, to save 2 pins |
| | | | | SCL2 | | |
| | | | | DP | Data positive signal | |
| | | | | DN | Data negative signal | |
| | | | | HSL | Left channel signal | |
| | | | | HSR | Right channel signal | |
| | | | | EN | Enable signal | |
| | | | | INT | Interrupt signal | |
| | | | | VPH-PWR | power supply System total signal | Combined with VPH-PWR of backlight power chip, to save 1 pin |
| PD charging protocol chip | CC1 | 2 | 5 (3 after combination) | VBUS | Charging power positive signal | Multiplexed with VBUS of USB interface, to save 1 pin |
| | CC2 | | | VDD | Chip power supply | Combined with VPH-PWR of backlight power chip, to save 1 pin |
| | | | | INT | Interrupt signal | |
| | | | | SDA3 | Control signal, I2C signal | |
| | | | | SCL3 | | |

TABLE 58-continued

| Target circuit module on main board | | | Optimization solution for target circuit module on sub-board | | | Descriptions of combination and optimization |
|---|---|---|---|---|---|---|
| Target circuit module | Output signal | Quantity of occupied BTB pins | Quantity of occupied BTB pins | Input signal | | |
| Analog SPK PA | SPKP | 4 | 6 (3 after combination) | LINOUTP | Platform output audio positive signal | |
| | SPKP | | | LINOUTN | Platform output audio negative signal | |
| | SPKN | | | VPH-PWR | System total power supply signal | |
| | SPKN | | | VPH-PWR | System total power supply signal | Combined with VPH-PWR of backlight power chip, to save 1 pin |
| | | | | SDA4 SCL4 | Control signal, I2C signal | Used together with SDA3 and SCL3, to save 2 pins |
| Other adjustment | Other signal adjustment | 2 | | | | |
| TOTAL | | 19 | 30 (19 after combination) | | | Save no pin, but adjust layout |

② Move a Backlight Power Chip, a Headset Switch Switching Chip, a PD Charging Protocol Chip, and a SMART PA from a Main Board to a Sub-Board In another scenario, the speaker power amplifier may also be a SMART PA capable of processing digital sound signals.

As shown in Table 59, in this solution, after the backlight power chip, the headset switch switching chip, the PD charging protocol chip, and the SMART PA are moved from the main board to the sub-board, a total quantity of signals passing through the main board BTB connector remains unchanged, but the occupied area on the main board is reduced, which optimizes the layout of the main board.

TABLE 59

| Target circuit module on main board | | | Optimization solution for target circuit module on sub-board | | | Descriptions of combination and optimization |
|---|---|---|---|---|---|---|
| Target circuit module | Output signal | Quantity of occupied BTB pins | Quantity of occupied BTB pins | Input signal | | |
| Backlight power chip | LEDA | 7 | 7 (4 after combination) | VPH-PWR | System total power supply signal | |
| | LED1- | | | VPH-PWR | System total power supply signal | |
| | LED2- LED3- | | | SDA1 SCL1 | Control signal, I2C signal | Used together with SDA3 and SCL3 in PD charging protocol chip, to save 2 pins |
| | LED4- | | | LCD_EN | Backlight enable signal | Connected to VPH-PWR or default pull-up power supply, to save 1 pin |
| | VSP | | | VSP_EN | Positive bias enable signal | |

TABLE 59-continued

| Target circuit module on main board | | | Optimization solution for target circuit module on sub-board | | |
|---|---|---|---|---|---|
| Target circuit module | Output signal | Quantity of occupied BTB pins | Quantity of occupied BTB pins | Input signal | Descriptions of combination and optimization |
| Headset switch switching chip | VSN | | | VSN_EN | Negative bias enable signal |
| | SBU1 | 4 | 12 (9 after combination) | MIC | Headset microphone input signal |
| | SBU2 | | | SGND | Feedback ground |
| | DP | | | AGND | Analog ground |
| | DN | | | SDA2 | Control signal, Used together |
| | | | | SCL2 | I2C signal with SDA3 and SCL3, to save 2 pins |
| | | | | DP | Data positive signal |
| | | | | DN | Data negative signal |
| | | | | HSL | Left channel signal |
| | | | | HSR | Right channel signal |
| | | | | EN | Enable signal |
| | | | | INT | Interrupt signal |
| | | | | VPH-PWR | System total power supply signal | Combined with VPH-PWR of backlight power chip, to save 1 pin |
| PD charging protocol chip | CC1 | 2 | 5 (3 after combination) | VBUS | Charging power positive signal | Multiplexed with VBUS of USB interface, to save 1 pin |
| | CC2 | | | VDD | Chip power supply | Combined with VPH-PWR of backlight power chip, to save 1 pin |
| | | | | INT | Interrupt signal |
| | | | | SDA3 | Control signal, |
| | | | | SCL3 | I2C signal |
| Speaker power amplifier (SMART PA) | SPKP | 4 | 11 (7 after combination) | VPH-PWR | System total power supply signal | Combined with VPH-PWR of screen power supply, to save 1 pin |
| | SPKP | | | VPH-PWR | System total power supply signal |
| | SPKN | | | I2S_DI | Digital signal exchanged between SMART PA and SOC chip on main board |
| | SPKN | | | I2S_DO | |
| | | | | I2S_CLK | Clock signal |
| | | | | I2S_SYNC | Synchronization signal |
| | | | | SDA4 | Control signal, Used together |
| | | | | SCL4 | I2C signal with SDA3 and SCL3, to save 2 pins |
| | | | | INT | Interrupt signal |
| | | | | RST | Reset signal |
| | | | | VIO_1.8V | Direct-current power signal | Combined with antenna switch power supply on sub-board, to save 1 pin |

TABLE 59-continued

| Target circuit module on main board | | | Optimization solution for target circuit module on sub-board | | |
|---|---|---|---|---|---|
| Target circuit module | Output signal | Quantity of occupied BTB pins | Quantity of occupied BTB pins | Input signal | Descriptions of combination and optimization |
| Other adjustment | Other signal adjustment | 6 | | | |
| TOTAL | | 23 | 35 (23 after combination) | | Save no pin, but adjust layout |

③ Move an OLED Drive Chip, a Headset Switch Switching Chip, a PD Charging Protocol Chip, and an Analog SPK PA from a Main Board to a Sub-Board In another scenario, if the screen is an OLED, the screen power chip is an OLED drive chip. The speaker power amplifier is an analog SPK PA capable of processing analog sound signals.

TABLE 60

| Target circuit module on main board | | | Optimization solution for target circuit module on sub-board | | |
|---|---|---|---|---|---|
| Target circuit module | Output signal | Quantity of occupied BTB pins | Quantity of occupied BTB pins | Input signal | Descriptions of combination and optimization |
| OLED drive chip | ELVDD | 7 | 4 | VPH-PWR | System total power supply signal |
| | ELVDD | | | VPH-PWR | System total power supply signal |
| | ELVSS | | | VPH-PWR | System total power supply signal |
| | ELVSS | | | OLED_ERR | OLED error signal |
| | VIN | | | | |
| | ELVDD_EN | | | | |
| | AVDD_EN | | | | |
| Headset switch switching chip | SBU1 | 4 | 12 (9 after combination) | MIC | Headset microphone input signal |
| | SBU2 | | | SGND | Feedback ground |
| | DP | | | AGND | Analog ground |
| | DN | | | SDA1 | Control signal, I2C signal |
| | | | | SCL1 | Used together with SDA2 and SCL2 of PD charging protocol chip, to save 2 pins |
| | | | | DP | Data positive signal |
| | | | | DN | Data negative signal |
| | | | | HSL | Left channel signal |
| | | | | HSR | Right channel signal |
| | | | | EN | Enable signal |
| | | | | INT | Interrupt signal |

TABLE 60-continued

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| PD protocol chip | CC1 | 2 | 5 (3 after combination) | VPH-PWR | System total power supply signal | Combined with VPH-PWR of OLED drive chip, to save 1 pin |
| | | | | VBUS | Charging power positive signal | Multiplexed with VBUS of USB interface, to save 1 pin |
| | CC2 | | | VDD | Chip power supply | Multiplexed with VPH-PWR of OLED drive chip, to save 1 pin |
| | | | | INT | Interrupt signal | |
| | | | | SDA2 SCL2 | Control signal, I2C signal | |
| Analog SPK PA | SPKP | 4 | 6 (3 after combination) | LINOUTP | Platform output audio positive signal | |
| | SPKP | | | LINOUTN | Platform output audio negative signal | |
| | SPKN | | | VPH-PWR | System total power supply signal | |
| | SPKN | | | VPH-PWR | System total power supply signal | Combined with VPH-PWR of OLED drive chip, to save 1 pin |
| | | | | SDA3 SCL3 | Control signal, I2C signal | Used together with SDA2 and SCL2, to save 2 pins |
| Other adjustment | Other signal adjustment | 2 | | | | |
| TOTAL | | 19 | 27 (19 after combination) | | | Save no pin, but adjust layout |

As shown in Table 60, in this solution, after the OLED drive chip, the backlight power chip, the headset switch switching chip, the PD charging protocol chip, and the analog SPK PA are moved from the main board to the sub-board, a total quantity of signals passing through the main board BTB connector remains unchanged, but the occupied area on the main board is reduced, which optimizes the layout of the main board.

③ Move an OLED Drive Chip, a Headset Switch Switching Chip, a PD Charging Protocol Chip, a SMART PA from a Main Board to a Sub-Board In another scenario, the speaker power amplifier is a SMART PA capable of processing digital sound signals. In this scenario, combination and optimization solutions of signals passing through the main board BTB connector are shown in Table 61.

TABLE 61

| Target circuit module on main board | | | Optimization solution for target circuit module on sub-board | | | |
|---|---|---|---|---|---|---|
| Target circuit module | Output signal | Quantity of occupied BTB pins | Quantity of occupied BTB pins | Input signal | | Descriptions of combination and optimization |
| OLED drive chip | ELVDD | 7 | 4 | VPH-PWR | System total power supply signal | |
| | ELVDD | | | VPH-PWR | System total power supply signal | |
| | ELVSS | | | VPH-PWR | System total power supply signal | |
| | ELVSS | | | OLED_ERR | OLED error signal | |
| | VIN | | | | | |
| | ELVDD_EN | | | | | |
| | AVDD_EN | | | | | |
| Headset switch switching chip | SBU1 | 4 | 12 (9 after combination) | MIC | Headset microphone input signal | |
| | SBU2 | | | SGND | Feedback ground | |
| | DP | | | AGND | Analog ground | |
| | DN | | | SDA1 SCL1 | Control signal, I2C signal | Used together with SDA2 and SCL2 of PD charging protocol chip, to save 2 pins |
| | | | | DP | Data positive signal | |
| | | | | DN | Data negative signal | |
| | | | | HSL | Left channel signal | |
| | | | | HSR | Right channel signal | |
| | | | | EN | Enable signal | |
| | | | | INT | Interrupt signal | |
| | | | | VPH-PWR | System total power supply signal | Combined with VPH-PWR of OLED drive chip, to save 1 pin |
| PD charging protocol chip | CC1 | 2 | 5 (3 after combination) | VBUS | Charging power positive signal | Multiplexed with VBUS of USB interface, to save 1 pin |
| | CC2 | | | VDD | Chip power supply | Multiplexed with VPH-PWR of OLED drive chip, to save 1 pin |
| | | | | INT | Interrupt signal | |
| | | | | SDA2 SCL2 | Control signal, I2C signal | |
| Speaker power amplifier (SMART PA) | SPKP | 4 | 11 (7 after combination) | VPH-PWR | System total power supply signal | Combined with VPH-PWR of OLED drive chip, to save 1 pin |

TABLE 61-continued

| Target circuit module on main board | | | Optimization solution for target circuit module on sub-board | | |
|---|---|---|---|---|---|
| Target circuit module | Output signal | Quantity of occupied BTB pins | Quantity of occupied BTB pins | Input signal | Descriptions of combination and optimization |
| | SPKP | | | VPH-PWR | System total power supply signal |
| | SPKN | | | I2S_DI | Digital signal exchanged between SMART PA and SOC chip on main board |
| | SPKN | | | I2S_DO | |
| | | | | I2S_CLK | Clock signal |
| | | | | I2S_SYNC | Synchronization signal |
| | | | | SDA3 | Control signal, I2C signal |
| | | | | SCL3 | Used together with SDA2 and SCL2, to save 2 pins |
| | | | | INT | Interrupt signal |
| | | | | RST | Reset signal |
| | | | | VIO_1.8V | Direct-current power signal. Combined with antenna switch power supply on sub-board, to save 1 pin |
| Other adjustment | Other signal adjustment | 6 | | | |
| TOTAL | | 23 | 32 (23 after combination) | | Save no pin, but adjust layout |

As shown in Table 61, in this solution, after the foregoing four chips are moved to the sub-board, signals passing through the main board BTB connector remain unchanged, but the occupied area on the main board is reduced, which optimizes the layout of the main board.

On the circuit board provided in this application, one or more circuit modules are moved from the main board to the sub-board, and further the input signals of the circuit modules are combined and optimized, where the input signal is a signal sent by the SOC chip on the main board to the circuit module, for example, a power signal or a control signal, to finally reduce the quantity of signals passing through the main board BTB connector. In addition to the circuit modules included in the foregoing embodiments, the circuit modules that can achieve the foregoing objective may further include an audio chip, a sensor, a flash drive chip, and the like, which are not described one by one in detail in this application.

In addition, in the embodiment of the circuit board provided in this application, a quantity of pins of the main board BTB connector may be 62, 72, 80, 82, or the like, which is not limited in this application.

In addition, when the BTB connector has a large quantity of pins, a combination of at least two BTB connectors with small quantities of pins can be used, to avoid the problem that some pins are not connected due to the excessive length of the BTB connector.

For example, any combination of the following pins can be selected: 16 pins, 24 pins, 34 pins, 42 pins, 52 pins, and 62 pins. For example, 66 pins can be obtained by selecting a combination of 24 pins+42 pins, 68 pins can be obtained by selecting a combination of 34 pins+34 pins, 76 pins can be obtained by selecting a combination of 34 pins+42 pins or 24 pins+52 pins, and 84 pins can be obtained by selecting a combination of 42 pins+42 pins.

A quantity of BTB connectors and a quantity of pins of each connector are not limited in the embodiments of this application.

Optionally, pins of a single BTB connector may also include pins of different sizes. Using an example in which the foregoing 62 pins, 72 pins, 80 pins, and 82 pins may be 60+2 pins, 70+2 pins, 78+2 pins, 80+2 pins, and 60+2 pins, 60 is a quantity of pins with smaller sizes, and 2 is a quantity of pins with larger sizes. It may be understood that, a pin with a larger size allows a larger current to pass. In this application, quantities of pins with large sizes and pins with small sizes are not limited, and can be designed according to actual needs.

Based on the circuit board provided in the foregoing embodiments, some circuit modules are moved from the main board to the sub-board, and further, input signals of the circuit modules are further combined and optimized, so that the circuit modules can reduce a quantity of signals passing through the main board BTB connector, that is, reduce a quantity of pins of the main board BTB connector occupied by them. Further, signals of other circuit modules on the sub-board passing through the main board BTB connector can also be combined and optimized, to enable the main board BTB connector to carry more circuit modules, thereby enabling the entire circuit board to implement more complex functions.

For the case in which the solutions shown in FIG. 2A and FIG. 2B cannot be compatible with the two protocols MIPI CPHY and MIPI DPHY, it is found by analyzing the signals of the MIPI CPHY and the MIPI DPHY that, 5 pins need to be added based on supporting MIPI DPHY protocol for compatibility with the two protocols. Using the foregoing embodiments in which the LCD is used, the input signals of circuit modules moved to the sub-board and input signals of the existing circuit modules on the sub-board are combined and optimized. For example, based on saving 2 pins shown in Table 1, LINOUTP and LINOUTN of the analog SPK PA are further combined with drive signals of the existing circuits on the sub-board, to further save 2 pins. Further, the BTB connector usually has 2 large pins, and the remaining are all small pins. The through-current capability of the large pin is 5 A, and the through-current capability of the small pin is about 0.3 A. In a scenario of performing charging at less than or equal to 50 W, a charging current is less than 5 A. In this case, the charging circuit module only needs to occupy 1 large pin, and the remaining 1 large pin is used to carry the VPH-PWR signal in the circuit, which can replace 3 small pins carrying the VPH-PWR signal, so that 2 pins are saved, and finally, 6 pins, more than 5 pins, are saved. Therefore, this solution can be used to implement compatibility with the two protocols MIPI CPHY and MIPI DPHY.

For the case in which the solutions shown in FIG. 2A and FIG. 2B cannot be implemented based on the OLED and under-screen fingerprint. After the OLED drive chip is placed on the sub-board, a quantity of signals passing through the main board BTB connector is reduced to 4. However, an under-screen fingerprint drive chip requires 7 pins. Signals that can be combined and optimized are further combined and optimized, to finally save 11 pins, thereby implementing the solution based on the OLED and the off-screen fingerprint.

In other embodiments of this application, after the quantity of signals of the circuit modules on the sub-board passing through the main board BTB connector is reduced by using the foregoing embodiments, the main board BTB connector can carry signals of more circuit modules, so that the main board BTB connector can carry signals of more other circuit modules, and in addition, the sub-board can carry more circuit modules of which signals need to pass through the main board BTB connector. For example, the SIM card module is placed on the sub-board.

The SIM card module has a total of 10 pins, including two SIM cards with a total of 8 signals, 1 NFC signal, and 1 detection signal. In a solution of moving the backlight power chip and the analog SPK PA to the sub-board, other signals on the sub-board are further combined and optimized, to save more pins, and finally, the SIM card module is arranged on the sub-board, to further save the occupied area on the main board. Through the descriptions of the foregoing implementations, a person skilled in the art may clearly understand that, for the purpose of convenient and brief description, only division of the foregoing functional modules is used as an example for description. In actual application, the foregoing functions may be allocated to and completed by different functional modules according to requirements. That is, an inner structure of an apparatus is divided into different functional modules to complete all or some of the functions described above. For specific work processes of the system, the apparatus and the unit described above, refer to the corresponding processes in the foregoing method embodiments. Details are not described herein again.

In the several embodiments provided in this embodiment, it should be understood that the disclosed system, apparatus, and method may be implemented in other manners. For example, the described apparatus embodiment is merely an example. For example, the module or unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments hereof.

In addition, functional units in the embodiments of this embodiment may be integrated into one processing unit, or each of the units may exist alone physically, or two or more units are integrated into one unit. The integrated unit may be implemented in the form of hardware, or may be implemented in the form of a software function unit.

When the integrated unit is implemented in the form of a software functional unit and sold or used as an independent product, the integrated unit may be stored in a computer-readable storage medium. Based on such an understanding, the technical solutions of the embodiments essentially, or the part contributing to the related art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the embodiments. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A circuit board for an electronic device comprising a screen with a screen chip, the circuit board comprising:
   a main board with a first connector;
   a sub-board with a second connector; and
   a flexible circuit board connected to the main board by the first connector and connected to the sub-board by the second connector;
   wherein the flexible circuit board is further connected to the screen chip located on the screen;
   wherein a target circuit is arranged on the sub-board, a signal input terminal of a target signal type on the target circuit is connected to a signal input terminal also of the target signal type on the sub-board, the target signal type comprises at least one of a power signal, a control signal, or a data signal; and wherein the target circuit comprises a screen power chip and a speaker power amplifier, and both the screen power chip and the speaker power amplifier are connected to the flexible circuit board through the second connector, wherein the target circuit comprises the speaker power amplifier connected between the second connector and a speaker, wherein the speaker power amplifier comprises a first speaker power amplifier and a second speaker power amplifier, wherein the first speaker power amplifier is configured to process an analog sound signal, and wherein the second speaker power amplifier is configured to process a digital sound signal.

2. The circuit board of claim 1, wherein the screen power chip comprises a backlight power chip or an organic light emitting display (OLED) drive chip.

3. The circuit board of claim 1, wherein the screen power chip is an organic light emitting display (OLED) drive chip, and a signal of the OLED drive chip passing through the first connector is an input signal of the OLED drive chip.

4. The circuit board of claim 1, wherein the flexible circuit board is one integrated flexible circuit board, and the flexible circuit board is connected to the screen chip by a connection point.

5. An electronic device, comprising:
a screen with a screen chip; and
a circuit board, wherein the circuit board comprises:
   a main board with a first connector;
   a sub-board with a connector; and
   a flexible circuit board connected to the main board by the first connector and connected to the sub-board by the second connector;

wherein the flexible circuit board is further connected to the screen chip located on the screen;

wherein a target circuit is arranged on the sub-board, a signal input terminal of a target signal type on the target circuit is connected to a signal input terminal also of the target signal type on the sub-board;

wherein the target signal type comprises at least one of a power signal, a control signal, or a data signal; and wherein the target circuit comprises a screen power chip and a speaker power amplifier, and both the screen power chip and the speaker power amplifier are connected to the flexible circuit board through the second connector, wherein the target circuit comprises the speaker power amplifier connected between the second connector and a speaker, wherein the speaker power amplifier comprises a first speaker power amplifier and a second speaker power amplifier, wherein the first speaker power amplifier is configured to process an analog sound signal, and wherein the second speaker power amplifier is configured to process a digital sound signal.

6. The electronic device of claim 5, wherein the screen power chip comprises a backlight power chip or an organic light emitting display (OLED) drive chip.

* * * * *